(12) United States Patent
Li et al.

(10) Patent No.: US 11,683,787 B2
(45) Date of Patent: Jun. 20, 2023

(54) METHOD AND APPARATUS OF HANDLING PRIORITIZATION OF SIGNALING FOR SIDELINK RESOURCE CONFLICT IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 17/946,091

(22) Filed: Sep. 16, 2022

(65) Prior Publication Data
US 2023/0084917 A1    Mar. 16, 2023

Related U.S. Application Data

(60) Provisional application No. 63/244,861, filed on Sep. 16, 2021.

(51) Int. Cl.
*H04W 28/02* (2009.01)
*H04W 72/02* (2009.01)
(Continued)

(52) U.S. Cl.
CPC .......... *H04W 72/02* (2013.01); *H04L 1/1812* (2013.01); *H04W 28/0215* (2013.01);
(Continued)

(58) Field of Classification Search
CPC . H04W 4/005; H04W 28/0215; H04W 72/25; H04W 72/40; H04L 67/104
See application file for complete search history.

(56) References Cited

U.S. PATENT DOCUMENTS

2017/0019886 A1* 1/2017 Patel ............... H04W 4/70
2019/0098617 A1* 3/2019 Li .................. H04W 72/51
(Continued)

FOREIGN PATENT DOCUMENTS

CN    106550318 A    3/2017
EP     3820062 A3    8/2021

OTHER PUBLICATIONS

"3GPP TS 36.212 V15.2.1", Jul. 2018, pp. 1-250 (Year: 2018).*
(Continued)

*Primary Examiner* — Salvador E Rivas
(74) *Attorney, Agent, or Firm* — Cooper Legal Group LLC

(57) ABSTRACT

In an example, a device receives a first sidelink control information in a first sidelink Transmission Time Interval (TTI) in a sidelink resource pool. The first sidelink control information is indicative of a first sidelink resource in a second sidelink TTI. The device determines a conflict associated with the first sidelink resource. The device determines a transmission occasion for a first sidelink transmission with conflict information. The device determines a plurality of sidelink transmissions in the transmission occasion. The plurality of sidelink transmissions comprises a first set of sidelink transmissions with conflict information, and/or a second set of sidelink transmissions with sidelink Hybrid Automatic Repeat Request (HARQ) feedback. The first set of sidelink transmissions comprise the first sidelink transmission. The device determines one or more sidelink transmissions of the plurality of the sidelink transmissions. Determining the one or more sidelink transmissions may comprise prioritizing the second set of sidelink transmissions with HARQ feedback over the first set of sidelink transmissions with conflict information. The device performs the one or more sidelink transmissions in the transmission occasion.

20 Claims, 16 Drawing Sheets

(51) Int. Cl.
  *H04L 1/1812* (2023.01)
  *H04W 72/0446* (2023.01)
  *H04W 72/56* (2023.01)
  *H04W 72/25* (2023.01)
  *H04W 72/40* (2023.01)
  *H04L 67/104* (2022.01)
  *H04W 4/00* (2018.01)

(52) U.S. Cl.
  CPC ....... *H04W 72/0446* (2013.01); *H04W 72/25* (2023.01); *H04W 72/40* (2023.01); *H04W 72/56* (2023.01); *H04L 67/104* (2013.01); *H04W 4/00* (2013.01)

(56) References Cited

U.S. PATENT DOCUMENTS

| | | | | |
|---|---|---|---|---|
| 2020/0037343 | A1* | 1/2020 | He | H04L 1/1893 |
| 2021/0028910 | A1* | 1/2021 | Cheng | H04L 1/1896 |
| 2021/0218509 | A1* | 7/2021 | Wu | H04W 72/56 |
| 2021/0400689 | A1* | 12/2021 | Wang | H04W 52/52 |
| 2022/0053460 | A1* | 2/2022 | Yu | H04W 76/14 |
| 2022/0386318 | A1* | 12/2022 | Liu | H04W 72/1263 |

OTHER PUBLICATIONS

Extended European Search Report for corresponding European patent application EP22196040, dated Jan. 1, 2023, 12 pages.

3rd Generation Partnership Project; Technical Specification Group Radio Access Network; NR; "Physical Layer Procedures for Control" (Release 16), 3GPP TS 38.213 V16.6.0 (Jun. 2021), Sophia-Antipolis Cedex, France, 187 pages.

3rd Generation Partnership Project; Technical Specification Group Radio Access Network; "Overall Description of Radio Access Network (RAN) Aspects for Vehicle-to-Everything (V2X) based on LTE and NR" (Release 16), 3GPP TR 37.985 V16.0.0 (Jun. 2020), Sophia-Antipolis Cedex, France, 35 pages.

ASUStek, "Discussion on Simultaneous Configuration of Mode 1 and Mode 2 for a UE", 3GPP TSG RAN WG1 #100, R1-2001018, e-Meeting, Feb. 24-Mar. 6, 2020, 4 pages.

* cited by examiner

METHOD AND APPARATUS OF HANDLING PRIORITIZATION OF SIGNALING FOR SIDELINK RESOURCE CONFLICT IN A WIRELESS COMMUNICATION SYSTEM

CROSS-REFERENCE TO RELATED APPLICATIONS

The present Application claims the benefit of U.S. Provisional Patent Application Ser. No. 63/244,861 filed on Sep. 16, 2021, the entire disclosure of which is incorporated herein in its entirety by reference.

FIELD

This disclosure generally relates to wireless communication networks, and more particularly, to a method and apparatus of handling prioritization of signaling for sidelink resource conflict in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device receives a first sidelink control information in a first sidelink Transmission Time Interval (TTI) in a sidelink resource pool, wherein the first sidelink control information is indicative of a first sidelink resource in a second sidelink TTI. The first device determines a conflict associated with the first sidelink resource. The first device determines a transmission occasion for a first sidelink transmission with conflict information. The first device determines a plurality of sidelink transmissions in the transmission occasion. The plurality of sidelink transmissions comprises a first set of sidelink transmissions with conflict information, and/or a second set of sidelink transmissions with sidelink Hybrid Automatic Repeat Request (HARQ) feedback. The first set of sidelink transmissions comprises the first sidelink transmission. The first device determines one or more sidelink transmissions of the plurality of sidelink transmissions. Determining the one or more sidelink transmissions comprises prioritizing the second set of sidelink transmissions with sidelink HARQ feedback over the first set of sidelink transmissions with conflict information if the plurality of sidelink transmissions comprises both the first set of sidelink transmissions and the second set of sidelink transmissions. The first device performs the one or more sidelink transmissions in the transmission occasion.

In an example from the perspective of a first device, the first device receives a first sidelink control information in a first sidelink TTI in a sidelink resource pool, wherein the first sidelink control information is indicative of a first sidelink resource in a second sidelink TTI. The first device determines a conflict associated with the first sidelink resource. The first device determines a transmission occasion for a first sidelink transmission with conflict information. The first device determines a plurality of sidelink transmissions in the transmission occasion. The plurality of sidelink transmissions comprises a first set of sidelink transmissions with conflict information, and/or a second set of sidelink transmissions with sidelink HARQ feedback. The first set of sidelink transmissions comprises the first sidelink transmission. The first device determines one or more sidelink transmissions of the plurality of sidelink transmissions. Determining the one or more sidelink transmissions comprises (i) selecting, from the second set of sidelink transmissions, one or more second sidelink transmissions with sidelink HARQ feedback for inclusion in the one or more sidelink transmissions, and (ii) after the selecting the one or more second sidelink transmissions with sidelink HARQ feedback, selecting, from the first set of sidelink transmissions, zero or more first sidelink transmissions with conflict information for inclusion in the one or more sidelink transmissions. The first device performs the one or more sidelink transmissions in the transmission occasion.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.214 V16.6.0 (2021-06), "3GPP TSG RAN, NR Physical layer procedures for data (Release 16)"; 3GPP TS 38.213 V16.6.0 (2021-06), "3GPP TSG RAN, NR Physical layer procedures for control (Release 16)"; 3GPP TS 38.212 V16.6.0 (2021-06), "3GPP TSG RAN, NR Multiplexing and channel coding (Release 16)"; RP-202846, "WID revision: NR sidelink enhancement"; RAN1 Chair's Notes of 3GPP TSG RAN WG1 #106-e; R1-2106621, "Discussion on mode-2 enhancements", vivo; R1-2107038, "Considerations on inter-UE coordination for mode 2 enhancements", Fujitsu; R1-2107529, "Discussion on inter-UE coordination for Mode 2 enhancements", LG Electronics. The standards and documents listed above are hereby expressly incorporated by reference in their entirety.

Figure 1:
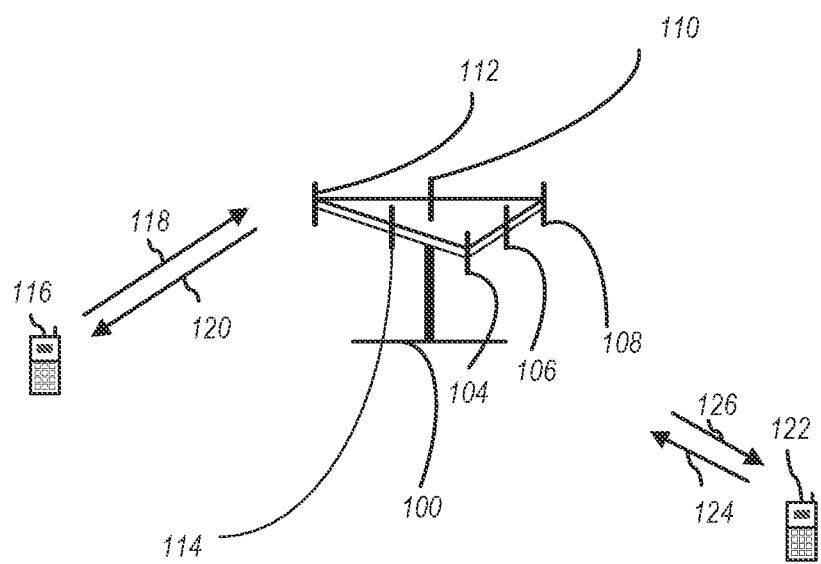
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
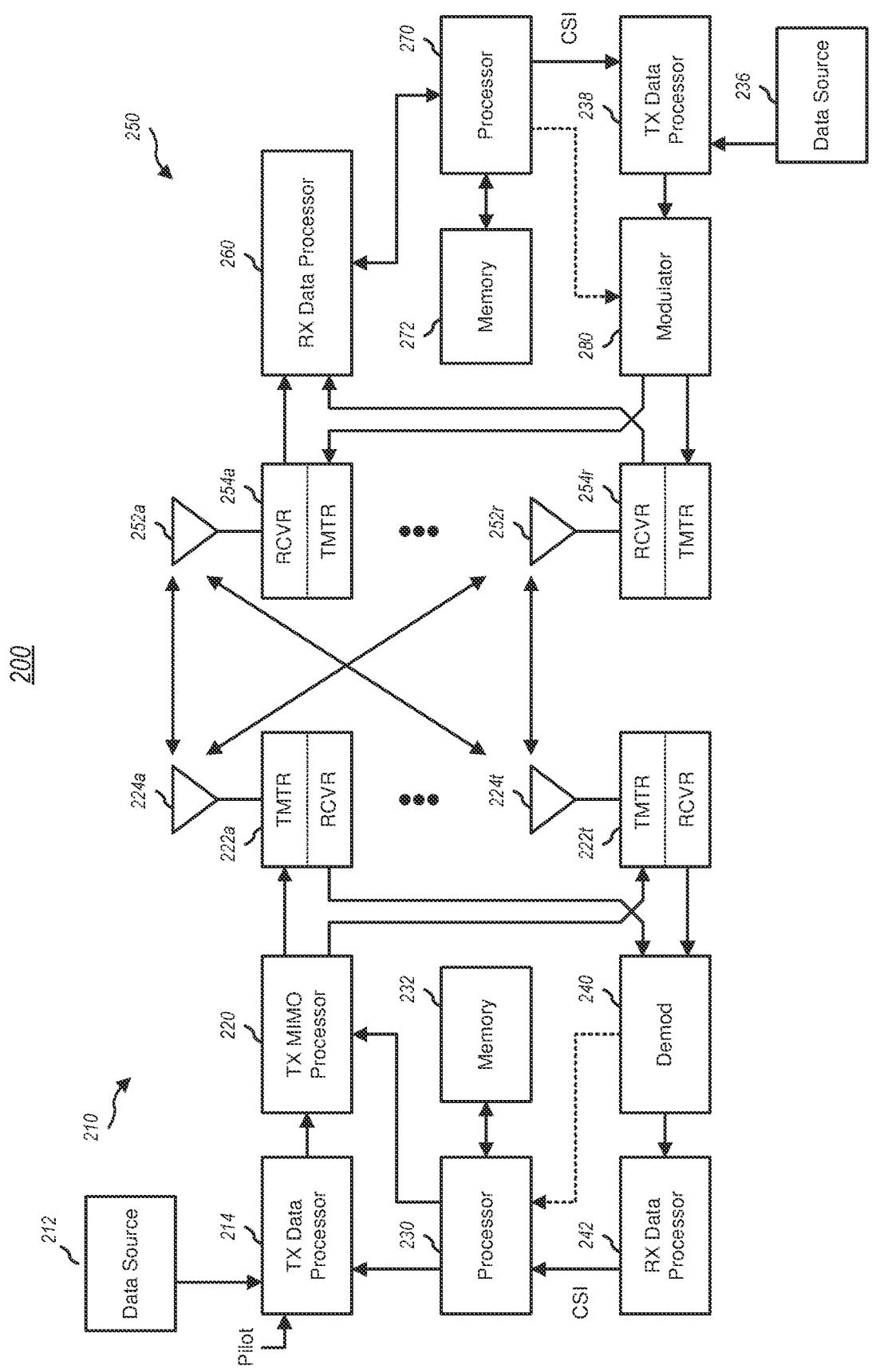
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
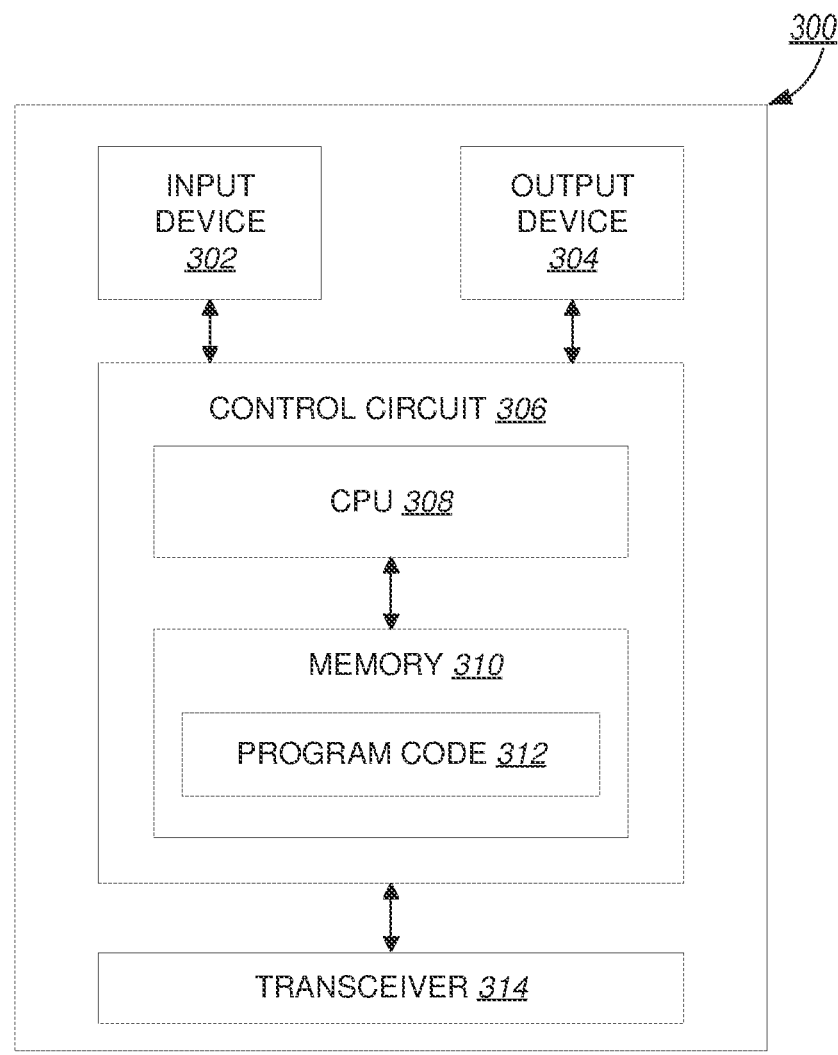
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
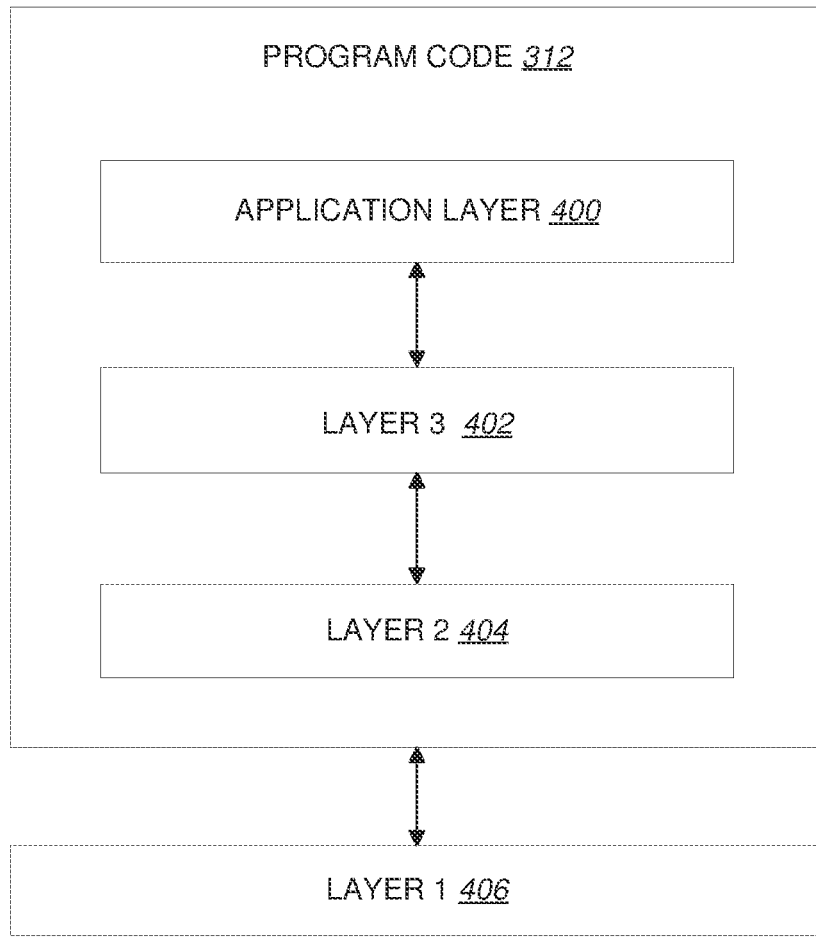
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 38.214 V16.6.0 discusses Physical sidelink shared channel (PSSCH) related procedure in NR.3GPP TS 38.214 V16.6.0 discusses sidelink resource allocation mode 1 and sidelink resource allocation mode 2 for acquiring sidelink resources. One or more parts of 3GPP TS 38.214 V16.6.0 are quoted below:

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $(t_0^{SL}, t_1^{SL}, \ldots, t_{T_{max}-1}^{SL})$ where

. . .

The slots in the set are arranged in increasing order of slot index.

. . . The UE determines the set of resource blocks assigned to a sidelink resource pool as follows:

The resource block pool consists of $N_{PRB}$ PRBs.

The sub-channel m for m=0, 1, . . . , numSubchannel−1 consists of a set of $n_{subCHsize}$ contiguous resource blocks with the physical resource block number $n_{PRB} = n_{subCHRBstart} + m \cdot n_{subCHsize} + j$ for j=0, 1, . . . , $n_{subCHsize}-1$, where $n_{subCHRBstart}$ and $n_{subCHsize}$ are given by higher layer parameters sl-StartRB-Subchannel and sl-SubchannelSize, respectively A UE is not expected to use the last $N_{PRB}$ mod $n_{subCHsize}$ PRBs in the resource pool.

8.1 UE Procedure for Transmitting the Physical Sidelink Shared Channel

Each PSSCH transmission is associated with an PSCCH transmission.

That PSCCH transmission carries the Pt stage of the SCI associated with the PSSCH transmission; the $2^{nd}$ stage of the associated SCI is carried within the resource of the PSSCH. If the UE transmits SCI format 1-A on PSCCH according to a PSCCH resource configuration in slot n and PSCCH resource m, then for the associated PSSCH transmission in the same slot one transport block is transmitted with up to two layers;

. . .

. . .

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink A symbol is configured for sidelink, according to higher layer parameters startSLsymbols and lengthSLsymbols, where startSLsymbols is the symbol index of the first symbol of lengthSLsymbols consecutive symbols configured for sidelink Within the slot, PSSCH resource allocation starts at symbol startSLsymbols+1.

The UE shall not transmit PSSCH in symbols which are configured for use by PSFCH, if PSFCH is configured in this slot.

The UE shall not transmit PSSCH in the last symbol configured for sidelink

The UE shall not transmit PSSCH in the symbol immediately preceding the symbols which are configured for use by PSFCH, if PSFCH is configured in this slot.

In sidelink resource allocation mode 1:

For sidelink dynamic grant, the PSSCH transmission is scheduled by a DCI format 3_0.

For sidelink configured grant type 2, the configured grant is activated by a DCI format 3_0.

. . .

For sidelink configured grant type 1:
The slot of the first sidelink transmissions follows the higher layer configuration according to [10, TS 38.321].

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

[ . . . ]

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

. . .

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below. 'Time resource assignment' carries logical slot offset indication of N=1 or 2 actual resources when sl-MaxNumPerReserve is 2, and N=1 or 2 or 3 actual resources when sl_MaxNumPerReserve is 3, in a form of time RIV (TRIV) field which is determined as follows:

if N=1
  TRIV=0
elseif N=2
  TRIV=$t_1$
else
  if $(t_2-t_1-1) \leq 15$
    TRIV=$30(t_2-t_1-1)+t_1+31$
  else
    TRIV=$30(31-t_2+t_1)+62-t_1$
  end if
end if where the first resource is in the slot where SCI format 1-A was received, and $t_i$ denotes i-th resource time offset in logical slots of a resource pool with respect to the first resource where for N=2, $1 \leq t_1 \leq 31$; and for N=3, $1 \leq t_1 \leq 30$, $t_1 < t_2 \leq 31$.

The starting sub-channel $n_{subCH,0}^{start}$ of the first resource is determined according to clause 8.1.2.2. The number of contiguously allocated sub-channels for each of the N resources $L_{subCH} \geq 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV = n_{subCH,1}^{start} + \sum_{i=1}^{L_{subCH}-1} \left(N_{subchannel}^{SL} + 1 - i\right)$$

If sl-MaxNumPerReserve is 3 then $$FRIV = n_{subCh,1}^{start} + n_{subCH,2}^{start} \cdot \left(N_{subchannel}^{SL} + 1 - L_{subCH}\right) + \sum_{i=1}^{L_{subCH}-1} \left(N_{subchannel}^{SL} + 1 - i\right)^2$$

where $n_{subCH,1}^{start}$ denotes the starting sub-channel index for the second resource $n_{subCH,2}^{start}$ denotes the starting sub-channel index for the third resource $N_{subchannel}^{SL}$ is the number of sub-channels in a resource pool provided according to the higher layer parameter sl-NumSubchannel If TRIV indicates N<sl-MaxNumPerReserve, the starting sub-channel indexes corresponding to sl-MaxNumPerReserve minus N last resources are not used.

The number of slots in one set of the time and frequency resources for transmission opportunities of PSSCH is given by $C_{resel}$ where $C_{resel}$=10*SL_RESOURCE_RESELECTION_COUNTER [10, TS 38.321] if configured else $C_{resel}$ is set to 1.

If a set of sub-channels in slot $t'^{SL}_m$ is determined as the time and frequency resource for PSSCH transmission corresponding to the selected sidelink grant (described in [10, TS 38.321]), the same set of sub-channels in slots $t_{m+j \times P'_{rsvp\_TX}}^{SL}$ are also determined for PSSCH transmissions corresponding to the same sidelink grant where j=1, 2, . . . , $C_{resel}$−1, $P_{rsvp\_TX}$, if provided, is converted from units of msec to units of logical slots, resulting in $P'_{rsvp\_TX}$ according to clause 8.1.7, and $(t'^{SL}_0, t'^{SL}_1, t'^{SL}_2, \ldots)$ is determined by Clause 8. Here, $P_{rsvp\_TX}$ is the resource reservation interval indicated by higher layers.

[ . . . ]

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

A UE is required to decode neither the corresponding SCI formats 2-A and 2-B nor the PSSCH associated with an SCI format 1-A if the SCI format 1-A indicates an MCS table that the UE does not support.

3GPP TS 38.213 V16.6.0 discusses sidelink control and feedback channel related procedure in NR. One or more parts of 3GPP TS 38.213 V16.6.0 are quoted below:

16 UE Procedures for Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by timeresourcepool and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols.

. . .

A priority of a PSSCH according to NR radio access or according to E-UTRA radio access is indicated by a priority field in a respective scheduling SCI format . . . . A priority of a PSFCH is same as the priority of a corresponding PSSCH.

[ . . . ]

16.2 Power Control

[ . . . ]

16.2.3 PSFCH

A UE with $N_{sch,Tx,PSFCH}$ scheduled PSFCH transmissions, and capable of transmitting a maximum of $N_{max,PSFCH}$ PSFCHs, determines a number $N_{Tx,PSFCH}$ of simultaneous PSFCH transmissions and a power $P_{PSFCH,k}(i)$ for a PSFCH transmission k, $1 \leq k \leq N_{Tx,PSFCH}$, on a resource pool in PSFCH transmission occasion i on active SL BWP b of carrier f of serving cell c as if dl-P0-PSFCH is provided, $$P_{PSFCH,one} = P_{O,PSFCH} + 10 \log_{10}(2^\mu) + \alpha_{PSFCH} \cdot PL \text{ [dBm]}$$

where
  $P_{O,PSFCH}$ is a value of dl-P0-PSFCH
  $\alpha_{PFSCH}$ is a value of dl-Alpha-PSFCH, if provided; else, $a_{PFSCH} = 1$
  $PL = PL_{b,f,c}(q_d)$ as described in clause 7.1.1 except that
    the RS resource is the one the UE uses for determining a power of a PUSCH transmission scheduled by a DCI format 0_0 in serving cell c when the UE is configured to monitor PDCCH for detection of DCI format 0_0 in serving cell c
    the RS resource is the one corresponding to the SS/PBCH block the UE uses to obtain MIB when the UE is not configured to monitor PDCCH for detection of DCI format 0_0 in serving cell c if $N_{sch,Tx,PSFCH} \leq N_{max,PSFCH}$
  if $P_{PSFCH,one} + 10 \log_{10}(N_{sch,Tx,PSFCH}) \leq P_{CMAX}$, where $P_{CMAX}$ is determined for $N_{sch,Tx,PSFCH}$ PSFCH transmissions according to [8-1, TS 38.101-1]
    $N_{Tx,PSFCH} = N_{sch,Tx,PSFCH}$ and $P_{PSFCH,k}(i) = P_{PSFCH,one}$ [dBM]
  else
    UE autonomously determines $N_{Tx,PSFCH}$ PSFCH transmissions with ascending priority order as described in clause 16.2.4.2 such that $$N_{Tx,PSFCH} \geq \max\left(1, \sum_{i=1}^{K} M_i\right)$$

here $M_i$ is a number of PSFCHs with priority value i and K is defined as the largest value satisfying $$P_{PSFCH,one} + 10\log_{10}\left(\max\left(1, \sum_{i=1}^{K} M_i\right)\right) \leq P_{CMAX}$$

where $P_{CMAX}$ is determined according to [8-1, TS 38.101-1] for transmission of all PSFCHs assigned with priority values 1, 2, . . . , K, if any zero, otherwise
and $P_{PSFCH,k}(i) = \min(P_{CMAX} - 10 \log_{10}(N_{Tx,PSFCH}), P_{PSFCH,one})$ [dBM]

where $P_{CMAX}$ is defined in [8-1, TS 38.101-1] and is determined for the $N_{Tx,PSFCH}$ PSFCH transmissions else
  the UE autonomously selects $N_{max,PSFCH}$ PSFCH transmissions with ascending priority order as described in clause 16.2.4.2
  if $P_{PSFCH,one} + 10 \log_{10}(N_{max,PSFCH}) \leq P_{CMAX}$, where $P_{CMAX}$ is determined for the $N_{max,PSFCH}$ PSFCH transmissions according to [8-1, TS 38.101-1]

$N_{Tx,PSFCH} = N_{max,PSFCH}$ and $P_{PSFCH,k}(i) = P_{PSFCH,one}$ [dBm]

else
    the UE autonomously selects $N_{Tx,PSFCH}$ PSFCH transmissions in ascending order of corresponding priority field values as described in clause 16.2.4.2 such that $$N_{Tx,PSFCH} \geq \max\left(1, \sum_{i=1}^{K} M_i\right)$$

where $M_i$ is a number of PSFCHs with priority value i and K is defined as the largest value satisfying $$P_{PSFCH,one} + 10\log_{10}\left(\max\left(1, \sum_{i=1}^{K} M_i\right)\right) \leq P_{CMAX}$$

where $P_{CMAX}$ is determined according to [8-1, TS 38.101-1] for transmission of all PSFCHs assigned with priority values 1, 2, . . . , K, if any zero, otherwise
and $P_{PSFCH,k}(i) = \min(P_{CMAX} - 10 \log_{10}(N_{Tx,PSFCH}), P_{PSFCH,one})$ [dBm]

where $P_{CMAX}$ is determined for the $N_{Tx,PSFCH}$ simultaneous PSFCH transmissions according to [8-1, TS 38.101-1]

else $P_{PSFCH,k}(i) = P_{CMAX} - 10 \log_{10}(N_{Tx,PSFCH})$ [dBm]

where the UE autonomously determines $N_{Tx,PSFCH}$ PSFCH transmissions with ascending priority order as described in clause 16.2.4.2 such that $N_{Tx,PSFCH} \geq 1$ and where $P_{CMAX}$ is determined for the $N_{Tx,PSFCH}$ PSFCH transmissions according to [8-1, TS 38.101-1]

16.2.4 Prioritization of Transmissions/Receptions
16.2.4.2 Simultaneous PSFCH Transmission/Reception
If a UE
  would transmit $N_{sch,Tx,PSFCH}$ PSFCHs and receive $N_{sch,Rx,PSFCH}$ PSFCHs, and
  transmissions of the N sch,Tx,PSFCH PSFCHs would overlap in time with receptions of the $N_{sch,Rx,PSFCH}$ PSFCHs the UE transmits or receives only a set of PSFCHs corresponding to the smallest priority field value, as determined by a first set of SCI format 1-A and a second set of SCI format 1-A [5, TS 38.212] that are respectively associated with the $N_{sch,Tx,PSFCH}$ PSFCHs and the $N_{sch,Rx,PSFCH}$ PSFCHs.

If a UE would transmit $N_{sch,Tx,PSFCH}$ PSFCHs in a PSFCH transmission occasion, the UE transmits $N_{Tx,PSFCH}$ PSFCHs corresponding to the smallest $N_{Tx,PSFCH}$ priority field values indicated in all SCI formats 1-A associated with the PSFCH transmission occasion.

. . .

16.3 UE Procedure for Reporting HARQ-ACK on Sidelink

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool for a period of PSFCH transmission occasion resources. If the number is zero, PSFCH transmissions from the UE in the resource pool are disabled.

A UE expects that a slot $t'^{SL}_k$ ($0 \leq k < T'_{max}$) has a PSFCH transmission occasion resource if k mod $N_{PSSCH}^{PSFCH}=0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.

A UE may be indicated by higher layers to not transmit a PSFCH in response to a PSSCH reception [11, TS 38.321]. If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.

A UE is provided by sl-PSFCH-RB-Set a set of $M_{PBR,set}^{PSFCH}$ PRBs in a resource pool for PSFCH transmission in a PRB of the resource pool. For a number of $N_{subch}$ sub channels for the resource pool, provided by sl-NumSubchannel, and a number of PSSCH slots associated with a PSFCH slot that is less than or equal to $N_{PSSCH}^{PSFCH}$, the UE allocates the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ PRBs from the $M_{PBR,set}^{PSFCH}$ PRBs to slot i among the PSSCH slots associated with the PSFCH slot and sub-channel j, where $M_{subch,slot}^{PSFCH}=M_{PBR,set}^{PSFCH}/(N_{subch} \cdot N_{PSSCH}^{PSFCH})$, $0 \leq i < N_{PSSCH}^{PSFCH} \leq j < N_{subch}$, and the allocation starts in an ascending order of i and continues in an ascending order of j. The UE expects that $M_{PBR,set}^{PSFCH}$ is a multiple of $N_{subch} \cdot N_{PSSCH}^{PSFCH}$.

The second OFDM symbol l' of PSFCH transmission in a slot is defined as l'=startSLsymbols+lengthSLsymbols−2.

A UE determines a number of PSFCH resources available for multiplexing HARQ-ACK information in a PSFCH transmission as $R_{PRB,CS}^{PSFCH}=N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool provided by sl-NumMuxCS-Pair and, based on an indication by sl-PSFCH-CandidateResourceType,
  if sl-PSFCH-CandidateResourceType is configured as startSubCH, $N_{type}^{PSFCH}=1$ and the $M_{subch,slot}^{PSFCH}$ PRBs are associated with the starting sub-channel of the corresponding PSSCH;
  if sl-PSFCH-CandidateResourceType is configured as allocSubCH, $N_{type}^{PSFCH}=N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding PSSCH.

The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

A UE determines an index of a PSFCH resource for a PSFCH transmission in response to a PSSCH reception as $(P_{ID}+M_{ID})\mod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_D$ is zero.

. . .

16.3.1 UE Procedure for Receiving HARQ-ACK on Sidelink

A UE that transmitted a PSSCH scheduled by a SCI format 2-A or a SCI format 2-B that indicates HARQ feedback enabled, attempts to receive associated PSFCHs according to PSFCH resources determined as described in clause 16.3. The UE determines an ACK or a NACK value for HARQ-ACK information provided in each PSFCH resource as described in [10, TS 38.133]. The UE does not determine both an ACK value and a NACK value at a same time for a PSFCH resource.

. . .

3GPP TS 38.212 V16.6.0 discusses sidelink control information and Downlink Control Information (DCI) as sidelink (SL) grant in NR. One or more parts of 3GPP TS 38.212 V16.6.0 are quoted below:

7.3.1 DCI Formats
The DCI formats defined in table 7.3.1-1 are supported.

TABLE 7.3.1-1

| DCI formats | |
| --- | --- |
| DCI format | Usage |
| . . . | . . . |
| 3_0 | Scheduling of NR sidelink in one cell |
| 3_1 | Scheduling of LTE sidelink in one cell |

[ . . . ]
7.3.1.4 DCI Formats for Scheduling of Sidelink
7.3.1.4.1 Format 3_0
DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—$\lceil \log_2 I \rceil$ bits, where I is the number of resource pools for transmission configured by the higher layer parameter sl-TxPoolScheduling.

Time gap—3 bits determined by higher layer parameter sl-DCI-ToSL-Trans, as defined in clause 8.1.2.1 of [6, TS 38.214]

HARQ process number—4 bits as defined in clause 16.4 of [5, TS 38.213]

New data indicator—1 bit as defined in clause 16.4 of [5, TS 38.213]

Lowest index of the subchannel allocation to the initial transmission—$\lceil \log_2(N_{subChannel}^{SL}) \rceil$ bits as defined in clause 8.1.2.2 of [6, TS 38.214]

SCI format 1-A fields according to clause 8.3.1.1:
Frequency resource assignment.
Time resource assignment.

PSFCH-to-HARQ feedback timing indicator—$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]

PUCCH resource indicator—3 bits as defined in clause 16.5 of [5, TS 38.213].

Configuration index—0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits
2 bits as defined in clause 16.5.2 of [5, TS 38.213] if the UE is configured with pdsch-HARQ-ACK-Codebook=dynamic
2 bits as defined in clause 16.5.1 of [5, TS 38.213] if the UE is configured with pdsch-HARQ-ACK-Codebook=semi-static Padding bits, if required
[ . . . ]

8.3 Sidelink Control Information on PSCCH

SCI carried on PSCCH is a 1$^{st}$-stage SCI, which transports sidelink scheduling information.

8.3.1 1$^{st}$-Stage SCI Formats
. . .

8.3.1.1 SCI format 1-A

SCI format 1-A is used for the scheduling of PSSCH and 2$^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment – $\left\lceil \log_2 \left( \frac{N_{subChannel}^{SL}(N_{subChannel}^{SL}+1)}{2} \right) \right\rceil$ bits when the value of the higher layer parameter sl-MaxNumPerReserve is configured to 2; otherwise $\left\lceil \log_2 \left( \frac{N_{subCkannel}^{SL}(N_{subCkannel}^{SL}+1)(2N_{subCkannel}^{SL}+1)}{6} \right) \right\rceil$ bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

2$^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

TABLE 8.3.1.1-1

2$^{nd}$-stage SCI formats

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

8.4 Sidelink Control Information on PSSCH

SCI carried on PSSCH is a 2$^{nd}$-stage SCI, which transports sidelink scheduling information.

8.4.1 2$^{nd}$-Stage SCI Formats
. . .

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.
New data indicator—1 bit.
Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

TABLE 8.4.1.1-1

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.11 of [9, TS 38.331].

Communication range requirement—4 bits determined by higher layer parameter sl-ZoneConfigMCR-Index.

. . .

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

RP-202846 discusses Work Item Description (WID) on NR sidelink enhancement. One or more parts of RP-202846 are quoted below:

3 Justification

3GPP has been developing standards for sidelink as a tool for UE to UE direct communication required in various use cases since LTE. The first standard for NR sidelink is to be completed in Rel-16 by the work item "5G V2X with NR sidelink" where solutions including NR sidelink are being specified mainly for vehicle-to-everything (V2X) while they can also be used for public safety when the service requirement can be met.

Meanwhile, the necessity of NR sidelink enhancement has been identified. For V2X and public safety, the service requirements and operation scenarios are not fully supported in Rel-16 due to the time limitation, . . .

TSG RAN started discussions in RAN #84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

. . .

4 Objective 4.1 Objective of SI or Core Part WI or Testing Part WI

The objective of this work item is to specify radio solutions that can enhance NR sidelink for the V2X, public safety and commercial use cases.

1. Sidelink evaluation methodology update: . . .

2. Resource allocation enhancement:

Specify resource allocation to reduce power consumption of the UEs [RAN1, RAN2]

. . .

Study the feasibility and benefit of solution(s) on the enhancement(s) in mode 2 for enhanced reliability and reduced latency in consideration of both PRR and PIR defined in TR37.885 (by RAN #91), and specify the identified solution(s) if deemed feasible and beneficial [RAN1, RAN2]

Inter-UE coordination with the following.

A set of resources is determined at UE-A. This set is sent to UE-B in mode 2, and UE-B takes this into account in the resource selection for its own transmission.

Note: The solution should be able to operate in-coverage, partial coverage, and out-of-coverage and to address consecutive packet loss in all coverage scenarios.

Note: RAN2 work will start after RAN #89.

. . .

Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool.

In RAN1 #106-e meeting, RAN1 has some agreements about NR Vehicle-to-Everything (V2X). At least some of the agreements are quoted below from RAN1 Chair's Notes of 3GPP TSG RAN WG1 #106-e:

Agreement

Figure 5:
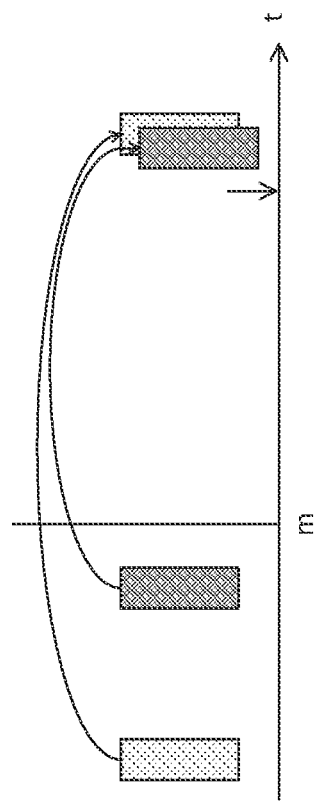
FIG. 5 is a diagram illustrating an exemplary scenario associated with coordination information transmission timeline according to one exemplary embodiment.
Figure 5:
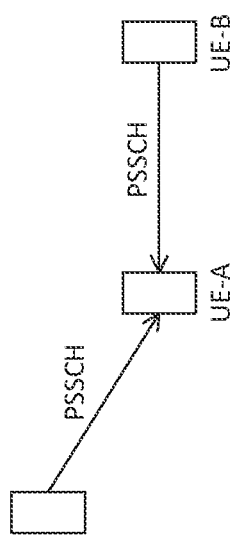
Figure 6:
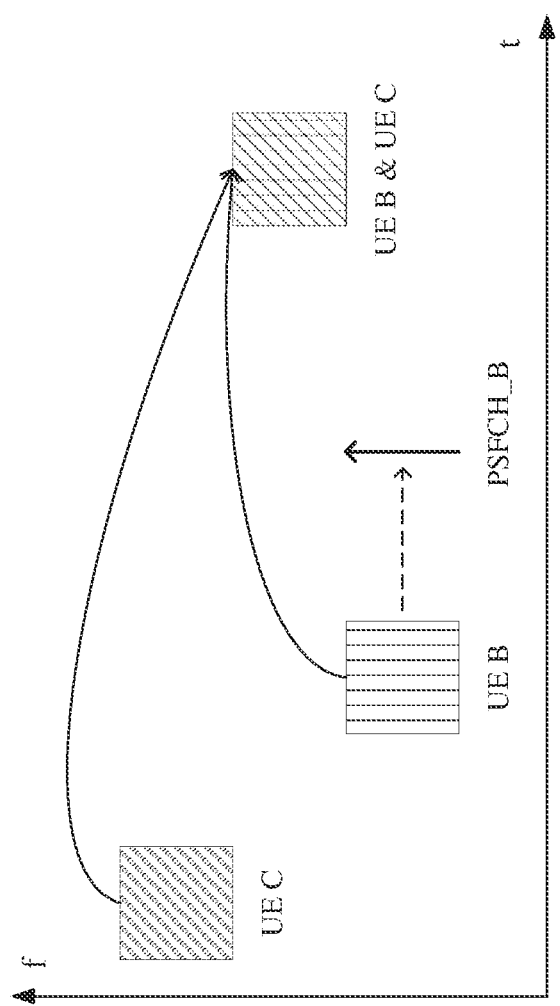
FIG. 6 is a diagram illustrating an exemplary scenario associated with a UE sending an expected conflict indication according to one exemplary embodiment.

For scheme 2, the following inter-UE coordination information signalling from UE-A is supported. FFS details including condition(s)/scenario(s) under which each information is enabled to be sent by UE-A and used by UE-B
   Presence of expected/potential resource conflict on the resources indicated by UE-B's SCI
      FFS: UE behaviour when the presence of expected/potential resource conflict is detected by the transmitter
Agreement
In scheme 2, at least the following is supported for UE(s) to be UE-A(s)/UE-B(s) in the inter-UE coordination transmission triggered by a detection of expected/potential resource conflict(s) in Mode 2:
   A UE that transmitted PSCCH/PSSCH with SCI indicating reserved resource(s) to be used for its transmission, received inter-UE coordination information from UE-A indicating expected/potential resource conflict(s) for the reserved resource(s), and uses it to determine resource re-selection is UE-B
   A UE that detects expected/potential resource conflict(s) on resource(s) indicated by UE-B's SCI sends inter-UE coordination information to UE-B, subject to satisfy one of the following conditions, is UE-A
      Working assumption At least a destination UE of one of the conflicting TBs, i.e., TBs to be transmitted in the expected/potential conflicting resource(s)
         Whether a non-destination UE of a TB transmitted by UE-B can be UE-A is (pre-)configured
Agreement
In scheme 2, the following UE-B's behavior in its resource (re)selection is supported when it receives inter-UE coordination information from UE-A:
   UE-B can determine resource(s) to be re-selected based on the received coordination information
      UE-B can reselect resource(s) reserved for its transmission when expected/potential resource conflict on the resource(s) is indicated
Agreement
In scheme 2, at least the following is supported to determine inter-UE coordination information:
   Among resource(s) indicated by UE-B's SCI, UE-A considers that expected/potential resource conflict occurs on the resource(s) satisfying at least one of the following condition(s):
   Condition 2-A-1:
      Other UE's reserved resource(s) identified by UE-A are fully/partially overlapping with resource(s) indicated by UE-B's SCI in time-and-frequency
   (Working Assumption) Condition 2-A-2:
      Resource(s) (e.g., slot(s)) where UE-A, when it is intended receiver of UE-B, does not expect to perform SL reception from UE-B due to half duplex operation R1-2106621 discusses sidelink mode 2 enhancement. Notably, FIG. 6 of Section 2.5.3 of R1-2106621, entitled "coordination information transmission timeline of scheme 2", is reproduced herein as FIG. 5. One or more parts of R1-2106621 are quoted below:
Inter-UE Coordination Scheme 2
In one approach of scheme 2, UE-A should detect the potential/expected resource conflict. In this case, the types of resource conflicts need to be defined, so that UE-A determines 'a set of resource' as the resources incurring the defined resource conflicts. The types of resource conflict as listed in scheme 1 can be starting point for further discussion.
Regarding PSSCH resource collision as in FIG. 1, hidden node is the main reason incurring the resource conflict. The collided resource which is not sensed by UE-B (TX UE) can be sensed by UE-A (RX UE), thus the sensing result of UE-A can be used to assist UE-B to determine transmission resource. When UE-A detects potential resource collision between the reserved resources of UE-B and another UE, it can trigger resource re-selection of UE-B to resolve the collision. For such solution, RAN1 needs to study the criteria to define a resource collision between UE-B and the other UE, e.g., the RSRP measured on the UE-B's reserved resource is above a RSRP-threshold.
For the resource overlap of PSSCH TX/RX or PSFCH TX/RX overlap as in FIG. 1, it is believed that inter-UE coordination scheme 2 is redundant in such case. Instead, UE-A can perform resource re-selection by itself to resolve the conflict, since the conflict is incurred due to UE-A's PSSCH transmission.
For the resource conflicts between NR PSSCH/PSFCH and another interface/RAT as shown in FIG. 3 or FIG. 4, either TX/RX of NR PSSCH/PSFCH or TX/RX of another RAT is dropped as specified in Rel-16 NR SL. To protect transmissions of both NR SL and other RAT, it is straightforward to trigger UE-B to reselect its NR SL resources before occurrence of the conflict.
Proposal 1: For scheme 2, the expected/potential resource conflict at UE-A includes,
   PSSCH resource collision on the resource reserved by UE-B, FFS definition of resource collision.
   Overlap between UE-A's UL/LTE resource and PSSCH resource reserved by UE-B.
   Overlap between UE-A's UL/LTE resource and resource carrying PSFCH feedback to UE-B.
[ . . . ]
2.5.2 Container
. . .
For scheme 2, it seems a 1-bit flag is enough to trigger resource reselection. From perspective of signaling overhead reduction, PSFCH or a new PSFCH-like channel is more proper to deliver such signaling.
Proposal 2: PSFCH or PSFCH-like channel is used to indicate the presence of resource conflict in scheme 2.
2.5.3 Signaling Transmission Timeline
. . .
For scheme 2, the timing for the coordination information should be defined as well. As illustrated in FIG. 6, when UE-B is performing transmission to UE-A, UE-A detects resource collision on the UE-B's reserved resource at time instant m, and then sends indication to trigger UE-B to reselect the collided resources after m. If PSFCH-like channel is used to indicate the presence of resource conflict, to simplify the system design, the association relationship between the conflict indicator and the conflicted resource can be fixed, similarly as the PSSCH and PSFCH association in Rel-16, The potential difference is that the conflict indicator can be located before the conflicted resource as shown by the red arrow in FIG. 6.

FIG. 1: Coordination Information Transmission Timeline of Scheme 2

Proposal 3: For scheme 2, the timing to send the PSFCH-like channel (carrying coordination information) is implicitly associated with the time location of the potential conflicted PSSCH resource.
   Association between PSSCH occasion and PSFCH occasion can be starting point.
   The PSFCH-like channel is transmitted before the potential conflicted PSSCH resource.

Figure 13:
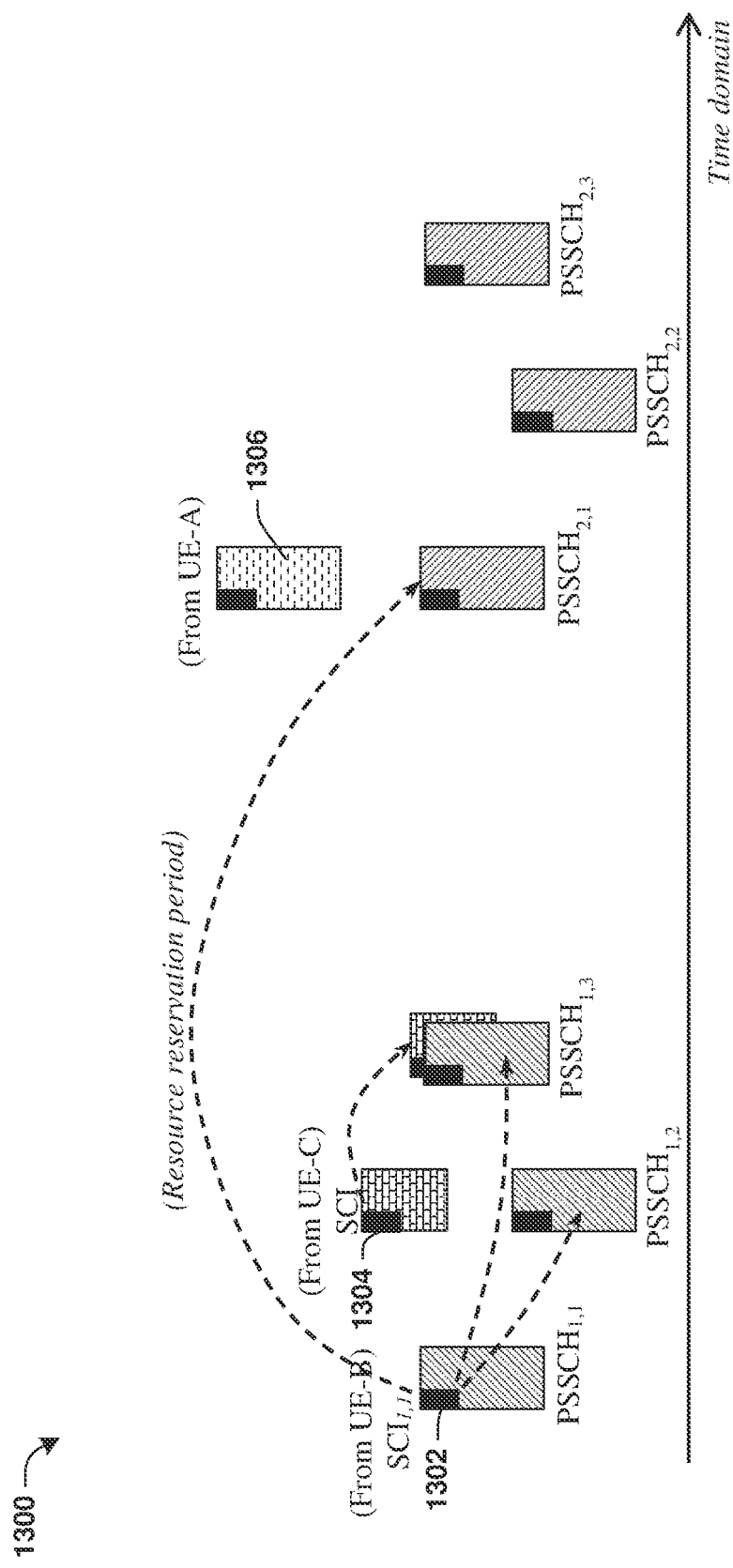
FIG. 13 is a diagram illustrating an exemplary scenario associated with Sidelink Control Information (SCI) indicative of one or more PSSCH resources according to one exemplary embodiment.
Figure 14:
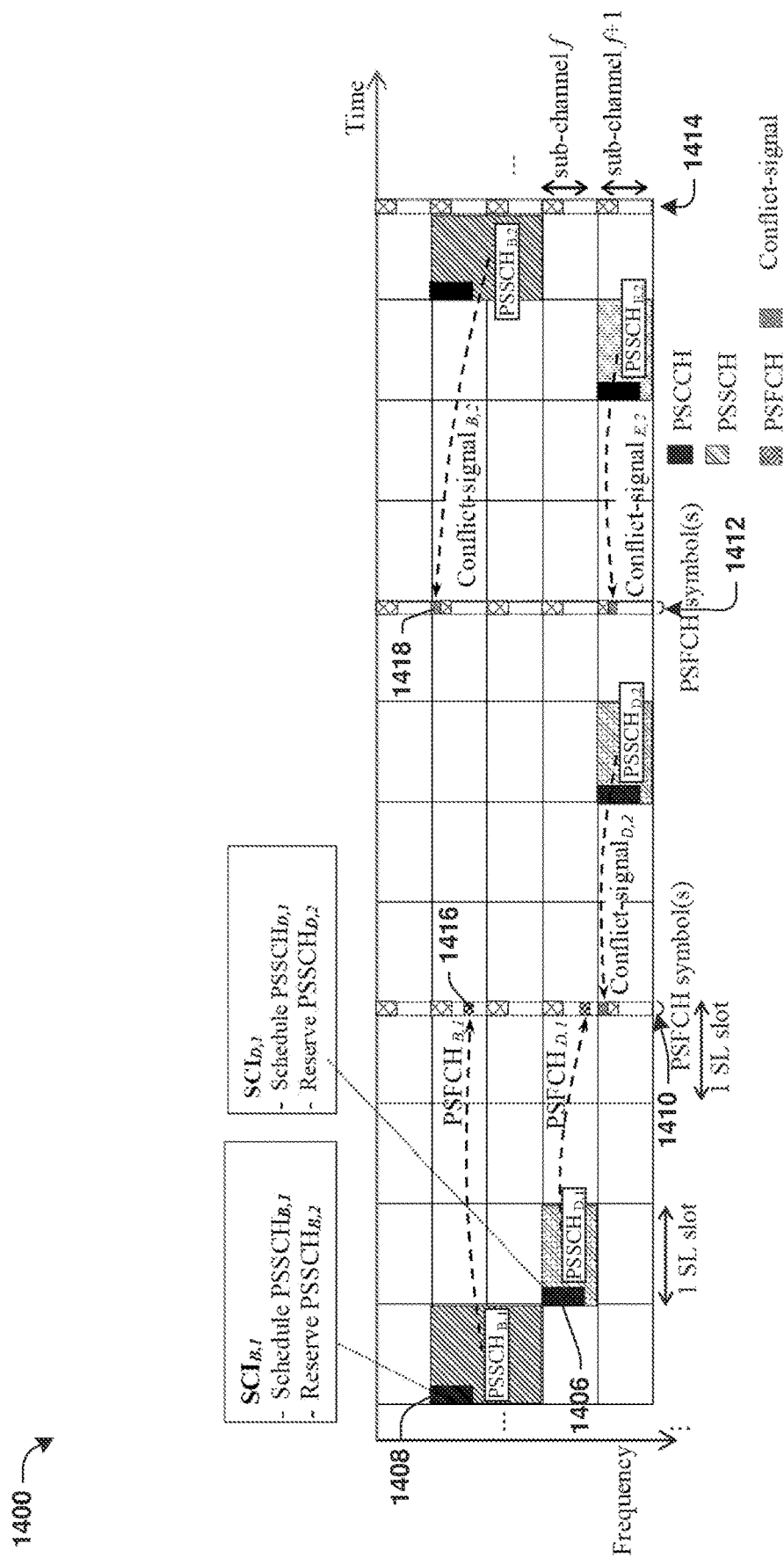
FIG. 14 is a diagram illustrating an exemplary scenario associated with a sidelink resource pool according to one exemplary embodiment.
Figure 15:
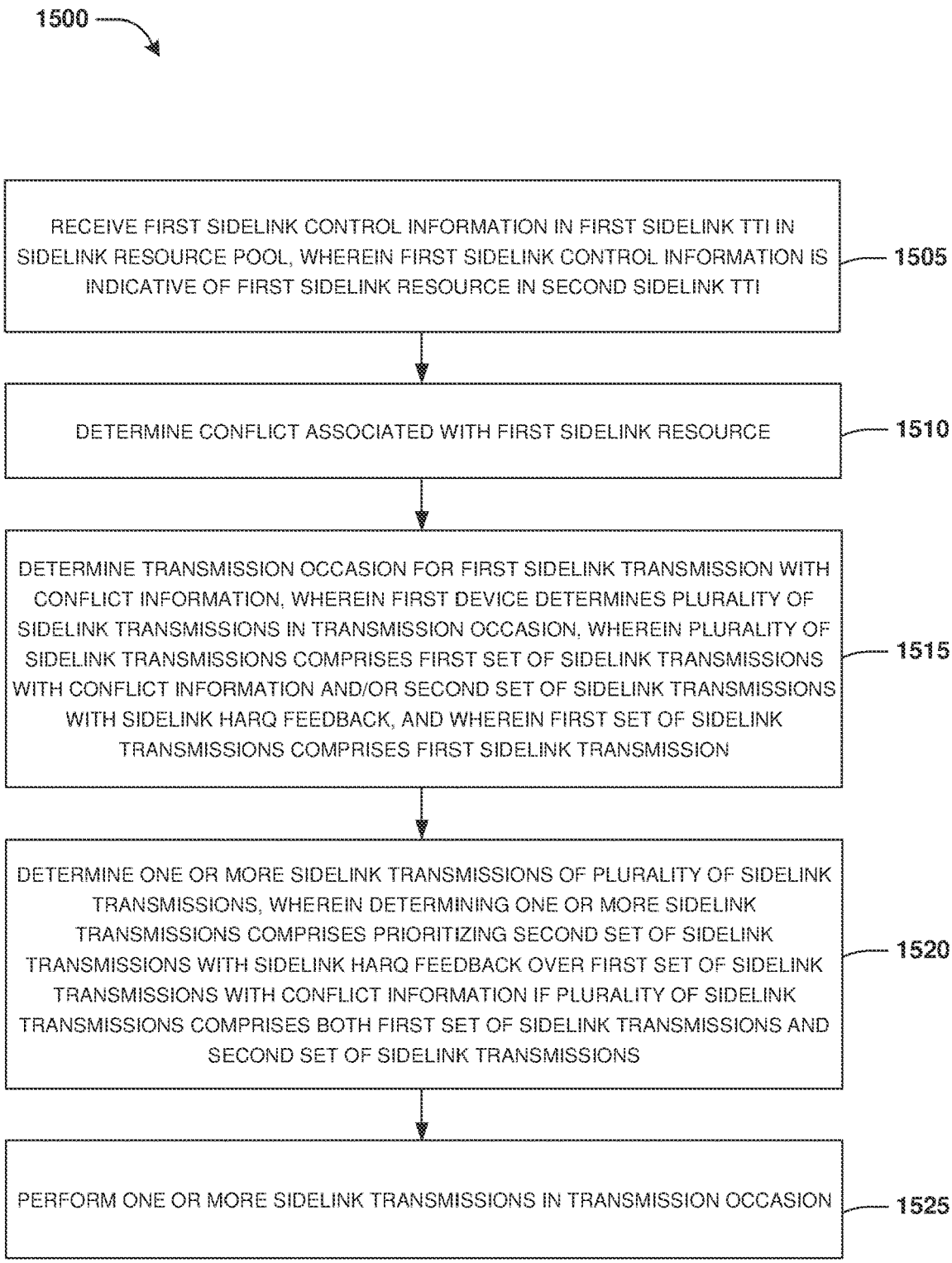
FIG. 15 is a flow chart according to one exemplary embodiment.
Figure 16:
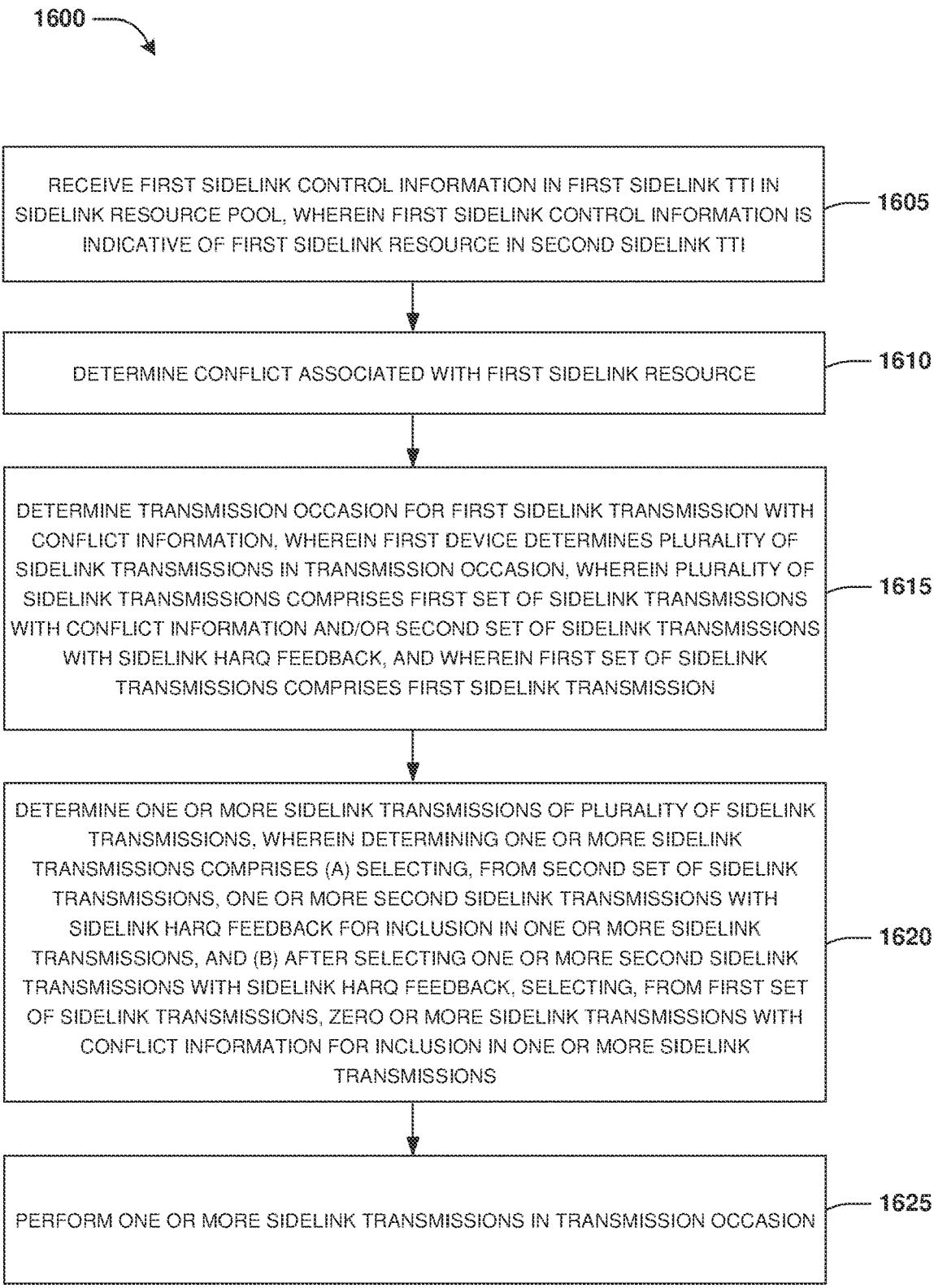
FIG. 16 is a flow chart according to one exemplary embodiment.

R1-2107038 discusses sidelink mode 2 enhancement. Notably, FIG. 13 of R1-2107038, entitled "Scheme 2 with expected conflict indication", is reproduced herein as FIG. 6. FIG. 14 of R1-2107038, entitled "ACK transmitted before coordination information", is reproduced herein as FIG. 7. FIG. 15 of R1-2107038, entitled "No conflict between UE B and ACKed UE C", is reproduced herein as FIG. 8. FIG. 16 of R1-2107038, entitled "Re-selection before the timing of coordination information", is reproduced herein as FIG. 9. One or more parts of R1-2107038 are quoted below:

FIG. 2: Scheme 2 with Expected Conflict Indication

For Scheme 2, UE A can also signal expected conflict to UE B, or signal re-selection indication to UE B. One use case is shown in FIG. 13. UE A identifies that the reserved resources by UE B and UE C will collide with each other in future. This can happen due to the hidden-node problem where UE B cannot receive the SCI transmitted by UE C, and thus cannot avoid the collision by its own sensing. However, UE A can receive from both UE B and UE C thus identifying the potential collision. After identifying the problem, UE A can notify UE B to perform resource re-selection via PSFCH. To distinguish from PSFCH conveying ACK/NACK, separate PSFCH resources can be used to convey the re-selection indication. By reusing the NACK-only mechanism in groupcast with HARQ option 1, re-selection indications from more than one UE A can be superposed on the same PSFCH resource. Also, PSFCH resources can be configured for all the cast types to convey the re-selection indication.
Proposal 19 Scheme 2 with expected conflict indication is supported to solve the hidden-node problem.
 If UE A identifies that the resources reserved by UE B and UE C will collide with each other, it notifies UE B via PSFCH to perform resource re-selection.
Proposal 20 Scheme 2 with expected conflict indication can be supported for any cast type.
The Condition for UE to be UE A
For Scheme 2 with either retransmission indication or re-selection indication transmitted, at least the RX UE of UE B can be UE A, and thus transmits the retransmission indication or re-selection indication. As an example, for groupcast with HARQ option 1, groupcast RX UE can identify that UE B and UE C simultaneously transmit to the same group by identifying the group destination ID in the $2^{nd}$ stage SCI. In other words, RX UE can know that the half-duplex problem happens to UE B and UE C. Therefore, RX UE can be UE A and transmits the retransmission indications to UE B and UE C respectively. As another example, based on sensing, RX UE can know that its reception from UE B will be interfered by UE C in future. Then RX UE can be UE A and transmits the re-selection indication to UE B such that UE B can avoid the collision.
Proposal 21 For Scheme 2, it is at least supported that the RX UE of UE B is UE A.
For Scheme 2 with expected conflict indication, only under some conditions, a non-RX UE of UE B can be UE A, and transmits the re-selection indication to UE B. It is necessary to have some restrictions to guarantee that the observed collision will actually affect the reception. Consider a case where a UE is not the receiver of UE B or UE C. Even if the UE has observed the potential collision between UE B and UE C, the collision may not result in any decoding failure if the receivers of UE B and UE C are far from each other. This is because that the estimation at the UE does not accurately reflect the interference experienced by the receiver. In this case, the UE should not be UE A since there is no need to do any resource re-selection. However, if the UE is not the receiver of UE B but is the receiver of UE C, then the observed collision will have a real impact on the reception. In this case, the UE can be UE A and transmits the re-selection indication to UE B. Therefore, a non-RX UE of UE B can transmit re-selection indication to UE B only if some conditions are met.
Proposal 22 For Scheme 2 with expected conflict indication, a non-RX UE of UE B can be UE A if the following conditions are satisfied.
 The UE has identified the potential collision between UE B and UE C.
 The UE is not the RX UE of UE B, but is the RX UE of UE C.
The Signalling of the Coordination Information
As aforementioned, PSFCH can be used to convey retransmission indication or re-selection indication. For PSFCH conveying ACK/NACK, Rel-16 V2X has defined the priority of PSFCH. The purpose is to determine the prioritization rule when a UE needs to simultaneously transmit (or simultaneously transmit and receive) PSFCH and UL, PSFCH and PSFCH etc. If PSFCH is used to convey the coordination information, the priority of PSFCH should also be specified to handle the related prioritization.
For Scheme 2 with expected conflict indication, the priority of PSFCH can be determined as the highest priority of the PSSCHs having the conflict. This can be illustrated by using FIG. 13. It is assumed that PSFCH is transmitted to lower-priority UE B in order to avoid the conflict between UE B and UE C. Conceptually, this is similar with pre-emption in the sense that lower-priority UE B performs re-selection to protect UE C which has a higher priority. Since the coordination information is for guaranteeing the successful transmission of UE C, the priority of the coordination information should follow the priority of UE C's PSSCH.
For Scheme 2 with detected conflict indication, the coordination information is for triggering re-transmission and thus is utilized as if it was NACK. In this sense, the priority of the coordination information should be determined in the same way as that of NACK.
Proposal 23 For Scheme 2, it should be supported that PSFCH is used to convey the coordination information.
Proposal 24 For Scheme 2 with expected conflict indication, the priority of the coordination information is the highest priority of the PSSCHs having the expected conflict. For Scheme 2 with detected conflict indication, the priority of the coordination information is the priority of PSFCH conveying NACK.
UE-A Behaviour to Transmit the Coordination Information FIG. 3: ACK Transmitted Before Coordination Information For Scheme 2 with expected conflict indication, generally UE A transmits the coordination information to UE B when identifying the future conflict. However, if UE A has reported ACK to UE B before, it can skip transmitting the coordination information. Even if PSFCH is used to convey the coordination information, the timing of the coordination information can be different from that of PSFCH conveying HARQ-ACK. This is because that HARQ-ACK timing is determined w.r.t. the prior-transmission, but the timing of the coordination information can be determined w.r.t. the reserved resource in future. This is illustrated in FIG. 14 where the PSFCH slot conveying the coordination information is immediately before the pre-emption checking slot m-T₃, and the PSFCH slot conveying ACK is the first PSFCH slot after UE B's "blue" transmission. Therefore, it is possible that UE A transmits ACK before transmitting the coordination information to UE B. Since the ACKed UE B will not perform re-transmission, UE A does not need to transmit the coordination to indicate the conflict of the re-transmission. However, if ACK is dropped due to prioritization, UE B will still perform retransmission. In this case, UE A needs to transmit the coordination information.

Proposal 25 For Scheme 2 with expected conflict indication, once identifying the expected conflict, UE A transmits the coordination information to UE B, except when UE A has transmitted ACK to UE B for the same TB before.

For Scheme 2 with expected conflict indication, it would be beneficial for UE B to know whether the coordination information is from its intended receivers or not. For example, it can resolve the ambiguity which occurrs when UE B receives both ACK and the coordination information in groupcast with HARQ option 1. More specifically, consider the following two cases for groupcast with HARQ option 1.

Case 1: A group member does not transmit NACK due to prioritization and transmits the coordination information. The other group members indicate ACK and do not transmit the coordination information.

Case 2: All the group members indicate ACK and do not transmit the coordination information. Some UEs other than the group members transmit the coordination information.

In Case 1, the group member who drops NACK will transmit the coordination information. In Case 2, the UEs other than the group members transmit the coordination information. Ideally, UE B should perform resource re-selection for Case 1, but not perform resource re-selection for Case 2. However, in both cases, UE B will receive ACK and the coordination information. With the same observations, UE B cannot distinguish these two cases. To resolve this ambiguity, separate PSFCH resources can be allocated to RX UE (intended receiver) and non-RX UE. If UE A is the intended receiver of UE B, UE A transmits the coordination information on the 1st PSFCH resource. Otherwise, UE A transmits the coordination information on the 2nd PSFCH resource. By this way, UE B can know whether the coordination information is from the intended receivers or not, and thus distinguish Case 1 and Case 2. If UE B receives the coordination information from its intended receivers (Case 1), it will perform resource re-selection regardless of ACK/NACK. Otherwise, if UE B receives the coordination information from UEs other than its intended receivers and ACK (Case 2), it will not perform resource re-selection.

Proposal 26 For Scheme 2 with expected conflict indication, if UE A is the intended receiver of UE B, UE A transmits the coordination information on the $1^{st}$ PSFCH resource; Otherwise, UE A transmits the coordination information on the $2^{nd}$ PSFCH resource.

FIG. 4: No Conflict Between UE B and ACKed UE C

For Scheme 2 with expected conflict indication, it is not desirable to trigger too many re-selections since re-selection may also lead to conflict. At least under the following circumstances, UE A does not consider the overlap of the reserved resources as an expected conflict and thus not transmitting the coordination information to UE B. An example is shown in FIG. 15. If UE A has sent ACK to UE C, it will consider the resource reserved by UE C has been released and thus will not conflict with the resource reserved by UE B. In this case, UE A does not need to transmit the coordination information to UE B. As another example, UE A may not transmit the coordination information to UE B if the overlapping part between UE B and UE C is relatively small in terms of the time-frequency resource size.

Proposal 27 For Scheme 2 with expected conflict indication, even if the overlapping of the reserved resources by UE B and UE C is identified, UE A does not consider it as an expected conflict at least when
    UE A has transmitted ACK to UE C, or
    The size of the overlapping part is smaller than a certain threshold.

For Scheme 2 with expected conflict indication, when identifying an expected collision between UE B and UE C, UE A determines whether UE B or UE C the coordination information is transmitted to. Furthermore, UE A should follow a pre-defined rule to avoid triggering re-selection at both UE B and UE C sides. For example, UE A transmits the coordination information to the UE with the lower priority. This is aligned with the principle of pre-emption where the low-priority UE performs re-selection to avoid interfering with the high-priority UE. Especially, if the priorities of UE B and UE C are the same, a tie-breaking rule is also needed to prevent that some UEs transmit the coordination information to UE B and some other UEs transmit the coordination to UE C.

Proposal 28 For Scheme 2 with expected conflict indication, UE A follows a pre-defined rule to determine whether UE B or UE C the coordination information is transmitted to.

Figure 7:
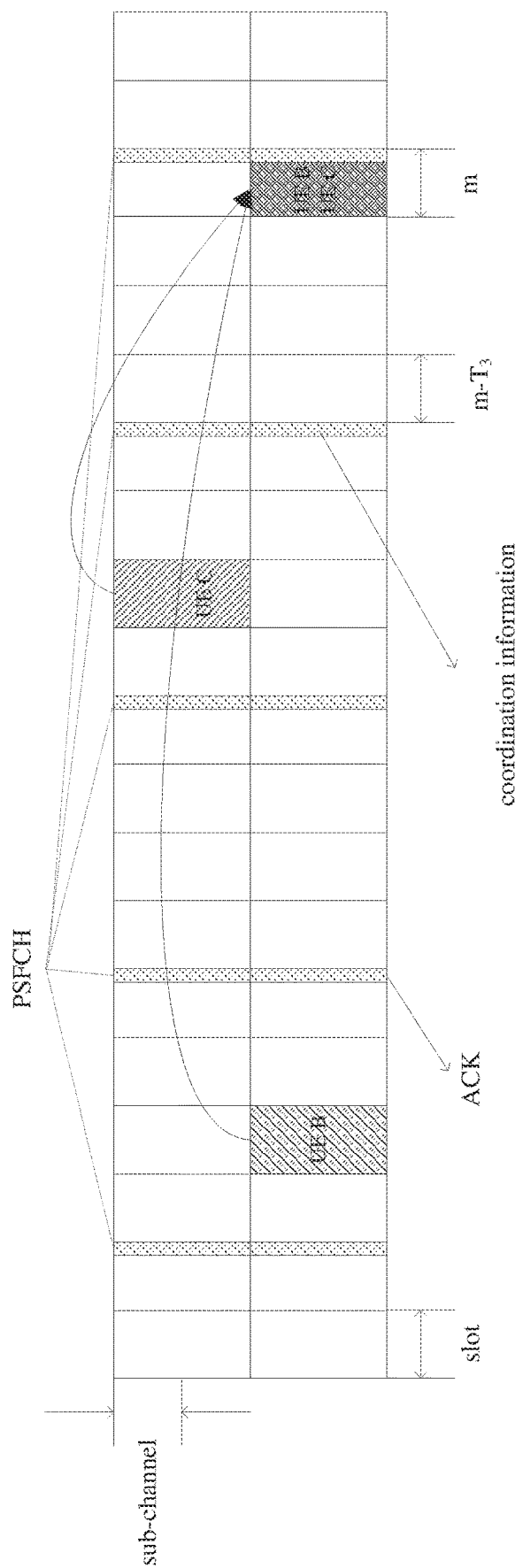
FIG. 7 is a diagram illustrating an exemplary scenario associated with an Acknowledgment (ACK) being transmitted before coordination information according to one exemplary embodiment.
Figure 8:
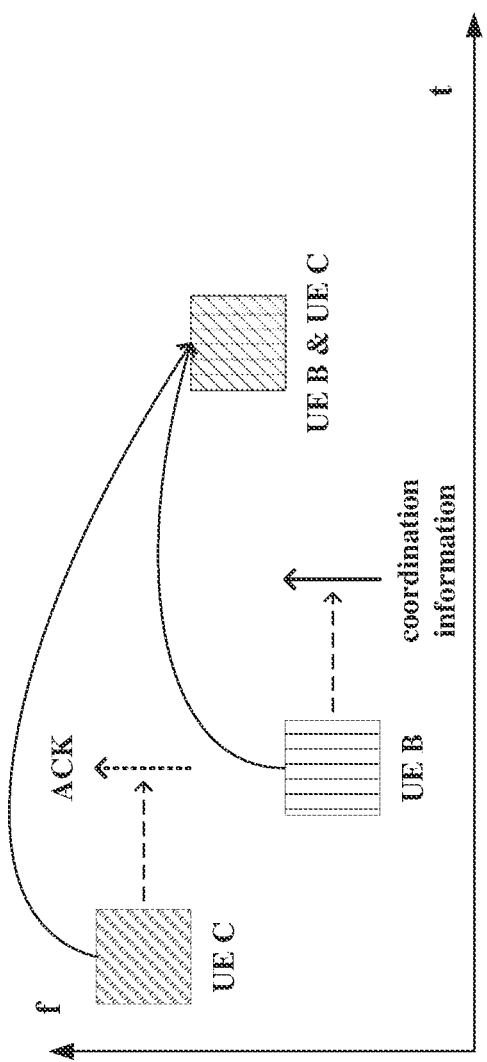
FIG. 8 is a diagram illustrating an exemplary scenario associated with there being no conflict between UEs according to one exemplary embodiment.
Figure 9:
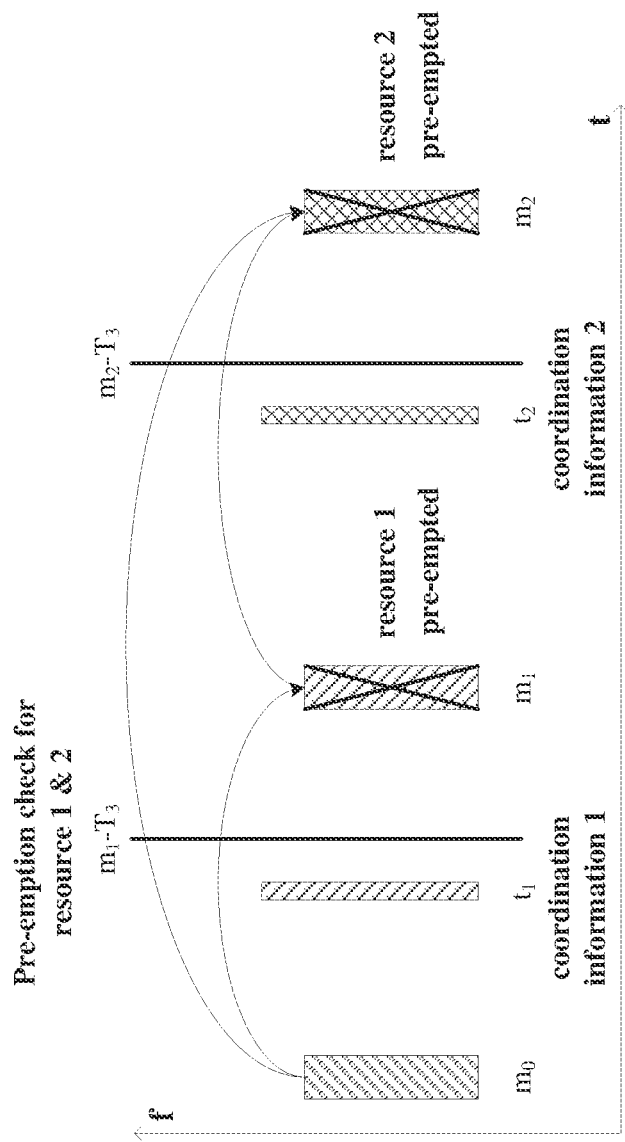
FIG. 9 is a diagram illustrating an exemplary scenario associated with performing a re-selection before timing of coordination information according to one exemplary embodiment.
Figure 10:
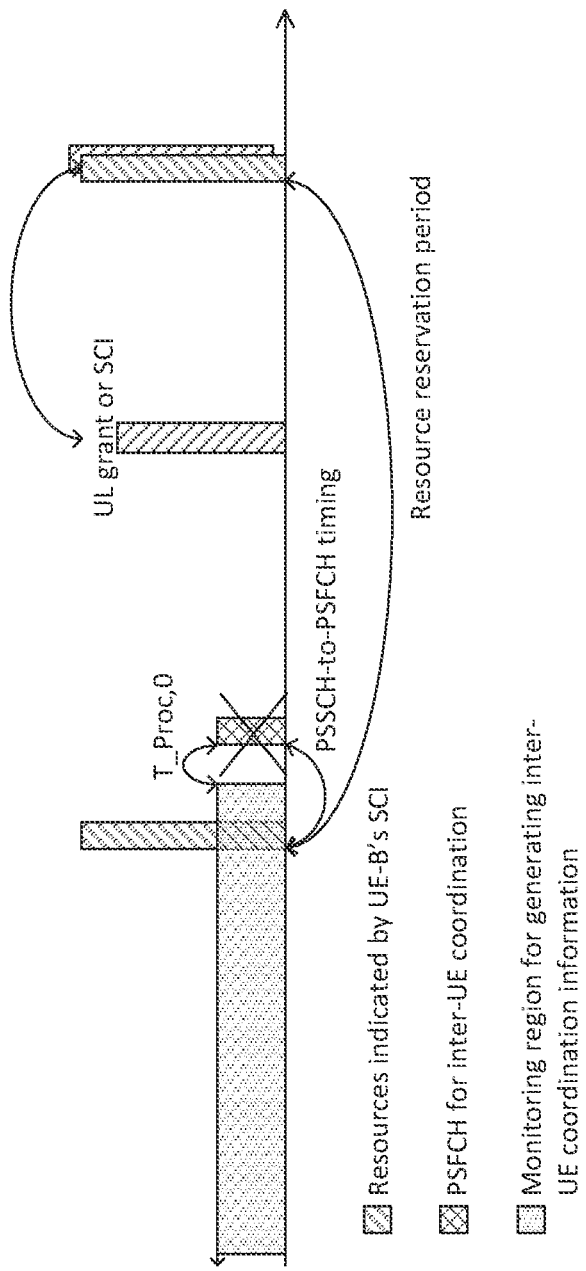
FIG. 10 is a diagram illustrating an exemplary scenario associated with inter-UE coordination according to one exemplary embodiment.
Figure 11:
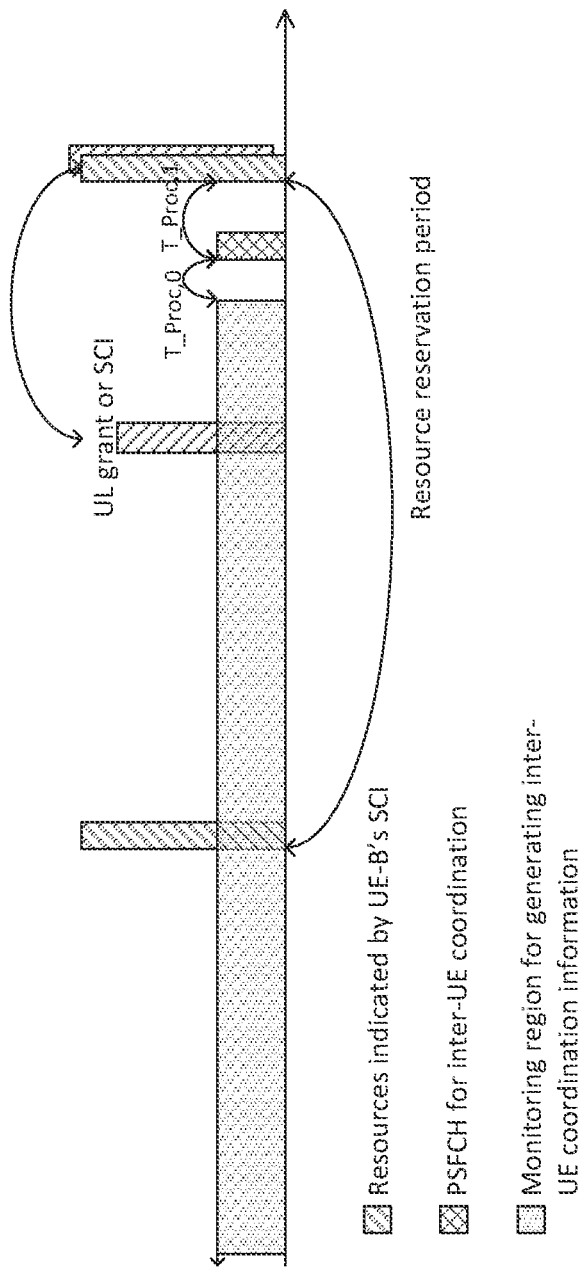
FIG. 11 is a diagram illustrating an exemplary scenario associated with inter-UE coordination according to one exemplary embodiment.

R1-2107529 discusses sidelink mode 2 enhancement. Notably, FIG. 7 of R1-2107529, entitled "Example of timeline of the inter-UE coordination in Scheme 2", is reproduced herein as FIG. 10. FIG. 8 of R1-2107529, entitled "Example of timeline of the inter-UE coordination in Scheme 2", is reproduced herein as FIG. 11.

Since UE-A may not know how UE-B will use its next reserved resources and UE-B may not know which UE transmits the coordination information, it can be considered that UE-A indicates UE-A's assumption to determine the existence of the potential resource conflict on the resources indicated by UE-B's SCI. In this case, UE-B can decide whether or how to use the received coordination information depending on how the UE-B will use its next reserved resources.

Proposal 9: For Scheme 2, UE-A indicates following status separately:
    Resource collision is predicted on the resource(s) indicated by UE-B's SCI
    Half-duplex problem is predicted on the resource(s) indicated by UE-B's SCI
    UE-A assumes that the UE-B will use the same set of source ID/destination ID/HARQ-ACK feedback option for the reserved resource(s) to determine the resource conflict To determine half-duplex problem, the UE-A needs to successfully decode all the 1st and 2nd SCI and TBs associated with the resource conflict. In this case, the UE-A can decide whether the UE-A sends the resource conflict indication based on the L2-source IDs and L2-destination IDs.

For the resource collision, the UE-A needs to transmit the resource conflict indication only if the overlapping PSSCH transmissions are really problematic at the RX UE side. In this case, it can be considered that the UE-A measures RSRP based on the DMRS of the overlapping PSSCHs and compares the RSRP values to decide whether the potential resource collision needs to be informed to the UE-B or not.

For instance, if PSSCH #1 and PSSCH #2 are overlapping each other, and if their RSRP measurements at the UE-A side are comparable, it would be expected that the overlapping PSSCHs suffer from high interference each other. Meanwhile, if the portion of the overlapping resources is small, the RX UE may successfully decode the TB. In this case, the UE-A may not need to transmit the resource conflict indication to the UE-B. Considering pre-emption mechanism, it can be considered that UE-A only indicates pre-emption occurrence at UE-B side.

When we consider distance-based operation (i.e. groupcast PSSCH scheduled by a SCI format 2-B), distance between UE-A and UE-B or distance between UEs associated with the resource conflict could be used for the condition of sending coordination information. For instance, the UE-A is selected among UEs of which location is within the communication range requirement from each UE associated with the resource conflict. It will reduce the number of UEs transmitting the coordination information for the same resource conflict. For the distance between UEs associated with the resource conflict, when one of the UEs is located outside the communication range requirement from another UE associated with the resource conflict, the UE-A does not need to transmit resource conflict indication as shown in FIG. 6. The UE-A could estimate the distance between UEs based on the Zone ID in the received SCI format 2-B from these UEs. According to evaluation results in [3], resource conflict indication outperforms over Rel-16 mode 2 RA especially for the short distance between TX UE and RX UE. In this point of view, in Scheme 2, it can be considered that the UE-A can send the coordination information if the indicated communication range requirement(s) associated with the resource conflict are small enough.

[ . . . ]

For Scheme 2, it can be considered to reuse a PSFCH format for indicating the existence of resource conflict on the resources indicated by UE-B's SCI. In the perspective of UE-B, it would be beneficial to distinguish SL HARQ-ACK feedback and the coordination information in Scheme 2. To be specific, when the UE-B receives ACK from the RX UE, the UE-B will not perform retransmission or resource (re) selection for the same TB even though the UE-B receives the coordination information in Scheme 2.

When the coordination information is transmitted on slot n, UE-A can only considers factors that can cause resource conflict before the slot n-T_proc,0. In this case, if the time gap between the coordination information signaling occasion and the resources with resource conflict is large, the benefit of using Scheme 2 would be limited. To be specific, if the PSFCH determination rule for SL HARQ-ACK feedback is directly reused for Scheme 2, UE-A may not use scheduled UL resources of UE-A and/or SCI or another coordination information received after the coordination information transmission occasion as shown in FIG. 7. Even for SCI reception, it is not always guaranteed that the UE transmitting later SCI (green color) is capable of receiving the coordination information. Considering that the resource reservation period could be few hundreds of msec, this approach will not fully cover resource conflicts caused by aperiodic UL or SL transmission(s).

FIG. 7: Example of Timeline of the Inter-UE Coordination in Scheme 2

To mitigate this inefficiency, it can be considered that the coordination information for a resource indicated by UE-B's SCI is located near the resource itself rather than the location of the SCI providing the information about the reserved resource. Considering specification work load, it can be considered to reuse the PSFCH resource determination rule for SL HARQ-ACK feedback except that the applying order in time domain is reverse, and the minimum time gap between PSFCH-to-PSSCH can be large. To be specific, for a given resource with potential resource conflict, its associated PSFCH resource for the coordination information will be located in the most recent PSFCH occasion K slots before the resource with potential resource conflict as shown in FIG. 8. Considering processing time for re-evaluation/pre-emption checking, the minimum time gap between the coordination information transmission occasion and the resource with potential/expected resource conflict will be T_3 or T_proc,1. In this approach, the UE-A can use all the resource conflict factor such as SCI or UL grant or another coordination information known to the UE-A T_proc,0+ T_proc,1 slots before the resource with potential/expected resource conflict as shown in FIG. 8.

FIG. 8: Example of Timeline of the Inter-UE Coordination in Scheme 2

As mentioned in previous section, since UE-A may not know how UE-B will use its next reserved resources, UE-A needs to indicates UE-A's assumption to determine the existence of the potential resource conflict on the resources indicated by UE-B's SCI. In this case, depending on UE-A's assumption, different PSFCH resource and/or different PSFCH state could be used for the inter-UE coordination information in Scheme 2.

Proposal 12: For the container of coordination information in Scheme 2, support PSFCH format.
    PSFCH resource set is separately configured for PSFCH resource set for SL HARQ-ACK feedback
    PSFCH timing is derived from the resources with potential/expected resource conflict
        Apply implicit PSFCH resource determination rule with time-reverse order
        Minimum PSFCH-to-PSSCH timing K is replaced with the processing time budget T_3
    Different PSFCH resource and/or PSFCH state (i.e. m_CS) are used to indicate the type of resource conflict (e.g. half-duplex or resource collision problem)

One, some and/or all of the following terminology and assumptions may be used hereafter.
    Base station (BS): a network central unit and/or a network node in New Radio (NR) that is used to control one or more Transmission and/or Reception Points (TRPs) which are associated with one or more cells. Communication between a base station and one or more TRPs may be via fronthaul. Base station may be referred to as central unit (CU), eNB, gNB, and/or NodeB.
    Cell: a cell comprises one or more associated TRPs (e.g., coverage of the cell may comprise coverage of some and/or all associated TRP(s)). One cell may be controlled by one base station. Cell may be referred to as TRP group (TRPG).
    Slot: a slot is a scheduling unit in NR. A slot duration (e.g., a duration of a slot) may be 14 Orthogonal Frequency Division Multiplexing (OFDM) symbols.
    Mini-slot: a scheduling unit with a duration less than a duration of a slot (e.g., a scheduling unit having a duration that is less than 14 OFDM symbols).
    For NR Release 16 (NR Rel-16) sidelink transmission, there are at least two sidelink resource allocation modes defined for NR Vehicle-to-Everything (NR-V2X) sidelink communication such as discussed in a 3rd Generation Partnership Project (3GPP) 3GPP Technical Specification (TS) (3GPP TS 38.214 V16.6.0): (i) in mode 1 (e.g., NR sidelink resource allocation mode 1), a base station (e.g., a network node) can schedule one or more sidelink transmission resources to be used by a transmitter User Equipment (UE) (TX UE) for one or more sidelink transmissions, and/or (ii) in mode 2 (e.g., NR sidelink resource allocation mode 1), a TX UE determines (e.g., a base station does not schedule) one or more sidelink transmission resources within a sidelink resource pool, wherein the sidelink resource pool is configured by a base station (e.g., network node) and/or is pre-configured.

For network scheduling mode (e.g. NR sidelink resource allocation mode 1), the network node may transmit a sidelink (SL) grant on Uu interface for scheduling resources of Physical Sidelink Control Channel (PSCCH) and/or Physical Sidelink Shared Channel (PSSCH). In response to receiving the sidelink grant, the TX UE may perform PSCCH transmissions and/or PSSCH transmissions on PC5 interface. The Uu interface corresponds to a wireless interface for communication between network and the TX UE. The PC5 interface corresponds to a wireless interface for communication between (e.g., directly between) UEs and/or devices.

For UE selection mode (e.g. NR sidelink resource allocation mode 2), since transmission resources are not scheduled by a network, the TX UE may be required to perform sensing before selecting a resource for transmission (e.g., the TX UE may perform sensing-based transmission) in order to avoid resource collision and interference with (e.g., from or to) other UEs. Full sensing is supported in NR Rel-16 sidelink. Partial sensing is studied and designed for support in NR Rel-17 sidelink. When sensing-based resource selection is triggered (and/or requested) in slot n, the UE can determine a valid/identified resource set based on sensing results (e.g., the valid/identified resource set may be a resource set that is identified by the UE and/or determined to be valid by the UE). The valid/identified resource set may be reported to higher layers (e.g., higher layers of the TX UE, such as MAC layer of the TX UE). The TX UE (e.g., the higher layers of the TX UE) may select (e.g., randomly select) one or more valid/identified resources from the valid/identified resource set. The TX UE may utilized the one or more valid/identified resources to perform one or more sidelink transmissions. The one or more sidelink transmissions from the TX UE may comprise PSCCH transmission and/or PSSCH transmission.

For NR Rel-16 sidelink, Physical Sidelink Feedback Channel (PSFCH) is designed and/or utilized for transmitting sidelink Hybrid Automatic Repeat Request-Acknowledgement (HARQ-ACK) feedback. For a sidelink resource pool, PSFCH resources may be configured (e.g., pre-configured) periodically with a period of N sidelink slots associated with the sidelink resource pool. Accordingly, PSCCH/PSSCH transmissions in N contiguous (e.g., consecutive) sidelink slots may be associated with PSFCH resources in a same slot. In the present disclosure, the term "PSCCH/PSSCH transmissions" may refer to transmissions comprising one or more PSCCH transmissions and/or one or more PSSCH transmissions. The association (e.g., timing association) between the PSCCH/PSSCH transmissions and the PSFCH resources may be determined (e.g., derived) based on (e.g., considering) a minimum time gap of K slots. The value of K may be configured for the sidelink resource pool. The K slots may be relevant to requirement process time comprising PSCCH/PSSCH reception and decoding and PSFCH generation. In the present disclosure, the term "PSCCH/PSSCH reception" may refer to one or more receptions comprising one or more PSCCH receptions and/or or one or more PSSCH receptions. For separate PSCCH/PSSCH transmissions in different sidelink slots, if PSFCH resources associated with the separate PSCCH/PSSCH transmissions are in the same slot, the associated PSFCH resources may be frequency-division multiplexed (FDMed) resources. For separate PSCCH/PSSCH transmissions with different starting sub-channels in the same sidelink slot, if PSFCH resources associated with the separate PSCCH/PSSCH transmissions are in the same slot, the associated PSFCH resources may be FDMed resources. For separate PSSCH transmissions with non-overlapped sub-channels in the same sidelink slot, if PSFCH resources associated with the separate PSCCH/PSSCH transmissions are in the same slot, the associated PSFCH resources may be FDMed resources. In some examples, for a PSCCH/PSSCH transmission, one or more PSFCH resources can be determined (e.g., derived) based on a starting sub-channel or one or more full sub-channels of an associated PSSCH transmission and a sidelink slot of an associated PSCCH/PSSCH transmission. A receiver UE receiving the PSCCH/PSSCH transmission may determine (e.g., derive) a PSFCH resource, from the one or more PSFCH resources, for transmitting sidelink HARQ-ACK feedback associated with the PSCCH/PSSCH transmission.

Figure 12:
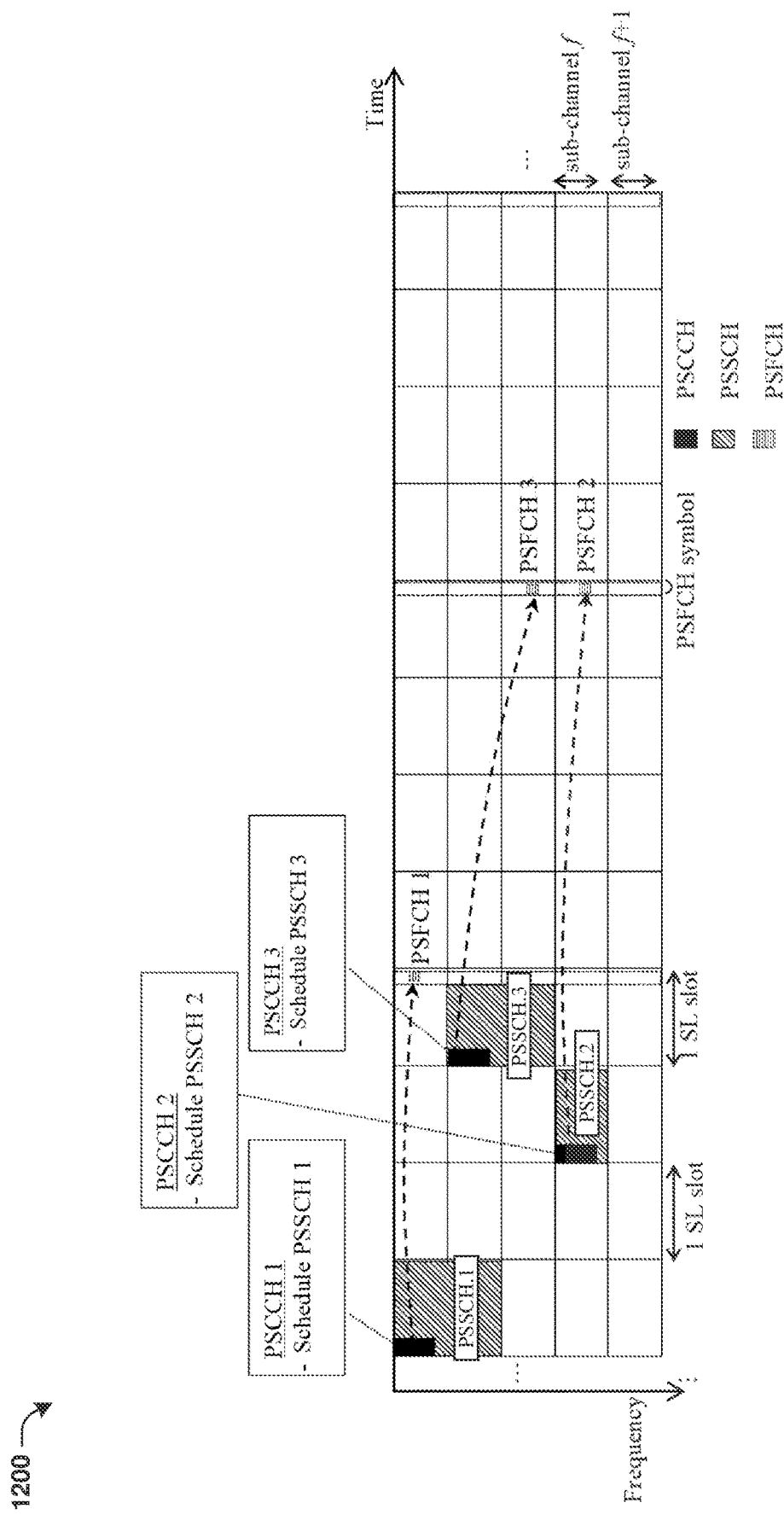
FIG. 12 is a diagram illustrating an exemplary scenario associated with Physical Sidelink Shared Channel (PSSCH) transmissions according to one exemplary embodiment.

FIG. 12 illustrates an example scenario 1200 associated with PSSCH transmissions comprising PSSCH 1, PSSCH 2, and PSSCH 3. For each of the PSSCH transmissions, an associated PSCCH schedules a PSSCH resource of the PSSCH transmission, and one or more PSFCH resources associated with the PSSCH transmission can be determined (e.g., derived) based on a starting sub-channel of the PSSCH transmission, one or more full sub-channels of the PSSCH transmission, a sidelink slot of a PSCCH resource of the PSCCH transmission and/or a sidelink slot of a PSSCH resource of the PSSCH transmission. For example, PSCCH 1 schedules a resource of PSSCH 1, and a resource of PSFCH 1 is associated with a resource of PSSCH 1 and/or a resource of PSCCH 1 (e.g., the resource of PSFCH 1 is based on the resource of PSSCH 1 and/or the resource of PSCCH 1). Alternatively and/or additionally, PSCCH 2 schedules a resource of PSSCH 2, and a resource of PSFCH 2 is associated with a resource of PSSCH 2 and/or a resource of PSCCH 2 (e.g., the resource of PSFCH 2 is based on the resource of PSSCH 2 and/or the resource of PSCCH 2). Alternatively and/or additionally, PSCCH 3 schedules a resource of PSSCH 3, and a resource of PSFCH 3 is associated with a resource of PSSCH 3 and/or a resource of PSCCH 3 (e.g., the resource of PSFCH 3 is based on the resource of PSSCH 3 and/or the resource of PSCCH 3). In some examples, the PSSCH 1 is transmitted from a transmitting device for delivering a data packet. A receiving device may receive the PSSCH 1 for acquiring the data packet from the transmitting device. The PSSCH 1 may be indicated as sidelink HARQ-ACK enabled (e.g., the PSSCH 1 may indicate that sidelink HARQ-ACK is enabled for transmitting feedback based on the PSSCH 1). The receiving device may transmit sidelink HARQ-ACK feedback, via the PSFCH 1, to the transmitting device to indicate whether or not the data packet is decoded successfully. The transmitting device may perform sidelink retransmission for delivering the same data packet if the transmitting device detects/ receives the sidelink HARQ-ACK feedback as Negative Acknowledgement (NACK) and/or Discontinuous Transmission (DTX) (e.g., the transmitting device may perform sidelink retransmission for delivering the same data packet if the sidelink HARQ-ACK feedback is indicative of NACK and/or DTX). The transmitting device may not perform sidelink retransmission for delivering the same data packet if the transmitting device detects/receives the sidelink HARQ-ACK feedback as ACK (e.g., the transmitting device may not perform sidelink retransmission for delivering the same data packet if the sidelink HARQ-ACK feedback is indicative of ACK). In the present disclosure, the term "detects/receives" may refer to detects and/or receives.

The PSFCH transmit power (e.g., transmit power of a PSFCH transmission, such as PSFCH transmission with HARQ-ACK feedback) can be determined (e.g., derived) based on Downlink (DL) pathloss if dl-P0-PSFCH is provided, or determined based on maximum UE transmit power (noted as $P_{CMAX}$) if dl-P0-PSFCH is not provided. In some examples, for NR Rel-16 sidelink, transmit power derivation based on SL pathloss is not supported for PSFCH. Alternatively and/or additionally, a UE may be capable of transmitting a maximum of $N_{max,PSFCH}$ PSFCHs at the same time, e.g., UE may be capable of transmitting a maximum of $N_{max,PSFCH}$ PSFCHs in one PSFCH occasion/symbol. In the present disclosure, the term "occasion/symbol" may refer to an occasion and/or a symbol. In some examples, $N_{max,PSFCH}$ may be 4, 8, or 16 depending on UE transmission capability.

Based on 3GPP TS 38.213 V16.6.0, if the UE has $N_{sch,Tx,PSFCH}$ scheduled PSFCH transmissions in one PSFCH occasion, the UE will determine to transmit $N_{Tx,PSFCH}$ PSFCHs corresponding to the smallest $N_{Tx,PSFCH}$ priority field values indicated in Sidelink Control Information (SCI) formats 1-A (e.g., all SCI formats 1-A) associated with the PSFCH transmission occasion. Accordingly, a priority (e.g., a priority value) of a PSFCH transmission is associated with (e.g., determined based on and/or indicated by) a priority field value indicated in a SCI format 1-A, wherein the PSFCH transmission is associated with the SCI format 1-A. In some examples, the PSFCH transmission is utilized for transmitting sidelink HARQ-ACK feedback of a PSSCH reception scheduled by the SCI format 1-A. In some examples, the UE autonomously selects the $N_{TX,PSFCH}$ PSFCHs, from the $N_{sch,Tx,PSFCH}$ scheduled PSFCH transmissions, with ascending priority value order. For example, a smaller priority value may indicate a higher priority (e.g., priority value 1 corresponds to a highest priority while priority value 8 corresponds to a lowest priority). In some examples, $N_{TX,PSFCH}$ is smaller than or equal to $N_{max,PSFCH}$.

In some examples, in the one PSFCH occasion, the UE will transmit the $N_{Tx,PSFCH}$ PSFCHs with the same PSFCH transmit power (e.g., PSFCH transmit powers of the $N_{Tx,PSFCH}$ PSFCHs are equal to each other). If dl-P0-PSFCH is provided, transmit power of each PSFCH transmission (of the $N_{Tx,PSFCH}$ PSFCHs) may be determined to be min ($P_{CMAX}$−10 log$_{10}$($N_{Tx,PSFCH}$), $P_{PSFCH,one}$), wherein $P_{PSFCH,one}$ is a transmit power value determined (e.g., derived) based on DL pathloss. If dl-P0-PSFCH is not provided, transmit power of each PSFCH transmission (of the $N_{Tx,PSFCH}$ PSFCHs) may be determined to be $P_{CMAX}$−10 log$_{10}$($N_{Tx,PSFCH}$).

In one or more systems, a sidelink control information (SCI) can indicate/allocate/schedule at most three PSSCH resources for a first Transport Block (TB) (e.g., the same TB), e.g., via Frequency resource assignment field and Time resource assignment field in the SCI. In the present disclosure, the term "indicate/allocate/schedule" refers to indicate, allocate and/or schedule. A PSSCH resource (e.g., one PSSCH resource) of the at most three PSSCH resources is transmitted with the SCI in the same sidelink slot (e.g., the PSSCH resource and the SCI are transmitted in the same sidelink slot). The SCI may comprise a 1st stage SCI and a 2nd stage SCI. The 1st stage SCI may be transmitted via PSCCH. The 2nd stage SCI may be transmitted via multiplexing the 2nd stage SCI with the indicated/allocated/scheduled PSSCH in the same sidelink slot. In other words, in the one or more systems, the SCI can indicate/allocate/schedule at most two PSSCH resources, for the first TB, in later sidelink slots (e.g., sidelink slots after the sidelink slot in which the SCI is transmitted with the PSSCH resource).

Moreover, resource reservation for another TB by a SCI could be (pre-)configured with enabled or not enabled or not configured in a sidelink resource pool. When a sidelink resource pool is configured with the resource reservation for the second TB (and/or when the resource reservation is enabled for the sidelink resource pool), the sidelink resource pool is configured with a set of reservation period values. In an example, the set of reservation period values (e.g., a set of one or more reservation period values) may comprise 0 milliseconds, 1:99 milliseconds (e.g., a value in the range of at least 1 millisecond to at most 99 milliseconds, 100 milliseconds, 200 milliseconds, 300 milliseconds, 400 milliseconds, 500 milliseconds, 600 milliseconds, 700 milliseconds, 800 milliseconds, 900 milliseconds, and/or 1000 milliseconds. In some examples, a resource reservation period field in a SCI in the sidelink resource pool may indicate one or more reservation period values for one or more resource reservations (e.g., the resource reservation period field may be indicative of which reservation period value to use for a future resource reservation). In some examples, a size of the set of reservation period values (e.g., a number of values of the set of reservation period values) may be from 1 to 16 (e.g., the set of reservation period values may comprise at most 16 reservation period values).

FIG. 13 illustrates an example scenario 1300 associated with SCI indicative of one or more time resources and/or frequency resources of PSSCH. In the example scenario 1300, a $SCI_{1,1}$ (e.g., a 1st stage $SCI_{1,1}$) may indicate/allocate/schedule frequency resources (and time resources, for example) of $PSSCH_{1,1}$, wherein the $PSSCH_{1,1}$ is utilized for transmitting a TB1. In FIG. 13, PSCCH resources (for receiving SCIs, such as the $SCI_{1,1}$, for example) are shown as black-filled rectangles. The $SCI_{1,1}$ may also indicate/allocate/schedule time and frequency resources of $PSSCH_{1,2}$ and $PSSCH_{1,3}$, wherein the $PSSCH_{1,2}$ and $PSSCH_{1,3}$ are also utilized for transmitting the TB1. The $SCI_{1,1}$ (e.g., the 1st stage $SCI_{1,1}$) may indicate/allocate/schedule sidelink resources of $PSSCH_{1,1}$, $PSSCH_{1,2}$ and $PSSCH_{1,3}$ via a Frequency resource assignment field and/or a Time resource assignment field in the $SCI_{1,1}$. Alternatively and/or additionally, the $SCI_{1,1}$ may indicate a non-zero resource reservation period via a Resource reservation period field in the $SCI_{1,1}$. In the example scenario 1300, the $SCI_{1,1}$ may indicate and/or reserve time resources and/or frequency resources of $PSSCH_{2,1}$, wherein the $PSSCH_{2,1}$ may be utilized for transmitting a second TB, e.g., a TB2. In some examples, the sidelink resource of $PSSCH_{2,2}$ may be also indicated/reserved based on the sidelink resource of $PSSCH_{1,2}$ and the non-zero resource reservation period indicated by the $SCI_{1,1}$, such as where a duration between the sidelink resource of $PSSCH_{1,2}$ and the sidelink resource of $PSSCH_{2,2}$ is based on the non-zero resource reservation period. In the present disclosure, the term "indicated/reserved" may refer to indicated and/or reserved. In some examples, the sidelink resource of $PSSCH_{2,3}$ may be indicated/reserved based on the sidelink resource of $PSSCH_{1,3}$ and the non-zero resource reservation period indicated by the $SCI_{1,1}$. The $PSSCH_{2,2}$ and the $PSSCH_{2,3}$ may be utilized for transmitting the TB2. The sidelink resources of $PSSCH_{1,1}$, $PSSCH_{1,2}$, $PSSCH_{1,3}$, $PSSCH_{2,1}$, $PSSCH_{2,2}$ and $PSSCH_{2,3}$ may be in the same sidelink resource pool (e.g., the same sidelink transmission resource pool).

In some examples, a UE-B transmits the $SCI_{1,1}$ and the TB1. In some examples, the $SCI_{1,1}$ is transmitted via PSCCH 1302. It is possible that one or more sidelink resources indicated/reserved by $SCI_{1,1}$ (e.g., the one or more sidelink resources may comprise one or more sidelink resources of $PSSCH_{1,2}$, $PSSCH_{1,3}$, $PSSCH_{2,1}$, $PSSCH_{2,2}$ and/or $PSSCH_{2,3}$) have a resource conflict (e.g., an expected/potential resource conflict). In the present disclosure, the term "expected/potential" refers to expected and/or potential. Based on RAN1 #106-e meeting associated with RAN1 Chair's Notes of 3GPP TSG RAN WG1 #106-e, a UE-A may determine that (e.g., consider that) the resource conflict occurs on the one or more sidelink resources indicated/reserved by the $SCI_{1,1}$ of the UE-B (e.g., the UE-A may detect potential and/or expected occurrence of the resource conflict on the one or more sidelink resources indicated/reserved by the $SCI_{1,1}$ of the UE-B).

A first type of resource conflict (of the expected/potential resource conflict) is associated with the UE-A receiving/detecting a second SCI of a UE-C and determining (e.g., detecting) that one or more sidelink resources indicated/reserved by the second SCI of the UE-C are fully/partially overlapping, in time domain and frequency domain, with the one or more sidelink resources indicated/reserved by the $SCI_{1,1}$ of the UE-B. In the present disclosure, the term "receiving/detecting" refers to receiving and/or detecting. In the present disclosure, the term "fully/partially overlapping" refers to fully overlapping and/or partially overlapping. The second SCI may be transmitted (by the UE-C, for example) via PSCCH 1304. If the UE-B does not receive/detect one or more SCIs of the UE-C, the UE-B may perform one or more sidelink transmissions, to one or more one intended receiver UEs (e.g., one or more UEs that are intended recipients of the one or more sidelink transmissions), in the fully/partially overlapping sidelink resources (e.g., the fully/partially overlapping sidelink resources comprise the one or more sidelink resources indicated/reserved by the second SCI of the UE-C and the one or more sidelink resources indicated/reserved by the $SCI_{1,1}$ of the UE-B). An intended receiver UE of the UE-B (e.g., a UE of the one or more intended receiver UEs that are intended recipients of the one or more sidelink transmissions of the UE-B) may not decode (e.g., may not be able to decode) the sidelink transmission successfully due to interferences on the fully/partially overlapping sidelink resources. In some examples, for the first type of resource conflict, the UE-A may be the intended receiver UE of the UE-B (e.g., expected intended receiver UE of the UE-B, such as a UE that is expected to be an intended recipient of the one or more sidelink transmissions of the UE-B) or an intended receiver UE of the UE-C (e.g., expected intended receiver UE of the UE-C, such as a UE that is expected to be an intended recipient of one or more sidelink transmissions of the UE-C). In the present disclosure, if a first UE is an intended receiver UE of a second UE, the first UE may be an intended recipient of one or more transmissions of the second UE.

A second type of resource conflict (of the expected/potential resource conflict) is associated with a scenario in which the UE-A is an intended receiver UE (e.g., expected intended receiver UE) of the UE-B, the UE-A may not expect and/or determine to perform SL reception from the UE-B in a slot, wherein there is a sidelink resource (e.g., one sidelink resource) indicated/reserved by $SCI_{1,1}$ (e.g., the sidelink resource is indicated/reserved by $SCI_{1,1}$ to be in the slot). In some examples, the UE-A not determining (and/or not expecting) to perform SL reception from the UE-B in the slot is due, at least in part, to the UE-A expecting/determining to perform one or more transmissions (e.g., uplink and/or sidelink transmissions) in the slot. Since UE-A may not be able to simultaneously perform transmission and reception in a carrier frequency (e.g., the UE-A may not be able to simultaneously perform transmission and reception in the carrier frequency due to half-duplex restriction), the UE-A may determine that (e.g., consider that) there is a resource conflict (e.g., an expected and/or potential resource conflict) on the sidelink resource (e.g., the one sidelink resource) indicated/reserved by $SCI_{1,1}$.

The example scenario 1300 of FIG. 13 includes an instance of the first type of resource conflict and an instance of the second type of resource conflict. In some examples, to handle (e.g., avoid) an impact by an expected/potential resource conflict, it is supported that the UE-A may transmit information (e.g., an indication) indicating the expected/potential resource conflict to the UE-B (such as discussed in RAN1 Chair's Notes of 3GPP TSG RAN WG1 #106-e). Based on the information, the UE-B may determine (e.g., know) which reserved sidelink resource(s) will have the expected/potential resource conflict. For example, the information may notify the UE-B of one or more reserved sidelink resources that will have the expected/potential resource conflict.

When the UE-B determines (e.g., knows) presence of an expected/potential resource conflict of the first type, the UE-B may drop the overlapping sidelink resource (e.g., $PSSCH_{1,3}$ in FIG. 13) and may re-select one or more new sidelink resources (different than the overlapping sidelink resource) for transmission by the UE-B (e.g., transmission of TB1). The UE-B may determine presence of the expected/potential resource conflict of the first type based on reception of an indication of the expected/potential resource conflict from a UE (e.g., the UE-A). In the example scenario 1300 of FIG. 13, the overlapping sidelink resource is $PSSCH_{1,3}$ (e.g., $PSSCH_{1,3}$ overlaps with a PSSCH indicated/reserved by the second SCI of the UE-C). In an example, based on the determination (e.g., detection) of the expected/potential resource conflict of the first type associated with $PSSCH_{1,3}$, the UE-B may select a new sidelink resource (different than $PSSCH_{1,3}$) to use for performing the transmission of TB1.

When the UE-B determines (e.g., knows) presence of an expected/potential resource conflict of the second type, the UE-B may drop the conflicted sidelink resource (e.g., $PSSCH_{2,1}$ in FIG. 13) and may re-select one or more new sidelink resources for transmission by the UE-B (e.g., transmission of TB2). The UE-B may determine presence of the expected/potential resource conflict of the second type based on reception of an indication of the expected/potential resource conflict from a UE (e.g., the UE-A). In the example scenario 1300 of FIG. 13, the conflicted sidelink resource is $PSSCH_{2,1}$ (e.g., $PSSCH_{2,1}$ is in the same slot as a transmission, of the UE-A, in a PSSCH 1306). In an example, based on the determination (e.g., detection) of the expected/potential resource conflict of the second type associated with $PSSCH_{1,3}$, the UE-B may select a new sidelink resource (different than $PSSCH_{2,1}$) to use for performing the transmission of TB2.

Alternatively and/or additionally, when the UE-B determines (e.g., knows) presence of an expected/potential resource conflict of the second type, if the conflicted sidelink resource is utilized for transmitting TB2 to at least the UE-A (e.g., a UE that has a transmission in the same slot as the conflicted sidelink resource), the UE-B may drop the conflicted sidelink resource (e.g., $PSSCH_{2,1}$ in FIG. 13) and may re-select one or more new sidelink resources for transmission by the UE-B. If the conflicted sidelink resource is utilized for transmitting TB2 to one or more UEs that do not comprise the UE-A, the UE-B may still utilize the conflicted sidelink resource (e.g., $PSSCH_{2,1}$ in FIG. 13) for one or more transmissions of the UE-B. For example, the UE-B may utilize the conflicted sidelink resource because the TB1 and the TB2 may not be restricted for the same intended receiver UE.

In the present disclosure, a physical signaling for transmitting information (e.g., an indication) indicative of an expected/potential resource conflict (and/or indicative of presence of an expected/potential resource conflict) is denoted as a conflict-information signaling. In the present disclosure, the term "signaling" may refer to one or more signals. To transmit the conflict-information signaling, a PSFCH-like channel (e.g., a channel having one or more characteristics that are the same as or similar to one or more characteristics of PSFCH) may be used. As proposed in some contributions of R1-2106621, R1-2107038 and/or R1-2107529, the conflict-information signaling may have the same channel structure/format as PSFCH. In the present disclosure, the term "channel structure/format" may refer to channel structure and/or channel format. The conflict-information signaling may have the same channel structure/format as Physical Uplink Control Channel (PUCCH) format 0. In some examples, for a sidelink resource pool, resources of conflict-information signalings are FDMed from PSFCH resources. For example, for a sidelink resource pool, one or more Physical Resource Blocks (PRBs) utilized for conflict-information signalings are non-overlapped, orthogonal (e.g., orthogonal in frequency domain) and/or FDMed from PRBs utilized for PSFCH. In some examples, for a sidelink resource pool, resources of conflict-information signalings are in the same symbol(s) as PSFCH resources. In some examples, for a sidelink resource pool (and/or for a sidelink slot of the sidelink resource pool), resources of conflict-information signalings may utilize non-overlapped, orthogonal (e.g., orthogonal in time domain) and/or time-division multiplexed (TDMed) symbol(s) from one or more PSCCH/PSSCH resources. In the present disclosure, the term "PSCCH/PSSCH resources" may refer to resources comprising one or more PSCCH resources and/or one or more PSSCH resources.

In a first example scenario, a timing association between PSSCH and PSFCH may be used to implement a timing association between PSSCH and conflict-information signaling. For example, in the first example scenario, the timing association between PSSCH and conflict-information signaling may be implemented based on the timing association between PSSCH and PSFCH (e.g., the timing association between PSSCH and conflict-information signaling may be the same as the timing association between PSSCH and PSFCH). For example, when the UE-A receives a SCI, that schedules a PSSCH transmission in the same sidelink slot, from the UE-B, the UE-A may determine (e.g., derive) a PSFCH occasion (associated with the PSSCH transmission, for example) that is in an earliest slot that: (i) includes PSFCH resources, and (ii) is at least Kc slots of the sidelink resource pool after a last slot of the PSSCH reception. If the UE-A detects expected/potential resource conflict based on the SCI (e.g., if the UE-A detects presence of an expected/potential resource conflict based on the SCI), the UE-A may transmit a conflict-information signaling in a signaling occasion (e.g., a signaling occasion associated with the SCI), wherein the signaling occasion is in an earliest slot that: (i) includes conflict-information signaling resources, and (ii) is at least Kc slots of the sidelink resource pool after a last slot of the SCI and/or PSSCH reception. For example, in the first example scenario, for the SCI scheduling the PSSCH transmission, the associated PSFCH occasion may be the same as the associated signaling occasion (in which the UE-A may transmit conflict-information signaling, for example) (e.g., the associated PSFCH occasion and the associated signaling occasion may be in the same symbol(s) and/or in the same sidelink slot). However, in the first example scenario, the conflict-information signaling may need to comprise (e.g., carry) one or more bits of information for indicating which sidelink resource(s) indicated/reserved by the SCI have expected/potential resource conflict. Alternatively and/or additionally, if the UE-A detects presence of expected/potential resource conflict after the associated signaling occasion, the UE-A may not have a chance to indicate the presence (of an expected/potential resource conflict, for example) to the UE-B.

In a second example scenario, a signaling occasion for transmitting a conflict-information signaling may be associated with (e.g., determined based on, such as derived from) a conflicted sidelink resource. The UE-A may receive a SCI, that indicates/reserves a PSSCH resource in a later sidelink slot, from the UE-B. When the UE-A determines (e.g., derives) presence of expected/potential resource conflict on the PSSCH resource, the UE-A may transmit a conflict-information signaling in a signaling occasion (associated with the conflicted PSSCH resource, for example), that is in a last slot that includes conflict-information signaling resources and is at least Kc slots of the sidelink resource pool before the sidelink slot of the conflicted PSSCH resource. An advantage of the second example scenario (as compared to the first example scenario, for example) may be that a time-domain resource of the conflicted sidelink resource can be implicitly determined (e.g., derived) based on (and/or indicated using) the signaling occasion. For example, the UE-A can have more information within a time duration between the SCI and the signaling occasion, for deriving/determining whether expected/potential resource conflict occurs or not.

There may be issues and/or further considerations (other than timing association discussed in the foregoing description, for example) associated with conflict-information signaling implementation and/or design, such as due, at least in part, to PSFCH for sidelink HARQ-ACK feedback and conflict-information signaling being utilized for different purposes and/or having different respective corresponding UE-B/UE-A behaviors.

Some concepts, mechanisms, methods, and embodiments are provided in the present disclosure.

A UE-A may receive a first sidelink control information, transmitted from a UE-B, in a first sidelink slot in a sidelink resource pool. The first sidelink control information may indicate/allocate/schedule a first sidelink data resource in the first sidelink slot. The first sidelink control information may indicate/reserve a second sidelink data resource in a second sidelink slot. The second sidelink slot is after (e.g., later than) the first sidelink slot in time domain. In some examples, there are one or more sidelink slots comprising PSFCH resources (e.g., sidelink PSFCH resources in the sidelink resource pool) between the first slot and the second slot.

In some examples, the first sidelink control information is transmitted via a first PSCCH and/or a first PSSCH. For example, the first PSCCH and/or the first PSSCH may comprise the first sidelink control information, and/or the UE-A may receive the first sidelink control information via receiving the first PSCCH and/or the first PSSCH. The first PSCCH and/or the first PSSCH is transmitted by the UE-B. In some examples, the first sidelink data resource is a resource of the first PSSCH.

In some examples, the first sidelink control information may indicate/reserve the second sidelink data resource via a frequency resource assignment field and a time resource assignment field (e.g., a value of the frequency resource assignment field and/or a value of a time resource assignment field may be indicative of the second sidelink data resource). Alternatively and/or additionally, the first sidelink control information may indicate/reserve the second sidelink data resource via a resource reservation period field (and/or via the frequency resource assignment field and/or time resource assignment field). The resource reservation period field may indicate a non-zero resource reservation period value.

In some examples, the first sidelink control information may be indicative of a first physical layer source Identity (ID), a first physical layer destination ID, and/or a first priority value (e.g., the first sidelink control information may provide the UE-A with the first physical layer source ID, the first physical layer destination ID, and/or the first priority value). In some examples, the first physical layer source ID may be a layer-1 identity of the UE-B. The first physical layer source ID may be at least a part of a layer-2 identity of the UE-B. The first physical layer source ID may be at least a part of a layer-2 source identity (of the UE-B, for example). In some examples, the UE-B may transmit, on the first sidelink data resource, the first sidelink control information and a first data packet to at least a receiver UE. In some examples, the first physical layer destination ID may be a layer-1 identity associated with the receiver UE. The first physical layer destination ID may be at least a part of a layer-2 identity associated with the receiver UE. The first physical layer destination ID may be at least a part of a layer-2 destination identity (associated with the receiver UE, for example). In some examples, the first priority value is set based on (and/or is indicative of) a priority of the first data packet. In an example in which the priority values can range from 1 to 8, a priority value equal to 1 corresponds to a highest priority while a priority value equal to 8 corresponds to a lowest priority.

The UE-A may detect an expected/potential resource conflict on the second sidelink data resource. Based on the expected/potential resource conflict (e.g., in response to detecting the expected/potential resource conflict), UE-A may transmit a conflict-information signaling in a signaling occasion. The signaling occasion is in a third sidelink slot of the sidelink resource pool.

In some examples, the signaling occasion may be determined (e.g., derived) based on the first sidelink slot. In some examples, the third sidelink slot may be an earliest slot that (i) includes conflict-information signaling resources, and (ii) is at least Kc sidelink slots of the sidelink resource pool after the first sidelink slot (e.g., there is a time gap of at least Kc sidelink slots, of the sidelink resource pool, between the first sidelink slot and the third sidelink slot).

Alternatively and/or additionally, the signaling occasion may be determined (e.g., derived) based on the second sidelink slot. In some examples, the third sidelink slot may be a last slot that (i) includes conflict-information signaling resources, and (ii) is at least Kc sidelink slots of the sidelink resource pool before the second sidelink slot (e.g., there is a time gap of at least Kc sidelink slots, of the sidelink resource pool, between the third sidelink slot and the second sidelink slot).

In some examples, the expected/potential resource conflict detected by the UE-A is a first type of resource conflict. The first type of resource conflict may correspond to a resource conflict in which a sidelink data resource indicated/reserved by a sidelink control information is fully/partially overlapping, in time and frequency domain, with another sidelink data resource indicated/reserved by another sidelink control information. In an example in which the expected/potential resource conflict detected by the UE-A is the first type of resource conflict, the second sidelink data resource is fully/partially overlapping, in time and frequency domain, with a third sidelink data resource indicated/reserved by a second sidelink control information. The UE-A receives the second sidelink control information. In some examples, the second sidelink control information may be transmitted by a UE-C. In some examples, the second sidelink control information may be indicative of a second physical layer source ID, a second physical layer destination ID, and/or a second priority value (e.g., the second sidelink control information may provide the UE-A with the second physical layer source ID, the second physical layer destination ID, and/or the second priority value). In some examples, the second physical layer source ID may be a layer-1 identity of the UE-C. The second physical layer source ID may be at least a part of a layer-2 identity (e.g., a layer-2 source identity) of the UE-C. In some examples, the first physical layer source ID and the first physical layer destination ID (indicated by the first sidelink control information) may be not the same as the second physical layer source ID and the second physical layer destination ID indicated by the second sidelink control information. For example, the first physical layer source ID is not the same as the second physical layer source ID while the first physical layer destination ID is the same as the second physical layer destination ID. Alternatively and/or additionally, the first physical layer source ID may be the same as the second physical layer source ID while the first physical layer destination ID is not the same as the second physical layer destination ID. Alternatively and/or additionally, the first physical layer source ID may not be the same as the second physical layer source ID while the first physical layer destination ID is not the same as the second physical layer destination ID. The first type of resource conflict may correspond to a first condition and/or a first cause. For example, the UE-A may detect the expected/potential resource conflict (that is the first type of resource conflict) based on detection of the first cause and/or determination that the first condition is met. The determination that the first condition is met (and/or detection of the first cause) may correspond to a determination that the second sidelink data resource is fully/partially overlapping, in time and frequency domain, with the third sidelink data resource indicated/reserved by the second sidelink control information.

In some examples, the expected/potential resource conflict detected by the UE-A is a second type of resource conflict. The second type of resource conflict may correspond to a resource conflict in which a sidelink data resource indicated/reserved by a sidelink control information is in a sidelink slot for which the UE determines (and/or expects) not to perform SL reception (for the sidelink resource pool, for example) from a UE. In an example in which the expected/potential resource conflict detected by the UE-A is the second type of resource conflict, the UE-A may determine (and/or expect) not to perform SL reception (for the sidelink resource pool, for example) from the UE-B in the second sidelink slot. In some examples, the UE-A may determine (and/or expect) to perform one or more first transmissions (e.g., one or more uplink transmissions and/or one or more sidelink transmissions) in the second sidelink slot. For example, the UE-A may determine (and/or expect) to perform the one or more first transmissions, in the second sidelink slot, at a carrier frequency and/or in a cell/carrier associated with the sidelink resource pool (e.g., the sidelink resource pool may be in the carrier frequency and/or in the cell/carrier). In the present disclosure, the term "cell/carrier" may refer to a cell and/or a carrier.

Alternatively and/or additionally, the second type of resource conflict may correspond to a resource conflict in which a sidelink data resource indicated/reserved by a sidelink control information is in a sidelink slot, wherein the UE-A determines (and/or expects) not to perform SL reception (for the sidelink resource pool, for example) from a UE in a slot that is time domain overlapped with the sidelink slot. In an example in which the expected/potential resource conflict detected by the UE-A is the second type of resource conflict, the UE-A may determine (and/or expect) not to perform SL reception (for the sidelink resource pool, for example) from the UE-B in a slot that is time domain overlapped with the second sidelink slot. In some examples, the UE-A may determine (and/or expect) to perform one or more second transmissions (e.g., one or more uplink transmissions and/or one or more sidelink transmissions) in a slot that is time domain overlapped with the second sidelink slot. For example, the UE-A may determine (and/or expect) to perform the one or more second transmissions, in the slot, at a carrier frequency and/or in a cell/carrier associated with the sidelink resource pool (e.g., the sidelink resource pool may be in the carrier frequency and/or in the cell/carrier).

The second type of resource conflict may correspond to a second condition (different than the first condition) and/or a second cause (different than the first cause). For example, the UE-A may detect the expected/potential resource conflict (that is the second type of resource conflict) based on detection of the second cause and/or determination that the second condition is met. The determination that the second condition is met (and/or detection of the second cause) may correspond to a determination that the UE determines (and/or expects) not to perform SL reception (for the sidelink resource pool, for example) from the UE-B in the second sidelink slot. Alternatively and/or additionally, the determination that the second condition is met (and/or detection of the second cause) may correspond to a determination that the UE determines (and/or expects) not to perform SL reception (for the sidelink resource pool, for example) from the UE-B in a slot that is time domain overlapped with the second sidelink slot.

In some examples, the one or more transmissions (e.g., the one or more first transmissions and/or the one or more second transmissions) may have a higher priority than a first priority (corresponding to the first priority value, for example). Alternatively and/or additionally, the first priority value may be larger than a priority value threshold (e.g., the first priority value being larger than the priority value threshold may indicate that the first priority is lower than a priority threshold). Alternatively and/or additionally, the one or more transmissions may be associated with (e.g., may have) one or more priority values that are lower than a priority value threshold (e.g., the one or more priority values being lower than the priority value threshold may indicate that one or more priorities of the one or more transmissions are higher than a priority threshold). Alternatively and/or additionally, the one or more priority values associated with the one or more transmissions may be lower than the first priority value (e.g., the one or more priority values being lower than the first priority value may indicate that the one or more priorities of the one or more transmissions are higher than the first priority). In some examples, the UE-A is the receiver UE (e.g., intended receiver UE of the first data packet). In some examples, the first physical layer destination ID may be a layer-1 identity associated with the UE-A. The first physical layer destination ID may be at least a part of a layer-2 identity associated with the UE-A. The first physical layer destination ID may be at least a part of a layer-2 destination identity (associated with the UE-A, for example).

Concept A

In Concept A, in response to a defined sidelink data resource (e.g., a specific sidelink data resource), the UE-A may determine (e.g., derive) one or more conflict-information signaling resources (e.g., one or more conflict-information signaling resources in frequency domain). In some examples, the defined sidelink data resource may comprise (and/or may be) a starting sub-channel of the second sidelink data resource. Alternatively and/or additionally, the defined sidelink data resource may comprise (and/or may be) the starting sub-channel of the first sidelink data resource. Alternatively and/or additionally, the defined sidelink data resource may comprise (and/or may be) one or more full sub-channels of the second sidelink data resource. Alternatively and/or additionally, the defined sidelink data resource may comprise (and/or may be) one or more full sub-channels of the first sidelink data resource. In some examples, the one or more conflict-information signaling resources are associated with the defined sidelink data resource. In some examples, different sidelink data resources may be associated with different conflict information signaling resources. For example, if a starting sub-channel of a third sidelink data resource is different than a starting sub-channel of a fourth sidelink data resource, conflict-information signaling resources associated with the third sidelink data resource may be different than conflict-information signaling resources associated with the fourth sidelink data resource. In some examples, different conflict-information signaling resources are separated in frequency domain, and/or in time domain. In some examples, different conflict-information signaling resources be separated in code-domain (e.g., different conflict-information signaling resources be separated in code-domain via using different cyclic shifts). In some examples, if a measure of full sub-channels (e.g., an amount of full sub-channels and/or a number of full sub-channels) of a third sidelink data resource is different than a measure of full sub-channels (e.g., an amount of full sub-channels and/or a number of full sub-channels) of a fourth sidelink data resource, one or more first conflict-information signaling resources associated with the third sidelink data resource may be different than one or more second conflict-information signaling resources associated with the fourth sidelink data resource (and/or a number of conflict-information signaling resources of the one or more first conflict-information signaling resources may be different than a number of conflict-information signaling resources of the one or more second conflict-information signaling resources)

In a method A1, the UE-A may determine (e.g., derive) a first conflict-information signaling resource, from the one or more conflict-information signaling resources (e.g., the one or more conflict-information signaling resources determined by the UE-A in response to the defined sidelink data resource), based on the first physical layer source ID indicated by the first sidelink control information (e.g., the UE-A may select the first conflict-information signaling resource from the one or more conflict-information signaling resources based on the first physical layer source ID). In some examples, the one or more conflict-information signaling resources may be indexed. The first conflict-information signaling resource may be associated with a first index value and/or determined (e.g., derived) based on the first index value, wherein the first index value is determined (e.g., derived) based on the first physical layer source ID. A number/amount/cardinality of the one or more conflict-information signaling resources (e.g., the total number/amount/cardinality of the one or more conflict-information signaling resources) is denoted as $N_c$ (e.g., $N_c$ is a value). In the present disclosure, the term "number/amount/cardinality" may refer to number, amount and/or cardinality. In some examples, the first index value may be determined (e.g., derived) via performing a modulo (mod) operation in association with the first physical layer source ID and $N_c$. For example, the first index value may be based on, such as set equal to, a first value mod a second value, wherein the first value is based on the first physical layer source ID and the second value is based on $N_c$. In a first example, the first value is equal to the first physical layer source ID and the second value is equal to $N_c$. In the first example, the first index value may be based on, such as set equal to, a remainder of the first physical layer source ID divided by $N_c$ or a remainder of $N_c$ divided by the first physical layer source ID. In a second example, the first value is equal to a sum, S, of the first physical layer source ID and a parameter, wherein the second value is equal to $N_c$. In the second example, the first index value may be based on, such as set equal to, a remainder of S divided by $N_c$ or a remainder of $N_c$ divided by S).

In a method A2, the UE-A may determine (e.g., derive) the first conflict-information signaling resource, from the one or more conflict-information signaling resources (e.g., the one or more conflict-information signaling resources determined by the UE-A in response to the defined sidelink data resource), based on the first physical layer destination ID indicated by the first sidelink control information (e.g., the UE-A may select the first conflict-information signaling resource from the one or more conflict-information signaling resources based on the first physical layer destination ID). In some examples, the one or more conflict-information signaling resources may be indexed. The first conflict-information signaling resource may be determined (e.g., derived) based on a second index value, wherein the second index value is determined (e.g., derived) based on the first physical layer destination ID. The number/amount/cardinality of the one or more conflict-information signaling resources (e.g., the total number/amount/cardinality of the one or more conflict-information signaling resources) is denoted as $N_c$ (e.g., $N_c$ is a value). In some examples, the second index value may be determined (e.g., derived) via performing a modulo operation in association with the first physical layer destination ID and $N_c$. For example, the second index value may be based on, such as set equal to, a first value mod a second value, wherein the first value is based on the first physical layer destination ID and the second value is based on $N_c$. In a first example, the first value is equal to the first physical layer destination ID and the second value is equal to $N_c$. In the first example, the second index value may be based on, such as set equal to, a remainder of the first physical layer destination ID divided by $N_c$ or a remainder of $N_c$ divided by the first physical layer destination ID. In a second example, the first value is equal to a sum, P, of the first physical layer destination ID and a parameter, wherein the second value is equal to $N_c$. In the second example, the second index value may be based on, such as set equal to, a remainder of P divided by $N_c$ or a remainder of $N_c$ divided by P).

In a method A3, the UE-A may determine (e.g., derive) the first conflict-information signaling resource, from the one or more conflict-information signaling resources (e.g., the one or more conflict-information signaling resources determined by the UE-A in response to the defined sidelink data resource), based on the first priority value indicated by the first sidelink control information (e.g., the UE-A may select the first conflict-information signaling resource from the one or more conflict-information signaling resources based on the first priority value). In some examples, the one or more conflict-information signaling resources may be indexed. The first conflict-information signaling resource may be associated with a third index value and/or determined (e.g., derived) based on the third index value, wherein the third index value is determined (e.g., derived) based on the first priority value. A number/amount/cardinality of the one or more conflict-information signaling resources (e.g., the total number/amount/cardinality of the one or more conflict-information signaling resources) is denoted as $N_c$ (e.g., $N_c$ is a value). In some examples, the third index value may be determined (e.g., derived) via performing a modulo operation in association with the first priority value and $N_c$. For example, the third index value may be based on, such as set equal to, a first value mod a second value, wherein the first value is based on the first priority value and the second value is based on $N_c$. In a first example, the first value is equal to the first priority value and the second value is equal to $N_c$. In the first example, the third index value may be based on, such as set equal to, a remainder of the first priority value divided by $N_c$ or a remainder of $N_c$ divided by the first priority value. In a second example, the first value is equal to a sum, R, of the first priority value and a parameter, wherein the second value is equal to $N_c$. In the second example, the third index value may be based on, such as set equal to, a remainder of R divided by $N_c$ or a remainder of $N_c$ divided by R). In some examples, the UE-A may determine (e.g., derive) the first conflict-information signaling resource, based on one of the method A1, the method A2, or the method A3 and/or based on a combination of two or more of the method A1, the method A2, and the method A3.

In some examples, the UE-A may transmit the conflict-information signaling in the first conflict-information signaling resource. In response to detecting/receiving the conflict-information signaling in the first conflict-information signaling resource, the UE-B may determine (e.g., know) that an expected/potential resource conflict occurs on the second sidelink data resource. For example, based on the conflict-information signaling, the UE-B may determine (e.g., know) the presence of the expected/potential resource conflict on the second sidelink data resource. The UE-B may drop (e.g., skip) the second sidelink data resource based on the expected/potential resource conflict and/or the conflict-information signaling (e.g., the UE may drop the second sidelink data resource in response to determining the expected/potential resource conflict and/or receiving the conflict-information signaling). The UE-B may re-select a new sidelink data resource based on the expected/potential resource conflict and/or the conflict-information signaling (e.g., the UE may re-select the new sidelink data resource in response to determining the expected/potential resource conflict and/or receiving the conflict-information signaling).

In some examples, the UE-A may compare the first priority value indicated by the first sidelink control information and the second priority value indicated by the second sidelink control information.

In some examples, if the first priority value is larger than (or equal to) the second priority value, the UE-A may transmit the conflict-information signaling in the first conflict-information signaling resource. In some examples, if the first priority value is smaller than (or equal to) the second priority value, the UE-A may not transmit the conflict-information signaling in the first conflict-information signaling resource. Alternatively and/or additionally, if the first priority value is smaller than (or equal to) the second priority value, the UE-A may transmit a second conflict-information signaling in a second conflict-information signaling resource determined (e.g., derived) based on the second physical layer source ID, the second physical layer destination ID, and/or the second priority value.

In some examples, with respect to Concept A, a conflict-information signaling resource may correspond to a PRB (for conflict-information signaling, for example). In some examples, in response to the defined sidelink data resource, the UE-A may determine (e.g., derive) one or more PRBs (for conflict-information signaling, for example). The UE-A may determine (e.g., derive) a first PRB (for conflict-information signaling, for example), from the one or more PRBs (for conflict-information signaling), based on one of the method A1, the method A2, or the method A3 and/or based on a combination of two or more of the method A1, the method A2, and the method A3 (e.g., the first PRB may be determined based on the first index value, the second index value and/or the third index value). For example, the one or more PRBs and/or the first PRB may be determined using one or more of the techniques provided herein (with respect to Concept A, for example) with respect to determining the one or more conflict-information signaling resources and/or the first conflict-information signaling resource.

Alternatively and/or additionally, with respect to Concept A, a conflict-information signaling resource may correspond to a cyclic shift (e.g., one cyclic shift) in a PRB (for conflict-information signaling, for example). In a PRB (for conflict-information signaling, for example), there may be one or more cyclic shifts for conflict-information signaling. In some examples, one cyclic shift in one PRB (for conflict-information signaling, for example) is utilized for one conflict-information signaling resource (e.g., the one cyclic shift may be utilized as the one conflict-information signaling resource).

Alternatively and/or additionally, with respect to Concept A, a conflict-information signaling resource may correspond to a cyclic shift pair (e.g., one cyclic shift pair) in a PRB (for conflict-information signaling, for example). In a PRB (for conflict-information signaling, for example), there may be one or more cyclic shift pairs for conflict-information signaling. In some examples, one cyclic shift pair in one PRB (for conflict-information signaling, for example) is utilized for one conflict-information signaling resource (e.g., the one cyclic shift pair may be utilized as the one conflict-information signaling resource).

In some examples, the first sidelink control information may indicate cast type as unicast.

In some examples, the first sidelink control information may indicate a physical layer destination ID associated with the UE-A (e.g., a physical layer destination ID of the UE-A).

Alternatively and/or additionally, the first sidelink control information may indicate a physical destination ID that is not associated with the UE-A.

Alternatively and/or additionally, the first sidelink control information may indicate cast type as groupcast.

In some examples, the first sidelink control information may indicate a physical layer destination ID associated with a sidelink group (e.g., a physical layer destination ID of the sidelink group). In some examples, the sidelink group may comprise the UE-A and the UE-B (and/or one or more other UEs in addition to the UE-A and the UE-B).

Alternatively and/or additionally, the first sidelink control information may indicate that cast type is groupcast and that HARQ-ACK information includes ACK or NACK (e.g., HARQ-ACK information may be transmitted to indicate ACK and HARQ-ACK information may be transmitted to indicate NACK). Alternatively and/or additionally, the first sidelink control information may indicate that cast type is groupcast and that HARQ-ACK information includes NACK only (e.g., HARQ-ACK information may be transmitted to indicate NACK but HARQ-ACK information may not be transmitted to indicate ACK).

Alternatively and/or additionally, the first sidelink control information may indicate cast type as broadcast.

Concept B

Considering that there may be multiple types of resource conflicts of the expected/potential resource conflict (e.g., the first type of resource conflict and the second type of resource conflict), the corresponding UE-B behavior may depend upon the type of the expected/potential resource conflict (e.g., whether the expected/potential resource conflict is the first type, the second type, or a different type of resource conflict). In some examples, the UE-B behavior may be the same for the multiple types of resource conflicts (e.g., operations performed by the UE-B in response to receiving the conflict-information signaling and/or being notified of the expected/potential resource conflict may be the same regardless of whether the expected/potential resource conflict is the first type, the second type, or a different type of resource conflict). Alternatively and/or additionally, the UE-B behavior may be different (e.g., a little different) for the multiple types of resource conflicts. For example, operations performed by the UE-B in response to receiving the conflict-information signaling and/or being notified of the expected/potential resource conflict may be different in a scenario in which the expected/potential resource conflict is the first type as compared to a scenario in which the expected/potential resource conflict is the second type. It may be beneficial for the UE-A to indicate the type of resource conflict of the expected/potential resource conflict when the UE-A transmits the conflict-information signaling to the UE-B.

In a method B1, in response to a defined sidelink data resource (e.g., a specific sidelink data resource), the UE-A may determine (e.g., derive) one or more first conflict-information signaling resources (e.g., one or more first conflict-information signaling resources in frequency domain) and one or more second conflict-information signaling resources (e.g., one or more second conflict-information resources in frequency domain). In some examples, if the UE-A determines (e.g., derives) that the expected/potential resource conflict is the first type of resource conflict (e.g., the UE-A detects the expected/potential resource conflict that is the first type of resource conflict), the UE-A may transmit the conflict-information signaling in a first conflict-information signaling resource of the one or more first conflict-information signaling resources. Alternatively and/or additionally, if the UE-A determines (e.g., derives) that the expected/potential resource conflict is the second type of resource conflict (e.g., the UE-A detects the expected/potential resource conflict that is the second type of resource conflict), the UE-A may transmit the conflict-information signaling in a second conflict-information signaling resource of the one or more second conflict-information signaling resources. In a method B2, a conflict-information signaling resource may be associated with (e.g., may have) one cyclic shift pair in one or more PRBs (for conflict-information signaling, for example). For example, a conflict-information signaling resource may be associated with (e.g., may have) a first cyclic shift (e.g., cyclic shift $c_1$, such as $c_1=0$) and a second cyclic shift (e.g., cyclic shift $c_2$, such as $c_2=6$) in one or more PRBs (for conflict-information signaling, for example). n some examples, if the UE-A determines (e.g., derives) that the expected/potential resource conflict is the first type of resource conflict (e.g., the UE-A detects the expected/potential resource conflict that is the first type of resource conflict), the UE-A may transmit the conflict-information signaling, based on the first cyclic shift, in the first conflict-information signaling resource. Alternatively and/or additionally, the first cyclic shift may be used to transmit the conflict-information signaling in the first conflict-information signaling resource based on (i) the expected/potential resource conflict being the first type of resource conflict, and (ii) the first priority value being larger than (or equal to) the second priority value. Alternatively and/or additionally, if the UE-A determines (e.g., derives) that the expected/potential resource conflict is the second type of resource conflict (e.g., the UE-A detects the expected/potential resource conflict that is the second type of resource conflict), the UE-A may transmit the conflict-information signaling, based on the second cyclic shift, in the first conflict-information signaling resource. Concept C In some examples, the UE-B may transmit the first sidelink control information and a first data packet on the first sidelink data resource. The UE-A may detect the expected/potential resource conflict on the second sidelink data resource in the second sidelink slot (based on detecting the first cause or the second cause and/or based on determining that the first condition or the second condition are met). For example, the expected/potential resource conflict may be the first type of resource conflict or the second type of resource conflict. The UE-A may determine (e.g., derive) a signaling occasion (for conflict-information signaling, for example) based on the second sidelink data resource and/or the second sidelink slot.

In some examples, if the second sidelink data resource is indicated/reserved via frequency resource assignment field and the time resource assignment field in the first sidelink control information and is not indicated/reserved via a resource reservation period field in the first control information, and if the UE-A does not successfully decode/receive the first data packet before the signaling occasion and/or the third sidelink slot, the UE-A may transmit a conflict-information signaling (indicative of the expected/potential resource conflict, for example) in the signaling occasion. In the present disclosure, the term "decode/receive" may refer to decode and/or receive. If the UE-A successfully decodes/receives the first data packet before the signaling occasion and/or the third sidelink slot, the UE-A may not transmit conflict-information signaling in the signaling occasion.

Alternatively and/or additionally, if the second sidelink data resource is indicated/reserved via a resource reservation period field (and/or via one or more other fields in addition to the resource reservation period field) that is in the first sidelink control information and is indicative of a non-zero resource reservation period value, the UE-A may transmit a conflict-information signaling in the signaling occasion (e.g., the UE-A may transmit the conflict-information signaling in the signaling occasion regardless of whether or not the UE-A successfully decodes/receives the first data packet). For example, if the UE-A successfully decodes/receives the first data packet before the signaling occasion, the UE-A may transmit the conflict-information signaling in the signaling occasion.

In some examples, if the UE-A expects the second sidelink data resource to be utilized for transmitting the first data packet from the UE-B (e.g., the same data packet that is transmitted via the first sidelink data resource), and if the UE-A does not successfully decode/receive the first data packet before the signaling occasion and/or the third sidelink slot, the UE-A may transmit a conflict-information signaling in the signaling occasion. In some examples, if the UE-A successfully decodes/receives the first data packet before the signaling occasion and/or the third sidelink slot, the UE-A may not transmit conflict-information signaling in the signaling occasion.

Alternatively and/or additionally, if the UE-A expects the second sidelink data resource to be utilized for transmitting a second data packet (different than the first data packet) from the UE-B, the UE-A may transmit a conflict-information signaling in the signaling occasion (e.g., the UE-A may transmit the conflict-information signaling in the signaling occasion regardless of whether or not the UE-A successfully decodes/receives the first data packet). For example, if the UE-A successfully decodes/receives the first data packet before the signaling occasion, the UE-A may transmit the conflict-information signaling in the signaling occasion.

Concept D

A timing association between a PSCCH/PSSCH transmission and one or more PSFCH resources associated with the PSCCH/PSSCH transmission may be determined (e.g., derived) based on a minimum time gap of K slots. The value of K may be configured for the sidelink resource pool. The K slots may be relevant to a requirement process time associated with PSCCH/PSSCH reception and/or decoding (e.g., reception and/or decoding of a PSCCH/PSSCH transmission) and PSFCH generation (e.g., the requirement process time may correspond to a duration of time that is equal to or larger than a sum of a time it takes for PSCCH/PSSCH reception and/or decoding and a time it takes for PSFCH generation). When the UE-A receives the first sidelink control information, that schedules a first PSSCH transmission in the first sidelink slot, the UE-A may determine (e.g., derive) a PSFCH occasion (associated with the first PSSCH transmission, for example), wherein the PSFCH occasion is in an earliest slot that (i) includes PSFCH resources, and (ii) is at least K sidelink slots of the sidelink resource pool after the first PSSCH reception.

A timing association between a PSCCH/PSSCH transmission and one or more conflict-information signaling resources associated with the PSCCH/PSSCH transmission may be determined (e.g., derived) based on a minimum time gap of Kc slots. The value of Kc may be configured for the sidelink resource pool. The Kc slots may be relevant to a requirement process time associated with conflict-information signaling reception and PSCCH/PSSCH generation (e.g., the requirement process time may correspond to a duration of time that is equal to or larger than a sum of a time it takes for conflict-information signaling reception and a time it takes for PSCCH/PSSCH generation).

In some examples, Kc is be the same as K. Alternatively and/or additionally, Kc may different than K.

Concept E

The UE-A receives the first sidelink control information from the UE-B, wherein the first sidelink control information (i) indicates/reserves the second sidelink data resource, and (ii) indicates the first physical layer source ID, the first physical layer destination ID, and/or the first priority value.

The UE-A receives the second sidelink control information from the UE-C, wherein the second sidelink control information (i) indicates/reserves the third sidelink data resource, and (ii) indicates the second physical layer source ID, the second physical layer destination ID, and/or the second priority value.

The UE-A may determine (e.g., detect) that the second sidelink data resource is fully/partially overlapping, in time and frequency domain, with the third sidelink data resource (e.g., the UE-A may detect the expected/potential resource conflict having the first type of resource conflict, such as by determining that the first condition associated with the first type of resource conflict is met). Based on the expected/potential resource conflict (e.g., based on the presence of the expected/potential resource conflict), the UE-A may transmit a conflict-information signaling. For example, the UE-A may transmit the conflict-information signaling in response to detecting the expected/potential resource conflict.

In a method G1, the UE-A may transmit the conflict-information signaling based on a plurality of priority values comprising the first priority value and the second priority value (and/or one or more other priority values in addition to the first priority value and the second priority value). For example, the conflict-information signaling may be transmitted based on a largest priority value of the plurality of priority values.

In some examples, if the first priority value is larger than the second priority value (and/or if the first priority value is the largest priority value of the plurality of priority values), the UE-A may transmit the conflict-information signaling for the UE-B (e.g., the UE-A may transmit the conflict-information signaling intended for the UE-B, such as where the UE-B is the intended recipient of the conflict-information signaling). The determination (e.g., derivation) of a corresponding conflict-information signaling resource for use in transmitting the conflict-information signaling is based on the first sidelink control information and/or the second sidelink data resource (e.g., the corresponding conflict-information signaling resource may be determined, based on the first sidelink control information and/or the second sidelink data resource, using one or more of the techniques provided herein with respect to Concept A, Concept B, Concept C and/or Concept D). In some examples, the UE-A may not transmit the conflict-information signaling for the UE-C (e.g., the UE-C is not the intended recipient of the conflict-information signaling). For example, the UE-A may not transmit the conflict-information signaling for the UE-C (e.g., the UE-C is not the intended recipient of the conflict-information signaling) if the first priority value is larger than the second priority value.

In some examples, if the second priority value is larger than the first priority value (and/or if the second priority value is the largest priority value of the plurality of priority values), the UE-A may transmit the conflict-information signaling for the UE-C (e.g., the UE-A may transmit the conflict-information signaling intended for the UE-C, such as where the UE-C is the intended recipient of the conflict-information signaling). The determination (e.g., derivation) of a corresponding conflict-information signaling resource for use in transmitting the conflict-information signaling is based on the second sidelink control information and/or the third sidelink data resource (e.g., the corresponding conflict-information signaling resource may be determined, based on the second sidelink control information and/or the third sidelink data resource, using one or more of the techniques provided herein with respect to Concept A, Concept B, Concept C and/or Concept D). In some examples, the UE-A may not transmit the conflict-information signaling for the UE-B (e.g., the UE-B is not the intended recipient of the conflict-information signaling). For example, the UE-A may not transmit the conflict-information signaling for the UE-B (e.g., the UE-B is not the intended recipient of the conflict-information signaling) if the second priority value is larger than the first priority value.

Concept F

The UE-A may determine (e.g., consider and/or set) a priority (and/or a priority value) of the conflict-information signaling based on the first sidelink control information. In some examples, the UE-A may determine (e.g., consider and/or set) the priority (and/or the priority value) of the conflict-information signaling based on the conflicted sidelink data resource (e.g., the second sidelink data resource). In some examples, the UE-A may determine (e.g., consider and/or set) the priority (and/or the priority value) of the conflict-information signaling based on the first priority value (indicated by the first sidelink control information, for example). The UE-A may determine (e.g., consider and/or set) the priority (and/or the priority value) of the conflict-information signaling based on the first priority (e.g., first data priority) corresponding to the first priority value (e.g., the first priority corresponds to a priority of the first data packet). In an example, the priority of the conflict-information signaling may be the same as the first priority and/or the priority value of the conflict-information signaling may be the same as the first priority value. In some examples, the UE-A may determine (e.g., consider and/or set) a priority (and/or a priority value) of a conflict-information signaling based on a priority field value in a SCI format 1-A scheduling a conflicted sidelink resource associated with the conflict-information signaling. The UE-A may determine (e.g., consider and/or set) the priority (and/or the priority value) of the conflict-information signaling based on (e.g., the same as) a highest priority (and/or lowest priority value) of PSSCHs having the expected conflict.

In some examples, the UE-A may have one or more transmissions/receptions (e.g., one or more scheduled and/or expected transmissions/receptions) in the third slot (and/or in one or more other slots in addition to the third slot). In the present disclosure, the term "transmission/reception" refers to a transmission and/or reception. In some examples, the one or more transmissions/receptions may be fully/partially overlapping in time. Alternatively and/or additionally, the UE-A may have the one or more transmissions/receptions fully/partially overlapping in one or more symbols of the signaling occasion (e.g., the signaling occasion in the third slot).

In some examples, the one or more transmissions/receptions may comprise the conflict-information signaling (and/or one or more different transmissions/receptions in addition to the conflict-information signaling). The priority (and/or the priority value) of the conflict-information signaling may be utilized for the UE-A to perform prioritization of the one or more transmissions/receptions. In some examples, the one or more transmissions/receptions may comprise the conflict-information signaling and one or more PSFCH transmissions/receptions (and/or one or more different transmissions/receptions in addition to the conflict-information signaling and the one or more PSFCH transmissions/receptions). In some examples, the one or more transmissions/receptions may comprise uplink transmissions and/or downlink receptions (e.g., the one or more transmissions/receptions may comprise merely one or more uplink transmissions, merely one or more downlink receptions, or both one or more uplink transmissions and one or more downlink receptions). In some examples, the one or more transmissions/receptions may comprise sidelink transmissions and/or sidelink receptions (e.g., the one or more transmissions/receptions may comprise merely one or more sidelink transmissions, merely one or more sidelink receptions, or both one or more sidelink transmissions and one or more sidelink receptions). For example, the one or more transmissions/receptions may comprise PSFCH transmissions and/or PSFCH receptions (e.g., the one or more transmissions/receptions may comprise merely one or more PSFCH transmissions, merely one or more PSFCH receptions, or both one or more PSFCH transmissions and one or more PSFCH receptions). In some examples, the one or more transmissions/receptions may be at a carrier frequency and/or in a cell/carrier associated with the sidelink resource pool (e.g., the sidelink resource pool may be in the same carrier frequency and/or in the cell/carrier).

In some examples, the UE-A may perform prioritization of the one or more transmissions/receptions based on priority values of the one or more transmissions/receptions. Based on the prioritization, the UE-A may determine to either transmit one or more transmissions of the one or more transmissions/receptions (e.g., the one or more transmissions may correspond to a subset of transmissions in the one or more transmissions/receptions) or receive one or more receptions (e.g., a subset of receptions) of the one or more transmissions/receptions (e.g., the one or more receptions may correspond to a subset of receptions in the one or more transmissions/receptions).

In some examples, among the one or more transmissions/receptions, if a DL reception or a sidelink reception has a higher priority than other transmissions/receptions of the one or more transmissions/receptions (and/or if the DL reception or the sidelink reception has the highest priority among the one or more transmissions/receptions), the UE-A may not transmit the conflict-information signaling in the signaling occasion. In some examples, if the UE-A determines to perform a DL reception and/or a sidelink reception (e.g., a DL reception and/or a sidelink reception of the one or more transmissions/receptions) based on the prioritization of the one or more transmissions/receptions, the UE-A may not transmit the conflict-information signaling in the signaling occasion.

In some examples, among the one or more transmissions/receptions, if an uplink (UL) transmission has a higher priority than other transmissions/receptions of the one or more transmissions/receptions (and/or if the UL transmission has the highest priority among the one or more transmissions/receptions), the UE-A may not transmit the conflict-information signaling in the signaling occasion. In some examples, if the UE-A determines to perform a UL transmission (e.g., a UL transmission of the one or more transmissions/receptions) based on the prioritization of the one or more transmissions/receptions, the UE-A may not transmit the conflict-information signaling in the signaling occasion.

In some examples, among the one or more transmissions/receptions, if the conflict-information signaling has a higher priority than other transmissions/receptions of the one or more transmissions/receptions (and/or if the conflict-information signaling has the highest priority among the one or more transmissions/receptions), the UE-A may transmit the conflict-information signaling in the signaling occasion.

In some examples, among the one or more transmissions/receptions, if (i) a SL transmission has a higher priority than other transmissions/receptions of the one or more transmissions/receptions (and/or if the SL transmission has the highest priority among the one or more transmissions/receptions), and (ii) the UE-A is capable of performing (and/or configured to perform) $N_{max}$ SL transmissions comprising conflict-information signaling, the UE-A may determine to perform $N_{TX}$ SL transmissions (e.g., the UE-A may select the $N_{TX}$ SL transmissions to be performed, such as performed in the signaling occasion), wherein $N_{TX} \leq N_{max}$. The UE-A may determine (e.g., derive and/or select) the $N_{TX}$ SL transmissions based on priority values of one or more SL transmissions among the one or more transmissions/receptions (and/or based on other information in addition to the priority values of the one or more SL transmissions). For example, the UE-A may determine (e.g., derive and/or select) the $N_{TX}$ SL transmissions based on priority values of the one or more SL transmissions (and/or based on other information in addition to the priority values of the one or more SL transmissions) if the number of the one or more SL transmissions is larger than $N_{max}$. In some examples, the UE-A may determine (e.g., derive and/or select) the $N_{TX}$ SL transmissions with ascending priority value order. The UE-A may prioritize up to $N_{max}$ SL transmissions based on priority values of the one or more SL transmissions (and/or based on other information in addition to the priority values of the one or more SL transmissions). In some examples, in response to the prioritization, the UE-A transmits the prioritized SL transmissions (comprising up to $N_{max}$ SL transmissions) in the signaling occasion. If the conflict-information signaling is determined (e.g., selected) to be a prioritized SL transmission (e.g., if the conflict-information signaling is prioritized and/or included in the prioritized SL transmissions), the UE-A may transmit the conflict-information signaling in the signaling occasion.

In some examples, the UE-A is capable of transmitting $N_{max}$ sidelink transmissions in the signaling occasion (e.g., the UE-A is capable of concurrently transmitting, such as simultaneously transmitting, $N_{max}$ sidelink transmissions), wherein the $N_{max}$ sidelink transmissions may comprise one or more conflict-information signalings and/or one or more PSFCH transmissions.

In some examples, $N_{max}$ may correspond to $N_{max,PSFCH}$. For example, $N_{max}$ may be the same as (e.g., the same parameter as) $N_{max,PSFCH}$ and/or may be equal to $N_{max,PSFCH}$. $N_{max}$ may be indicated/configured in a Radio Resource Control (RRC) parameter (e.g., psfch-TxNumber). In the present disclosure, the term "indicated/configured" may refer to indicated and/or configured. The RRC parameter may be indicated/configured in a RRC message (e.g., SidelinkParametersNR and/or UECapabilityInformationSidelink). For example, a UE-A capability parameter corresponding to a maximum quantity of PSFCHs that the UE-A is capable of transmitting may be applied and/or utilized as a UE-A capability parameter corresponding to a maximum quantity of signals, comprising one or more conflict-information signalings and/or one or more PSFCH transmissions, that the UE-A is capable of transmitting (concurrently, for example). In some examples, the UE-A may determine to perform $N_{TX,conflict}$ conflict-information signaling transmissions and $N_{TX,PSFCH}$ PSFCH transmissions (in the signaling occasion, for example). For example, the UE-A may select the $N_{TX,conflict}$ conflict-information signaling transmissions and the $N_{TX,PSFCH}$ PSFCH transmissions to be performed (e.g., to be performed in the signaling occasion). In some examples, $N_{Tx,conflict}+N_{TX,PSFCH} \leq N_{max}$, and/or $N_{TX,conflict}+N_{TX,PSFCH} \leq N_{max,PSFCH}$.

Alternatively and/or additionally, the UE-A is capable of transmitting $N_{max,conflict}$ conflict-information signalings (concurrently, such as simultaneously, for example) in the signaling occasion. The UE-A may be capable of transmitting $N_{max,PSFCH}$ PSFCH transmissions (concurrently, such as simultaneously, for example) in the signaling occasion. In some examples, $N_{max}=N_{max,PSFCH}+N_{max,conflict}$. For example, a UE-A capability of transmitting conflict-information signalings (e.g., a maximum quantity of conflict-information signalings the UE-A is capable of transmitting in the signaling occasion, such as concurrently in the signaling occasion) and a UE-A capability of transmitting PSFCH transmissions (e.g., a maximum quantity of PSFCH transmissions the UE-A is capable of transmitting in the signaling occasion, such as concurrently in the signaling occasion) are configured/indicated respectively (and/or separately). In some examples, the UE is able to transmit $N_{max,PSFCH}$ PSFCH transmissions and $N_{max,conflict}$ conflict-information signalings concurrently (e.g., simultaneously) in the signaling occasion. In some examples, a sum of $N_{max,PSFCH}$ and $N_{max,conflict}$ is equal to $N_{max}$, such as $N_{max}$ sidelink transmissions (concurrently, such as simultaneously, for example) in the signaling occasion. In a scenario in which there are $N_{sch,Tx,PSFCH}$ scheduled PSFCH transmissions and $N_{sch,Tx,conflict}$ conflict-information signaling transmissions in one PSFCH occasion, and $N_{sch,Tx,conflict} \leq N_{max,conflict}$, and $(N_{sch,Tx,conflict}+N_{sch,Tx,PSFCH}) > N_{max}$, the UE-A may transmit (e.g., the UE-A is capable of transmitting) up to $N_{max,PSFCH}$ PSFCH transmissions (in the one PSFCH occasion, for example), such as where the UE-A is not configured to transmit more than $N_{max,PSFCH}$ PSFCH transmissions (in the one PSFCH occasion, for example). In a scenario in which there are $N_{sch,Tx,PSFCH}$ scheduled PSFCH transmissions and $N_{sch,Tx,conflict}$ conflict-information signaling transmissions in one PSFCH occasion, and $N_{sch,Tx,PSFCH} \leq N_{max,PSFCH}$, and $(N_{sch,Tx,conflict}+N_{sch,Tx,PSFCH}) > N_{max}$, the UE-A may transmit (e.g., the UE-A is capable of transmitting) up to $N_{max,conflict}$ conflict-information signalings (in the one PSFCH occasion, for example), such as where the UE-A is not configured to transmit more than $N_{max,conflict}$ conflict-information signalings (in the one PSFCH occasion, for example). In some examples, the UE-A capability for maximum number of concurrent (e.g., simultaneous) conflict-information signaling transmissions (e.g., $N_{max,conflict}$) is not shared with the UE-A capability for maximum number of concurrent (e.g., simultaneous) PSFCH transmissions (e.g., $N_{max,PSFCH}$) and/or vice versa.

Alternatively and/or additionally, the UE-A may be capable of transmitting $N_{max,conflict}$ conflict-information signalings (concurrently, such as simultaneously, for example) in the signaling occasion. In some examples, $N_{max}=N_{max,PSFCH}$. For example, a UE-A capability parameter corresponding to a maximum quantity of PSFCHs that the UE-A is capable of transmitting may be applied and/or utilized as a UE-A capability parameter corresponding to a maximum quantity of signals, comprising one or more conflict-information signalings and/or one or more PSFCH transmissions, that the UE-A is capable of transmitting (concurrently, for example), wherein a UE-A capability of transmitting conflict-information signalings (e.g., a UE-A capability parameter corresponding to a maximum quantity of conflict-information signalings that the UE-A is capable of transmitting) may be further configured/indicated (e.g., the UE-A capability of transmitting conflict-information signalings may be configured/indicated separately from the UE-A capability parameter corresponding to the maximum quantity of PSFCHs that the UE-A is capable of transmitting).

In an example, the UE-A has $N_{sch,Tx,PSFCH}$ scheduled PSFCH transmissions and $N_{sch,Tx,conflict}$ conflict-information signaling transmissions in one occasion (e.g., the one occasion may be one PSFCH occasion and/or one signaling occasion). In some examples, the UE-A determines to perform, in the one occasion, one or more SL transmissions based on the prioritization of the one or more transmissions/receptions. In some examples, the one or more transmissions/receptions comprises the $N_{sch,Tx,PSFCH}$ scheduled PSFCH transmissions and the $N_{sch,Tx,conflict}$ conflict-information signaling transmissions. In some examples, the one or more SL transmissions comprise the $N_{sch,Tx,PSFCH}$ scheduled PSFCH transmissions and the $N_{sch,Tx,conflict}$ conflict-information signaling transmissions.

In some examples, the UE-A may determine (e.g., derive) a PSFCH transmit power, noted as $P_{PSFCH,one}$, based on a DL pathloss and/or based on a maximum UE transmit power, noted as $P_{CMAX}$. In some examples, a priority (and/or a priority value) of a PSFCH is determined based on a SCI format 1-A associated with the PSFCH, such as based on a priority field in the SCI format 1-A. In an example, the SCI format 1-A associated with the PSFCH may be indicative of the priority (and/or the priority value) of the PSFCH (e.g., the priority field in the SCI format 1-A may be indicative of the priority and/or the priority value).

In some examples, the UE-A may determine (e.g., derive) a transmit power of a conflict-information signaling, noted as $P_{conflict,one}$, based on DL pathloss or based on the maximum UE transmit power. In some examples, the UE-A may determine (e.g., derive) the transmit power of a conflict-information signaling based on DL pathloss if dl-P0-PSFCH is provided, or based on a maximum UE transmit power if dl-P0-PSFCH is not provided. In some examples, the determination (e.g., derivation) of PSFCH transmit power may utilize the same P0 value as the determination (e.g., derivation) of transmit power of a conflict-information signaling. Alternatively and/or additionally, the determination (e.g., derivation) of the PSFCH transmit power may utilize a P0 value that is different than a P0 value utilized for the determination (e.g., derivation) of transmit power of a conflict-information signaling. P0 value may correspond to an expected/target receiver power value at receiver UE. In the present disclosure, the term "expected/target" may refer to expected and/or target. In some examples, the determination (e.g., derivation) of PSFCH transmit power may utilize the same alpha value as the determination (e.g., derivation) of transmit power of a conflict-information signaling. Alternatively and/or additionally, the determination (e.g., derivation) of the PSFCH transmit power may utilize an alpha value that is different than an alpha value utilized for the determination (e.g., derivation) of transmit power of a conflict-information signaling. The alpha value may be utilized (as a scaling factor, for example) for compensating DL pathloss value.

In some examples, the transmit power of a conflict-information signaling may be different from the PSFCH transmit power. Alternatively and/or additionally, the transmit power of a conflict-information signaling may be the same as the PSFCH transmit power. In some examples, the transmit power of a conflict-information signaling may be set as the PSFCH transmit power, or the transmit power of a conflict-information signaling may share the same transmit power value with the PSFCH transmit power. In an example, $P_{conflict,one} = P_{PSFCH,one}$.

In a first example scenario, $N_{sch,Tx,PSFCH} + N_{sch,Tx,conflict} \leq N_{max}$, and a transmit power summation of the $N_{sch,Tx,PSFCH}$ scheduled PSFCH transmissions and the $N_{sch,Tx,conflict}$ conflict-information signaling transmissions is smaller than or equal to the maximum UE transmit power (e.g., the transmit power summation corresponds to a sum of transmit powers of the $N_{sch,Tx,PSFCH}$ scheduled PSFCH transmissions and transmit powers of the $N_{sch,Tx,conflict}$ conflict-information signaling transmissions). The UE-A may perform the $N_{sch,Tx,PSFCH}$ scheduled PSFCH transmissions with transmit power $P_{PSFCH,one}$ and perform the $N_{sch,Tx,conflict}$ conflict-information signaling transmissions with transmit power $P_{conflict,one}$. In some examples, if $N_{sch,Tx,conflict} \leq N_{max,conflict}$, the UE-A may perform the $N_{sch,Tx,PSFCH}$ scheduled PSFCH transmissions with transmit power $P_{PSFCH,one}$ and perform the $N_{sch,Tx,conflict}$ conflict-information signaling transmissions with transmit power $P_{conflict,one}$. If $N_{sch,Tx,conflict} > N_{max,conflict}$, the UE-A may perform the $N_{sch,Tx,PSFCH}$ scheduled PSFCH transmissions with transmit power $P_{PSFCH,one}$ and perform $N_{max,conflict}$ conflict-information signaling transmissions, among the $N_{sch,Tx,conflict}$ conflict-information signaling transmissions, with transmit power $P_{conflict,one}$ (e.g., the $N_{max,conflict}$ conflict-information signaling transmissions may be selected from among among the $N_{sch,Tx,conflict}$ conflict-information signaling transmissions). The UE-A may determine (e.g., select) the $N_{max,conflict}$ conflict-information signaling transmissions (e.g., with ascending priority value order) based on priority values of the $N_{sch,Tx,conflict}$ conflict-information signalings.

In a second example scenario, $N_{sch,Tx,PSFCH} + N_{sch,Tx,conflict} \leq N_{max}$, and a transmit power summation of the $N_{sch,Tx,PSFCH}$ scheduled PSFCH transmissions and the $N_{sch,Tx,conflict}$ conflict-information signaling transmissions is larger than the maximum UE transmit power (e.g., the transmit power summation corresponds to a sum of transmit powers of the $N_{sch,Tx,PSFCH}$ scheduled PSFCH transmissions and transmit powers of the $N_{sch,Tx,conflict}$ conflict-information signaling transmissions). The UE-A may determine (e.g., select) $N_{Tx,PSFCH}$ scheduled PSFCH transmissions and $N_{Tx,conflict}$ conflict-information signaling transmissions (e.g., with ascending priority value order) based on priority values of the $N_{sch,Tx,PSFCH}$ scheduled PSFCH transmissions and the $N_{sch,Tx,conflict}$ conflict-information signaling. In some examples, $N_{TX,PSFCH} \leq N_{sch,Tx,PSFCH}$ and $N_{Tx,conflict} \leq N_{sch,Tx,conflict}$. In some examples, $N_{Tx,conflict} \leq N_{max,conflict}$ and/or $N_{TX,PSFCH} \leq N_{max,PSFCH}$. In some examples, a highest priority value among priority values of the $N_{TX,PSFCH}$ scheduled PSFCH transmissions may be $K_{PSFCH}$ and a highest priority value among priority values of the $N_{Tx,conflict}$ conflict-information signaling transmissions may be $K_{conflict}$. In some examples, a highest priority value among priority values of the $N_{TX,PSFCH}$ scheduled PSFCH transmissions and priority values of the $N_{Tx,conflict}$ conflict-information signaling transmissions may be K. In some examples, the UE-A may determine (e.g., select) the $N_{TX,PSFCH}$ scheduled PSFCH transmissions and the $N_{Tx,conflict}$ conflict-information signaling transmissions such that transmit power summation of (i) scheduled PSFCH transmissions (e.g., all scheduled PSFCH transmissions) that have priority values smaller than or equal to $K_{PSFCH}$, and (ii) conflict-information signaling transmissions (e.g., all conflict-information signaling transmissions) that have priority values smaller than or equal to $K_{conflict}$, is smaller than or equal to the maximum UE transmit power. In some examples, the UE-A may determine (e.g., select) the $N_{TX,PSFCH}$ scheduled PSFCH transmissions and the $N_{Tx,conflict}$ conflict-information signaling transmissions such that transmit power summation of (i) all scheduled PSFCH transmissions and (ii) conflict-information signaling transmissions that have priority values smaller than or equal to K, is smaller than or equal to the maximum UE transmit power. In some examples, the UE-A may perform the $N_{TX,PSFCH}$ scheduled PSFCH transmissions and the $N_{Tx,conflict}$ conflict-information signaling transmissions. In some examples, the UE-A may perform the $N_{TX,PSFCH}$ scheduled PSFCH transmissions with transmit power equal to $\min(P_{CMAX} - 10\log_{10}(N_{Tx,PSFCH} + N_{Tx,conflict}), P_{PSFCH,one})$ and the $N_{Tx,conflict}$ conflict-information signaling transmissions with transmit power equal to $\min(P_{CMAX} - 10\log_{10}(N_{Tx,PSFCH} + N_{Tx,conflict}), P_{conflict,one})$. In some examples, the UE-A may perform the $N_{TX,PSFCH}$ scheduled PSFCH transmissions and the $N_{Tx,conflict}$ conflict-information signaling transmissions with transmit power (e.g., the same transmit power) equal to $\min(P_{CMAX} - 10\log_{10}(N_{Tx,PSFCH} + N_{Tx,conflict}), P_{PSFCH,one})$.

In a third example scenario, $N_{sch,Tx,PSFCH} + N_{sch,Tx,conflict} > N_{max}$. The UE-A may determine (e.g., select) $N_{max}$ sidelink transmissions, from among the $N_{sch,Tx,PSFCH}$ scheduled PSFCH transmissions and the $N_{sch,Tx,conflict}$ conflict-information signaling transmissions (e.g., with ascending priority value order) based on priority values of the $N_{sch,Tx,PSFCH}$ scheduled PSFCH transmissions and the $N_{sch,Tx,conflict}$ conflict-information signaling. In some examples, the UE-A may determine (e.g., select) $N_{max}$ sidelink transmissions, from among the $N_{sch,Tx,PSFCH}$ scheduled PSFCH transmissions and the $N_{sch,Tx,conflict}$ conflict-information signaling transmissions, based on prioritizing $N_{sch,Tx,PSFCH}$ scheduled PSFCH transmissions followed by $N_{sch,Tx,conflict}$ conflict-information signaling transmissions (where the $N_{sch,Tx,PSFCH}$ scheduled PSFCH transmissions are prioritized over the $N_{sch,Tx,conflict}$ conflict-information signaling transmissions, for example) or prioritizing $N_{sch,Tx,conflict}$ conflict-information signaling transmissions followed by $N_{sch,Tx,PSFCH}$ scheduled PSFCH transmissions (where the $N_{sch,Tx,conflict}$ conflict-information signaling transmissions are prioritized over the $N_{sch,Tx,PSFCH}$ scheduled PSFCH transmissions, for example). In some examples, the UE-A may determine (e.g., select) $N_{max}$ sidelink transmissions, from among the $N_{sch,Tx,PSFCH}$ scheduled PSFCH transmissions and the $N_{sch,Tx,conflict}$ conflict-information signaling transmissions, based on (i) prioritizing the highest priority conflict-information signaling transmission among the $N_{sch,Tx,PSFCH}$ conflict-information signaling transmissions (and/or selecting the highest priority conflict-information signaling transmission for inclusion in the $N_{max}$ sidelink transmissions) and/or (ii) determining (e.g., selecting) sidelink transmissions (e.g., $N_{max} - 1$ sidelink transmissions), from among the $N_{sch,Tx,PSFCH}$ scheduled PSFCH transmissions and the $(N_{sch,Tx,conflict} - 1)$ conflict-information signaling transmissions (e.g., with ascending priority value order) based on priority values of the $N_{sch,Tx,PSFCH}$ scheduled PSFCH transmissions and the $N_{sch,Tx,conflict}$ conflict-information signalings (e.g., the $N_{max} - 1$ sidelink transmissions may be selected from among the $N_{sch,Tx,PSFCH}$ scheduled PSFCH transmissions and the $(N_{sch,Tx,conflict} - 1)$ conflict-information signaling transmissions for inclusion in the $N_{max}$ sidelink transmissions, and/or the $N_{max} - 1$ sidelink transmissions may be selected following selection of the highest priority conflict-information signaling transmission for inclusion in the $N_{max}$ sidelink transmissions). The ($N_{sch,Tx,conflict}$−1) conflict-information signaling transmissions may comprise conflict-information signaling transmissions, of the $N_{sch,Tx,conflict}$ conflict-information signaling transmissions, other than the highest priority conflict-information signaling transmission (that is already selected for inclusion in the $N_{max}$ sidelink transmissions, for example).

For the third example scenario, if the transmit power summation of the $N_{max}$ sidelink transmissions is smaller than or equal to the maximum UE transmit power, the UE-A may perform $N_{Tx,PSFCH}$ scheduled PSFCH transmissions with transmit power $P_{PSFCH,one}$ and perform $N_{Tx,conflict}$ conflict-information signaling transmissions with transmit power $P_{conflict,one}$ The $N_{max}$ sidelink transmissions comprises the $N_{Tx,PSFCH}$ scheduled PSFCH transmissions and the $N_{Tx,conflict}$ conflict-information signaling transmissions. In some examples, $N_{Tx,PSFCH}+N_{Tx,conflict}=N_{max}$. In some examples, $N_{Tx,conflict}\leq N_{max,conflict}$ and/or $N_{TX,PSFCH}\leq N_{max,PSFCH}$.

For the third example scenario, if the transmit power summation of the $N_{max}$ sidelink transmissions is larger than the maximum UE transmit power, the UE-A may determine (e.g., select) $N_{Tx,PSFCH}$ scheduled PSFCH transmissions and $N_{Tx,conflict}$ conflict-information signaling transmissions (e.g., with ascending priority value order) based on priority values of the $N_{sch,Tx,PSFCH}$ scheduled PSFCH transmissions and the $N_{sch,Tx,conflict}$ conflict-information signaling. In some examples, $N_{TX,PSFCH}\leq N_{sch,Tx,PSFCH}$ and $N_{Tx,conflict}\leq N_{sch,Tx,conflict}$. In some examples, $N_{TX,PSFCH}+N_{Tx,conflict}=N_{max}$. In some examples, $N_{Tx,conflict}\leq N_{max,conflict}$ and/or $N_{TX,PSFCH}\leq N_{max,PSFCH}$. In some examples, a highest priority value among priority values of the $N_{TX,PSFCH}$ scheduled PSFCH transmissions may be $K_{PSFCH}$ and a highest priority value among priority values of the $N_{Tx,conflict}$ conflict-information signaling transmissions may be $K_{conflict}$. In some examples, the highest priority value among priority values of the $N_{TX,PSFCH}$ scheduled PSFCH transmissions and priority values of the $N_{Tx,conflict}$ conflict-information signaling transmissions may be K. In some examples, the UE-A may determine (e.g., select) the $N_{Tx,PSFCH}$ scheduled PSFCH transmissions and the $N_{Tx,conflict}$ conflict-information signaling transmissions such that transmit power summation of (i) scheduled PSFCH transmissions (e.g., all scheduled PSFCH transmissions) that have priority values smaller than or equal to $K_{PSFCH}$, and (ii) conflict-information signaling transmissions (e.g., all conflict-information signaling transmissions) that have priority values smaller than or equal to $K_{conflict}$, is smaller than or equal to the maximum UE transmit power. In some examples, the UE-A may determine (e.g., select) the $N_{TX,PSFCH}$ scheduled PSFCH transmissions and the $N_{Tx,conflict}$ conflict-information signaling transmissions such that transmit power summation of (i) all scheduled PSFCH transmissions and (ii) conflict-information signaling transmissions that have priority values smaller than or equal to K, is smaller than or equal to the maximum UE transmit power. In some examples, the UE-A may perform the $N_{TX,PSFCH}$ scheduled PSFCH transmissions and the $N_{Tx,conflict}$ conflict-information signaling transmissions. In some examples, the UE-A may perform the $N_{TX,PSFCH}$ scheduled PSFCH transmissions with transmit power equal to $\min(P_{CMAX}-10\log_{10}(N_{Tx,PSFCH}+N_{Tx,conflict})/P_{PSFCH},$one) and the $N_{Tx,conflict}$ conflict-information signaling transmissions with transmit power equal to $\min(P_{CMAX}-10\log_{10}(N_{Tx,PSFCH}+N_{Tx,conflict})/P_{conflict,one})$. In some examples, the UE-A may perform the $N_{TX,PSFCH}$ scheduled PSFCH transmissions and the $N_{Tx,conflict}$ conflict-information signaling transmissions with transmit power (e.g., the same transmit power) equal to $\min(P_{CMAX}-10\log_{10}(N_{Tx,PSFCH}+N_{Tx,conflict})/P_{PSFCH,one})$.

For the first example scenario, the second example scenario, and/or the third example scenario, dl-P0-PSFCH may be provided. In some examples, the UE-A may determine (e.g., derive) the PSFCH transmit power, $P_{PSFCH,one}$, based on DL pathloss (and/or based on other information in addition to the DL pathloss). In some examples, the UE-A may determine (e.g., derive) the transmit power of a conflict-information signaling, $P_{conflict,one}$, based on DL pathloss (and/or based on other information in addition to the DL pathloss). In some examples, the UE-A may determine (e.g., derive) the transmit power of a conflict-information signaling, $P_{conflict,one}$, based on target received power $P_{O,conflict}$ determined based on (e.g., derived from) dl-P0-conflict and/or dl-P0-PSFCH. In some examples, the UE-A may determine (e.g., derive) the transmit power of a conflict-information signaling, $P_{conflict,one}$, based on pathloss coefficient $\alpha_{conflict}$ which may be the same as or different than pathloss coefficient $\alpha_{PSFCH}$ for PSFCH. In some examples, $P_{conflict,one}=P_{O,conflict}+10\log_{10}(2^\mu)+\alpha_{conflict}\cdot PL$ [dBm]

In a fourth example scenario, dl-P0-PSFCH may not be provided and/or dl-P0-conflict may not be provided. In some examples, the UE-A may determine (e.g., derive) the PSFCH transmit power, $P_{PSFCH,one}$, based on the maximum UE transmit power. In some examples, the UE-A may determine (e.g., derive) the transmit power of a conflict-information signaling, $P_{conflict,one}$, based on the maximum UE transmit power. In some examples, the UE-A may determine (e.g., select) $N_{TX,PSFCH}$ scheduled PSFCH transmissions and $N_{Tx,conflict}$ conflict-information signaling transmissions (e.g., with ascending priority value order) based on priority values of the $N_{sch,Tx,PSFCH}$ scheduled PSFCH transmissions and the $N_{sch,Tx,conflict}$ conflict-information signaling. In some examples, $N_{TX,PSFCH}\leq N_{sch,Tx,PSFCH}$ and $N_{Tx,conflict}\leq N_{sch,Tx,conflict}$. In some examples, $N_{Tx,PSFCH}+N_{Tx,conflict}\leq N_{max}$. In some examples, $N_{Tx,conflict}\leq N_{max,conflict}$ and/or $N_{TX,PSFCH}\leq N_{max,PSFCH}$. In some examples, the UE-A may perform the $N_{TX,PSFCH}$ scheduled PSFCH transmissions and the $N_{Tx,conflict}$ conflict-information signaling transmissions. In some examples, the UE-A may perform the $N_{TX,PSFCH}$ scheduled PSFCH transmissions with transmit power equal to $P_{CMAX}-10\log_{10}(N_{Tx,PSFCH}+N_{Tx,conflict})$ and the $N_{Tx,conflict}$ conflict-information signaling transmissions with transmit power equal to $P_{CMAX}-10\log_{10}(N_{Tx,PSFCH}+N_{Tx,conflict})$. In some examples, the UE-A may perform the $N_{TX,PSFCH}$ scheduled PSFCH transmissions and the $N_{Tx,conflict}$ conflict-information signaling transmissions with transmit power (e.g., the same transmit power) equal to $P_{CMAX}-10\log_{10}(N_{Tx,PSFCH}+N_{Tx,conflict})$ Example embodiment 1 is described below.

Embodiment 1:

FIG. 14 illustrates an example scenario 1400 associated with a sidelink resource pool configured (e.g., pre-configured) with PSFCH resources. The PSFCH resources may be configured (e.g., pre-configured) periodically with a period of $N_F=4$ sidelink slots associated with the sidelink resource pool. In some examples, PSFCH resources that are in a sidelink slot are in one or two symbols in the sidelink slot. In an example, the PSFCH resources may comprise sets of PSFCH resources with the period of $N_F=4$ sidelink slots. The sets of PSFCH resources may comprise at least one of a first set of PSFCH resources in one or more first PSFCH symbols 1410 (e.g., one or two first PSFCH symbols), a second set of PSFCH resources in one or more second PSFCH symbols 1412 (e.g., one or two first PSFCH symbols), a third set of PSFCH resources in one or more third PSFCH symbols 1414 (e.g., one or two third PSFCH symbols), etc. In some examples, the sidelink resource pool may configure/allocate a first set of PRBs for PSFCH resources. In FIG. 14, the first set of PRBs that are for PSFCH resources are shown as solid white regions in the PSFCH symbols (e.g., PSFCH symbols 1410, 1412, 1414, etc.). In the present disclosure, the term "configure/allocate" may refer to configure and/or allocate.

In some examples, the sidelink resource pool may configure/allocate a second set of PRBs for conflict-information signaling. In FIG. 14, the second set of PRBs that are for conflict-information signaling are shown as diamond pattern-filled regions in the PSFCH symbols (e.g., PSFCH symbols 1410, 1412, 1414, etc.). The conflict-information signaling resources may be configured (e.g., pre-configured) periodically with a period of $N_C=4$ sidelink slots associated with the sidelink resource pool. The conflict-information signaling resources are in the same PSFCH symbols as the PSFCH resources (e.g., the first set of PRBs for PSFCH resources and the second set of PRBs for conflict-information signaling are in the same PSFCH symbols). The conflict-information signaling resources are non-overlapping in frequency domain with the PSFCH resources.

In some examples, UE-A receives a $SCI_{B,1}$ from UE-B, wherein the $SCI_{B,1}$ schedules $PSSCH_{B,1}$ and/or reserves $PSSCH_{B,2}$ for transmitting a data packet. In FIG. 14, PSCCH resources (for receiving SCIs, such as the $SCI_{B,1}$, for example) are shown as black-filled rectangles. In some examples, the $SCI_{B,1}$ is received via PSCCH 1408. If the $SCI_{B,1}$ indicates sidelink HARQ-ACK is enabled (e.g., HARQ-ACK is enabled for the data packet), the UE-A (that is an intended receiver UE of the $PSSCH_{B,1}$) may transmit a $PSFCH_{B,1}$ 1416 to indicate ACK or NACK. The $PSFCH_{B,1}$ 1416 may be indicative of whether or not UE-A successfully decodes/receives $PSSCH_{B,1}$ and/or the data packet (carried by $PSSCH_{B,1}$, for example). In an example, the $PSFCH_{B,1}$ 1416 being indicative of ACK may indicate that UE-A successfully decoded/received $PSSCH_{B,1}$ and/or the data packet (carried by $PSSCH_{B,1}$, for example). In an example, the $PSFCH_{B,1}$ 1416 being indicative of NACK may indicate that UE-A did not successfully decode/receive $PSSCH_{B,1}$ and/or the data packet (carried by $PSSCH_{B,1}$, for example). In the example scenario 1400, timing association between a PSCCH/PSSCH transmission (e.g., $PSSCH_{B,1}$) and one or more associated PSFCH resources (e.g., $PSFCH_{B,1}$ 1416) may be determined (e.g., derived) based on (e.g., considering) a minimum time gap of K=2 slots. In some examples, the UE-A determines (e.g., derives) a PSFCH occasion (of the PSFCH for example) that is in an earliest slot that (i) includes PSFCH resources and (ii) is at least K=2 sidelink slots of the sidelink resource pool after the $PSSCH_{B,1}$ 1416 reception.

In some examples, the UE-A may determine (e.g., detect) presence of an expected/potential resource conflict on $PSSCH_{B,2}$. The UE-A may transmit a conflict-information signaling 1418, noted as conflict-$signal_{B,2}$, to indicate the presence of the expected/potential resource conflict. In the example scenario 1400, timing association between a PSCCH/PSSCH transmission (e.g., the $PSSCH_{B,2}$) and one or more associated conflict-information signaling resource(s) (e.g., for conflict-information signaling 1418) may be determined (e.g., derived) based on (e.g., considering) a minimum time gap of Kc=2 slots. In some examples, the UE-A determines (e.g., derives) a conflict-information signal occasion (of the conflict-$signal_{B,2}$, for example) that is in a last slot that (i) includes one or more conflict-information signaling resources and (ii) is at least Kc=2 slots of the sidelink resource pool before the sidelink slot of the conflicted $PSSCH_{B,2}$ resource.

In some examples, if the UE-A successfully decodes/receives $PSSCH_{B,1}$ 1416 and/or the data packet, and/or if the $PSFCH_{B,1}$ indicates ACK, the UE-A may not transmit the conflict-$signal_{B,2}$ even if the UE-A determines (e.g., detects) presence of the expected/potential resource conflict on $PSSCH_{B,2}$.

In some examples, if the UE-A does not successfully decode/receive $PSSCH_{B,1}$ 1416 and/or the data packet, and/or if the $PSFCH_{B,1}$ indicates NACK, the UE-A may transmit the conflict-$signal_{B,2}$ if the UE-A determines (e.g., detects) presence of the expected/potential resource conflict on $PSSCH_{B,2}$.

In some examples of Embodiment 1, two conflict-information signal resources associated with two different conflicted PSSCH resources may be in the same conflict-information signal occasion and in non-overlapped frequency resources, e.g., conflict-$signal_{B,2}$ for $PSSCH_{B,2}$ and conflict-$signal_{E,2}$ for $PSSCH_{E,2}$.

In some examples of Embodiment 1, $SCI_{D,1}$ (received via PSCCH 1406, for example) schedules $PSSCH_{D,1}$ and/or reserves $PSSCH_{D,2}$ for transmitting a data packet. The conflict-$signal_{D,2}$ for $PSSCH_{D,2}$ is in the same timing occasion as $PSFCH_{D,1}$ associated with $PSSCH_{D,1}$. In some examples, if a receiver UE (e.g., UE-A) of the $PSSCH_{D,1}$ successfully decodes/receives $PSSCH_{D,1}$ and/or the data packet (carried by $PSSCH_{D,1}$, for example), and/or if the receiver UE of the $PSSCH_{D,1}$ transmits (and/or will transmit) the $PSFCH_{D,1}$ indicating ACK, the receiver UE of the $PSSCH_{D,1}$ may not transmit the conflict-$signal_{D,2}$ even if the receiver UE of the $PSSCH_{D,1}$ determines (e.g., detects) presence of the expected/potential resource conflict on $PSSCH_{D,2}$. The receiver UE of the $PSSCH_{D,1}$ may transmit the PSFCH In some examples, if a receiver UE (e.g., UE-A) of the $PSSCH_{D,1}$ does not successfully decode/receive $PSSCH_{D,1}$ and/or the data packet (carried by $PSSCH_{D,1}$, for example), and/or if the receiver UE of the $PSSCH_{D,1}$ transmits (and/or will transmit) the $PSFCH_{D,1}$ indicates NACK, the receiver UE of the $PSSCH_{D,1}$ may transmit the conflict-$signal_{D,2}$ if the receiver UE of the $PSSCH_{D,1}$ determines (e.g., detects) presence of the expected/potential resource conflict on $PSSCH_{D,2}$. For example, the receiver UE of the $PSSCH_{D,1}$ may transmit the PSFCH D,1 and conflict-$signal_{D,2}$ in the same PSFCH symbol(s). Alternatively and/or additionally, the receiver UE of the $PSSCH_{D,1}$ may transmit the conflict-$signal_{D,2}$ and not transmit the PSFCH D,1 if the conflict-$signal_{D,2}$ and the PSFCH D,1 are in the same PSFCH symbol(s) (and/or the same occasion) and if the PSFCH D,1 indicates NACK, such as due, at least in part, to the transmitter UE of the $PSSCH_{D,1}$ being able to determine (e.g., derive and/or know) that the receiver UE of the $PSSCH_{D,1}$ did not successfully decode/receive $PSSCH_{D,1}$ and/or the data packet (carried by $PSSCH_{D,1}$, for example) based on (e.g., in response to) not receiving/detecting the PSFCH D,1 and/or receiving/detecting the conflict-$signal_{D,2}$ (in the same PSFCH symbol(s) and/or occasion, for example). Thus, the receiver UE of the $PSSCH_{D,1}$ may not need to transmit the PSFCH D,1, thereby saving power of the receiver UE.

One, some and/or all of the foregoing examples, concepts, techniques and/or embodiments can be formed and/or combined to a new embodiment.

In some examples, embodiments disclosed herein, such as embodiments described with respect to Concept A, Concept B, Concept C, Concept D, Concept E, Concept F and Embodiment 1, may be implemented independently and/or separately. Alternatively and/or additionally, a combination of embodiments described herein, such as embodiments described with respect to Concept A, Concept B, Concept C, Concept D, Concept E, Concept F and/or Embodiment 1, may be implemented. Alternatively and/or additionally, a combination of embodiments described herein, such as embodiments described with respect to Concept A, Concept B, Concept C, Concept D, Concept E, Concept F and/or Embodiment 1, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, a signaling occasion (e.g., a conflict information signaling occasion) may comprise a plurality of conflict information signaling resources. Possible priority values (e.g., priority values 1~8) may be separated and/or distributed into a plurality of priority value sets (e.g., priority value groups and/or subsets) associated with the plurality of conflict information signaling resources. In an example, the plurality of conflict information signaling resources may comprise 4 conflict information signaling resources and/or the plurality of value sets may comprise 4 priority value sets, e.g., a first set of priority values {1,2} (associated with 1-st conflict-information signaling resource among the plurality of conflict-information signaling resources, for example), a second set of priority values {3,4} (associated with 2-nd conflict-information signaling resource among the plurality of conflict-information signaling resources, for example), a third set of priority values {5,6} (associated with 3-rd conflict-information signaling resource among the plurality of conflict-information signaling resources, for example,), and a fourth set of priority values {7,8} (associated with 4-th conflict-information signaling resource among the plurality of conflict-information signaling resources, for example). In some examples, a priority value set size of a priority value set (e.g., a priority value group and/or subset) may be configured (e.g., pre-configured), such as configured per pool (e.g., per sidelink resource pool) and/or may be configured via PC5-RRC signaling between unicast link of two UEs (e.g., UE-A and UE-B). In some examples, the priority value set may be a priority value set of a plurality of priority values sets (associated with the plurality of conflict-information signaling resources, for example). In some examples, a maximum priority value set size may be configured (e.g., pre-configured), such as configured per pool (e.g., per sidelink resource pool) and/or may be configured via PC5-RRC signaling between unicast link of two UEs (e.g., UE-A and UE-B). The priority value set size of the priority value set may be at most the maximum priority value set size. For example, the priority value set size of the priority value set may correspond to a number of priority values in the priority value set and/or the maximum priority value set size may correspond to a maximum number of priority values for each set of the plurality of priority value sets. In an example, the maximum priority value set size may be 2 (e.g., each priority value set may comprise at most two priority values of possible priority values). In some examples, UE-A, UE-B, and/or UE-C may determine (e.g., derive) each priority value set starting from highest priority value (e.g., 8). In some examples, there are Z conflict-information signaling resources (e.g., Z<8) (e.g., a number of conflict-information signaling resources of the plurality of conflict-information signaling resources is equal to Z), and there are two priority value set sizes of priority value sets among the plurality of priority value sets. The two priority value set sizes may comprise a first priority value set size that is equal to a result of a ceiling function performed using the highest priority value and/or the number of conflict-information signaling resources (e.g., the first priority value set size is equal to ceil (8/Z), such as where a number of priority values included in a priority value set having the first priority value set size is equal to ceil (8/Z)). The two priority value set sizes may comprise a second priority value set size that is equal to a result of a floor function performed using the highest priority value and/or the number of conflict-information signaling resources (e.g., the second priority value set size is equal to floor (8/Z), such as where a number of priority values included in a priority value set having the second priority value set size is equal to floor (8/Z)). In some examples, a number of priority value sets (of the plurality of priority value sets, for example) that have the first priority value set size may be equal to a result of a modulo operation performed using the highest priority value and/or the number of conflict-information signaling resources (e.g., the number of priority value sets that have the first priority value set size may be equal to (8 mod Z)). In some examples, a number of priority value sets (of the plurality of priority value sets, for example) that have the second priority value set size may be equal to a result of a modulo operation performed using the highest priority value and/or the number of conflict-information signaling resources (e.g., the number of priority value sets that have the second priority value set size may be equal to (Z−8 mod Z)). In some examples, grouping of the plurality of priority value sets is performed starting from the highest priority value (e.g., 8) and/or may be performed in descending order of priority values. In some examples, grouping of the plurality of priority value sets may exclude priority value 1 (e.g., the plurality of priority value sets may not comprise priority value 1). In some examples, grouping of the plurality of priority value sets may exclude one or more priority values that are smaller than a priority threshold. For example, if the priority threshold is 3, there are no conflict-information resources associated with priority value 1 and/or priority value 2. Alternatively and/or additionally, the number of conflict-information signaling resources associated with a PSSCH (e.g., one PSSCH) may be divisible to a number of priority values. For example, if the number of priority values is 8 (e.g., the number of priority values corresponds to 8 priority values in priority values 1~8), 8 conflict-information resources associated with a PSSCH (e.g., one PSSCH) may be expected. If the number of priority values is 7 (e.g., the number of priority values corresponds to 7 priority values in priority values 2~8), 7 conflict-information resources associated with a PSSCH (e.g., one PSSCH) may be expected.

With respect to one or more embodiments herein, in some examples, for sidelink, a lower priority value may correspond to (e.g., may indicate) a higher priority (e.g., a higher data priority).

With respect to one or more embodiments herein, in some examples, a signaling occasion (e.g., a time unit of a signaling occasion) may correspond to (e.g., may be and/or may refer to) a sidelink slot.

With respect to one or more embodiments herein, in some examples, a signaling occasion (e.g., a time unit of a signaling occasion) correspond to (e.g., may be and/or may refer to) one or more symbols utilized for conflict-information signaling (e.g., one or more conflict-information signaling resources) in a sidelink slot.

With respect to one or more embodiments herein, the sidelink transmission from the UE may correspond to (e.g., may be and/or may refer to) PSSCH transmission. In some examples, the sidelink transmission from the UE may be a device-to-device transmission With respect to one or more embodiments herein, in some examples, a physical layer source ID may correspond to (e.g., may be and/or may refer to) a Layer-1 source ID. In some examples, a physical layer source ID may comprise at least part of a Layer-2 source ID. In some examples, a physical layer source ID may be indicated via a 8-bit field in a sidelink control information (e.g., a $2^{nd}$ stage sidelink control information). In some examples, a Layer-2 source ID may have 24 bits.

With respect to one or more embodiments herein, in some examples, a physical layer destination ID may correspond to (e.g., may be and/or may refer to) a Layer-1 destination ID. In some examples, a physical layer destination ID may comprise at least part of a Layer-2 destination ID. In some examples, a physical layer destination ID may be indicated via a 16-bit field in a sidelink control information (e.g., a $2^{nd}$ stage sidelink control information). In some examples, a Layer-2 destination ID may have 24 bits.

With respect to one or more embodiments herein, in some examples, a UE monitoring a slot may comprise the UE monitoring/receiving/detecting sidelink control information (SCI) (e.g., all sidelink control information) in the slot in the sidelink resource pool. In the present disclosure, the term "monitoring/receiving/detecting" may refer to monitoring, receiving and/or detecting.

With respect to one or more embodiments herein, in some examples, the sidelink control information may be delivered in PSCCH (and/or in one or more other channels in addition to PSCCH). In some examples, the sidelink control information may comprise 1st stage SCI. In some examples, the 1st stage SCI may be transmitted via PSCCH. In some examples, the sidelink control information may comprise 2nd stage SCI. In some examples, the 2nd stage SCI may be transmitted via multiplexing the 2nd stage SCI with PSSCH. In some examples, the SCI format 1 is 1st stage SCI. In some examples, the SCI format 2-A is a 2nd stage SCI. In some examples, the SCI format 2-B is a 2nd stage SCI.

With respect to one or more embodiments herein, in some examples, the slot may correspond to (e.g., may be and/or may refer to) a sidelink slot. In some examples, the slot may be represented as and/or replaced with a Transmission Time Interval (TTI). In some examples, in the present disclosure, one, some and/or all instances of the term "slot" may be replaced with the term "TTI".

With respect to one or more embodiments herein, in some examples, the sidelink slot may correspond to (e.g., may be and/or may refer to) slot for sidelink. In some examples, a TTI may be a subframe (for sidelink, for example), a slot (for sidelink, for example) or a sub-slot (for sidelink, for example). In some examples, a TTI comprises multiple symbols, e.g. 12, 14 or other number of symbols. In some examples, a TTI may be a slot comprising sidelink symbols (e.g., the slot may fully/partially comprise the sidelink symbols). In some examples, a TTI may mean a transmission time interval for a sidelink transmission (e.g., a sidelink data transmission). In some examples, a sidelink slot (e.g., a slot for sidelink) may comprise OFDM symbols (e.g., all OFDM symbols) available for sidelink transmission. In some examples, a sidelink slot (e.g., a slot for sidelink) may comprise a set of contiguous (e.g., consecutive) symbols that are available for sidelink transmission. In some examples, a sidelink slot (e.g., a slot for sidelink) may correspond to (e.g., may be and/or may refer to) a slot that is included in a sidelink resource pool.

With respect to one or more embodiments herein, in some examples, the symbol may correspond to (e.g., may be and/or may refer to) a symbol indicated/configured for sidelink.

With respect to one or more embodiments herein, in some examples, the slot may correspond to (e.g., may be and/or may refer to) a sidelink slot associated with the sidelink resource pool. In some examples, the slot may not correspond to (e.g., may not comprise and/or may not refer to) a sidelink slot associated with a different sidelink resource pool.

With respect to one or more embodiments herein, in some examples, contiguous slots may correspond to (e.g., may be and/or may refer to) contiguous sidelink slots that are in and/or for the sidelink resource pool.

With respect to one or more embodiments herein, in some examples, the contiguous slots may or may not be contiguous in physical slots. For example, the contiguous slots in the sidelink resource pool may be not contiguous from the perspective of physical slot (e.g., between two contiguous slots in the sidelink resource pool there may be a physical slot that is not in the sidelink resource pool). In some examples, the contiguous slots may or may not be contiguous in sidelink slots that are in and/or for a sidelink Band-Width Part (BWP) or a sidelink carrier/cell. For example, the contiguous slots in the sidelink resource pool may be not contiguous from the perspective of sidelink slots in a sidelink BWP and/or a sidelink carrier/cell (e.g., between two contiguous slots in the sidelink resource pool, there may be a slot, in a sidelink BWP and/or a sidelink carrier/cell, that is not in the sidelink resource pool). In some examples, there may be one or more sidelink resource pools in a sidelink BWP and/or a sidelink carrier/cell.

With respect to one or more embodiments herein, in some examples, the sidelink data (e.g., first sidelink data, such as data transmitted and/or received via the first sidelink data resource) may correspond to (e.g., may comprise and/or may refer to) a transport block (TB). In some examples, the sidelink data may correspond to (e.g., may comprise and/or may refer to) a Medium Access Control (MAC) Protocol Data Unit (PDU). In some examples, the sidelink data may correspond to (e.g., may comprise and/or may refer to) a data packet (e.g., the first data packet transmitted and/or received via the first sidelink data resource).

With respect to one or more embodiments herein, in some examples, the sidelink data (e.g., the first sidelink data, such as data transmitted and/or received via the first sidelink data resource) is associated with a sidelink logical channel (and/or one or more other channels in addition to the sidelink logical channel). In some examples, the sidelink data comprises data from a sidelink logical channel (and/or one or more other channels in addition to the sidelink logical channel).

With respect to one or more embodiments herein, in some examples, a sub-channel is a unit for sidelink resource allocation and/or scheduling (e.g., sidelink resource allocation and/or scheduling for PSSCH). In some examples, a sub-channel may comprise multiple contiguous PRBs in frequency domain. In some examples, the number of PRBs for each sub-channel may be configured (e.g., pre-configured) for a sidelink resource pool. In some examples, a sidelink resource pool configuration (e.g., a sidelink resource pool pre-configuration) may indicate and/or configure the number of PRBs for each sub-channel. In some examples, the number of PRBs for a sub-channel (e.g., each sub-channel of one, some and/or all sub-channels of the sidelink resource pool) may be 4, 5, 6, 8, 9, 10, 12, 15, 16, 18, 20, 25, 30, 48, 50, 72, 75, 96, 100, and/or other value. In some examples, a sub-channel may be represented as a unit for sidelink resource allocation and/or scheduling. In some examples, a sub-channel may correspond to (e.g., may be and/or may refer to) a PRB. In some examples, a sub-channel may correspond to (e.g., may be and/or may refer to) a set of contiguous (e.g., consecutive) PRBs in frequency domain. In some examples, a sub-channel may correspond to (e.g., may be and/or may refer to) a set of contiguous (e.g., consecutive) resource elements in frequency domain.

With respect to one or more embodiments herein, in some examples, the resource reservation period value may be in units of milliseconds. In some examples, the resource reservation period value may be in units of slots for determining (e.g., deriving) periodic occasions of periodic sidelink data resources. In some examples, the resource reservation period value may be converted (from units of milliseconds, for example) to units of slots to determine (e.g., derive) periodic occasions of periodic sidelink data resources (e.g., based upon the reservation period value, a period of the periodic sidelink data resources may be determined to be Q, wherein Q is in units of slots).

With respect to one or more embodiments herein, in some examples, the UE-A acquires resource reservation information from one or more other UEs via one or more received SCIs from the one or more other UEs. In some examples, the one or more received SCIs from the one or more other UEs comprises resource reservation information of the one or more other UEs.

With respect to one or more embodiments herein, in some examples, the first data packet is for the UE-A. In some examples, the UE-B performs one or more sidelink transmissions, such as one or more sidelink transmissions comprising the first data packet. In some examples, the first data packet is for (e.g., transmitted for) a sidelink group comprising the UE-A and the UE-B (and/or one or more other UEs in addition to the UE-A and the UE-B).

With respect to one or more embodiments herein, in some examples, a UE may correspond to (e.g., may comprise and/or may refer to) a device. In some examples, in the present disclosure, one, some and/or all instances of the term "UE" may be replaced with the term "device".

With respect to one or more embodiments herein, in some examples, a sidelink transmission/reception may be a UE-to-UE transmission/reception, a device-to-device transmission/reception, a Vehicle-to-Everything (V2X) transmission/reception, a Pedestrian-to-Everything (P2X) transmission/reception, and/or a transmission/reception performed on PC5 interface.

With respect to one or more embodiments herein, in some examples, the PC5 interface may be a wireless interface for communication between devices (e.g., communication between a first device and a second device), a wireless interface for communication between UEs, and/or a wireless interface for V2X communication and/or P2X communication. In some examples, the Uu interface may be a wireless interface for communication between a network node and a device and/or a wireless interface for communication between a network node and a UE.

With respect to one or more embodiments herein, in some examples, the UE-A may be a first device and/or a first UE. In some examples, the first device may be a vehicle UE. In some examples, the first device may be a V2X UE.

With respect to one or more embodiments herein, in some examples, the UE-B may be a second device and/or a second UE. In some examples, the second device may be a vehicle UE. In some examples, the second device may be a V2X UE.

With respect to one or more embodiments herein, in some examples, the UE-C may be a third device and/or a third UE. In some examples, the third device may be a vehicle UE. In some examples, the third device may be a V2X UE.

FIG. 15 is a flow chart 1500 according to one exemplary embodiment (for performing sidelink communication, for example) from the perspective of a first device. In step 1505, the first device receives a first sidelink control information in a first sidelink TTI in a sidelink resource pool, wherein the first sidelink control information is indicative of a first sidelink resource in a second sidelink TTI. For example, the first sidelink control information may reserve the first sidelink resource in the second sidelink TTI. In step 1510, the first device determines (e.g., detects and/or predicts) a conflict (e.g., an expected and/or potential resource conflict) associated with the first sidelink resource. In step 1515, the first device determines a transmission occasion for a first sidelink transmission with conflict information (e.g., conflict information indicative of the conflict associated with the first sidelink resource). For example, the first sidelink transmission may comprise the conflict information. The first device may trigger (and/or schedule) the first sidelink transmission with the conflict information. The first device may trigger and/or schedule the first sidelink transmission in response to determining the conflict associated with the first sidelink resource. The first device may determine a plurality of sidelink transmissions in the transmission occasion. For example, the first device may have, trigger and/or schedule the plurality of sidelink transmissions in the transmission occasion. The plurality of sidelink transmissions comprises a first set of sidelink transmissions with conflict information (e.g., sidelink transmissions of the first set of sidelink transmissions may comprise conflict information) and/or a second set of sidelink transmissions with sidelink HARQ feedback (e.g., sidelink transmissions of the second set of sidelink transmissions may comprise sidelink HARQ feedback). For example, the plurality of sidelink transmissions may comprise transmissions scheduled and/or triggered to be performed (by the first device, for example) in the transmission occasion. A transmission of the first set of sidelink transmissions (and/or each transmission of the first set of sidelink transmissions) is a conflict information transmission (e.g., a sidelink transmission with conflict information, such as a sidelink transmission comprising conflict information). A transmission of the second set of sidelink transmissions (and/or each transmission of the second set of sidelink transmissions) is a HARQ feedback transmission (e.g., a sidelink transmission with HARQ feedback, such as a sidelink transmission comprising HARQ feedback). The first set of sidelink transmissions comprises the first sidelink transmission (and/or one or more other sidelink transmissions in addition to the first sidelink transmission, such as one or more conflict information transmissions). In step 1520, the first device determines one or more sidelink transmissions of the plurality of sidelink transmissions (e.g., the one or more sidelink transmissions may be a subset of sidelink transmissions, of the plurality of sidelink transmissions, that the first device selects from among the plurality of sidelink transmissions). The determination (e.g., selection) of the one or more sidelink transmissions comprises prioritizing HARQ feedback transmission (e.g., the second set of transmissions with sidelink HARQ feedback) over conflict information transmission (e.g., the first set of transmissions with conflict information) if the plurality of sidelink transmissions comprises both the first set of sidelink transmissions and the second set of sidelink transmissions. For example, selecting HARQ feedback transmissions for inclusion in the one or more sidelink transmissions may be prioritized over selecting conflict information transmissions for inclusion in the one or more sidelink transmissions. At 1525, the first device performs the one or more sidelink transmissions in the transmission occasion.

In one embodiment, the first device is capable of transmitting up to a maximum number of sidelink transmissions concurrently (e.g., at the same time and/or simultaneously) and/or in the transmission occasion (e.g., the first device may not perform more than the maximum number of sidelink transmissions concurrently, and/or the first device may not perform more than the maximum number of sidelink transmissions in the transmission occasion). Alternatively and/or additionally, a number/amount of the plurality of sidelink transmissions is larger than the maximum number (of sidelink transmissions). Alternatively and/or additionally, a number/amount of the one or more sidelink transmissions is smaller than or equal to the maximum number (of sidelink transmissions). Alternatively and/or additionally, the determination of the one or more sidelink transmissions is performed based on (e.g., in response to) the number/amount of the plurality of sidelink transmissions being larger than the maximum number (of sidelink transmissions), such as when the number/amount of the plurality of sidelink transmissions is larger than the maximum number (of sidelink transmissions). For example, the one or more sidelink transmissions may correspond to a subset of the plurality of sidelink transmissions based on the number/amount of the plurality of sidelink transmissions being larger than the maximum number (of sidelink transmissions). For example, the one or more sidelink transmissions may be determined (e.g., selected from the plurality of sidelink transmissions) such that the number/amount of the one or more sidelink transmissions is smaller than or equal to the maximum number (of sidelink transmissions).

In one embodiment, in the transmission occasion, the first device does not perform other sidelink transmissions, of the plurality of sidelink transmissions, that are different than the one or more sidelink transmissions (e.g., among the plurality of sidelink transmission, the first device only performs the one or more sidelink transmissions in the transmission occasion). Alternatively and/or additionally, the one or more sidelink transmissions (e.g., all sidelink transmissions of the one or more sidelink transmissions) are performed concurrently (e.g., simultaneously) in the transmission occasion. Alternatively and/or additionally, each sidelink transmission of the one or more sidelink transmissions may correspond to a PSFCH transmission (e.g., each sidelink transmission of the one or more sidelink transmissions may be/comprise a PSFCH transmission).

In one embodiment, each sidelink transmission of the one or more sidelink transmissions is transmitted with a same transmit power (e.g., all the one or more sidelink transmissions are transmitted with the same transmit power).

In one embodiment, the first sidelink control information is indicative of a first priority value, is received by the first device and is transmitted from a second device. Alternatively and/or additionally, the first device may receive, from a third device, a second sidelink control information in the sidelink resource pool, wherein the second sidelink control information is indicative of a second sidelink resource in the second sidelink TTI (e.g., the second sidelink control information may reserve the second sidelink resource in the second sidelink TTI), and the second sidelink resource (partially or fully) overlaps (e.g., conflicts), in time domain and frequency domain, with the first sidelink resource. In some examples, the second sidelink control information is indicative of a second priority value smaller than the first priority value (e.g., the second priority value may be indicative of a higher priority than a priority indicated by the first priority value). Alternatively and/or additionally, the determination of the conflict comprises determining that the first sidelink resource overlaps with the second sidelink resource. Alternatively and/or additionally, the first device may trigger, determine, and/or schedule the first sidelink transmission in response to determining the conflict (e.g., in response to determining that the first sidelink resource overlaps with the second sidelink resource). Alternatively and/or additionally, the first sidelink transmission may be associated with the second priority value.

In one embodiment, the first sidelink transmission corresponds to a PSFCH transmission (e.g., the first sidelink transmission is and/or comprises a PSFCH transmission). Alternatively and/or additionally, the transmission occasion may be a PSFCH occasion. Alternatively and/or additionally, the transmission occasion may be in the sidelink resource pool. Alternatively and/or additionally, the transmission occasion comprises one or more symbols, for PSFCH transmission, in a third sidelink TTI. Alternatively and/or additionally, the third sidelink TTI is after (e.g., later than) the first sidelink TTI, and is before (e.g., earlier than) the second sidelink TTI.

In one embodiment, the first sidelink transmission is associated with a third priority value. Alternatively and/or additionally, the second set of sidelink transmissions may comprise a second sidelink transmission with sidelink HARQ feedback associated with a fourth priority value. Alternatively and/or additionally, the third priority value associated with the first sidelink transmission may be smaller than the fourth priority value associated with the second sidelink transmission (e.g., the third priority value may be indicative of a higher priority than a priority indicated by the fourth priority value). Alternatively and/or additionally, the determination of the one or more sidelink transmissions comprises prioritizing the second sidelink transmission over the first sidelink transmission. For example, selection of the second sidelink transmission for inclusion in the one or more sidelink transmissions may be prioritized over selection of the first sidelink transmission for inclusion in the one or more sidelink transmissions (e.g., the second sidelink transmission may be prioritized over the first sidelink transmission based on the second sidelink transmission being a HARQ feedback transmission and the first sidelink transmission being a conflict information transmission, wherein HARQ feedback transmissions are prioritized over conflict information transmissions).

In one embodiment, the determination of the one or more sidelink transmissions comprises (i) selecting/determining, from the second set of sidelink transmissions and in ascending order of corresponding priority values over the second set of sidelink transmissions (e.g., priority values associated with the second set of sidelink transmissions), one or more second sidelink transmissions with sidelink HARQ feedback for inclusion in the one or more sidelink transmissions, and (ii) after the selecting the one or more second sidelink transmissions with sidelink HARQ feedback from the second set of sidelink transmissions with sidelink HARQ feedback, selecting/determining, from the first set of sidelink transmissions and in ascending order of corresponding priority values over the first set of sidelink transmissions (e.g., priority values associated with the first set of sidelink transmissions), zero or more (first) sidelink transmissions with conflict information for inclusion in the one or more sidelink transmissions (e.g., the zero or more (first) sidelink transmissions may comprise zero sidelink transmissions, one sidelink transmission, two sidelink transmission, etc.).

In one embodiment, the selection/determination of the one or more sidelink transmissions may be performed based on a sidelink transmission capability (associated with the first device, for example). The sidelink transmission capability may correspond to a maximum number of sidelink transmissions that the first device can transmit concurrently (e.g., simultaneously) and/or in the transmission occasion. Alternatively and/or additionally, the sidelink transmission capability may correspond to a maximum UE transmit power. In an example, the one or more sidelink transmissions may be determined (e.g., selected from the plurality of sidelink transmissions) such that a number of sidelink transmissions of the one or more sidelink transmissions does not exceed the maximum number of sidelink transmissions.

In an example, if the number/amount of the second set of sidelink transmissions does not exceed the sidelink transmission capability, the one or more sidelink transmissions may comprise all sidelink transmissions (e.g., HARQ feedback transmissions) of the second set of sidelink transmissions (e.g., all sidelink transmissions of the second set of sidelink transmissions may be included in the one or more sidelink transmissions).

In an example, if the number/amount of the second set of sidelink transmissions exceeds the sidelink transmission capability, the one or more sidelink transmissions may comprise a subset of sidelink transmissions (e.g., with lower priority values over the second set of sidelink transmissions) of the second set of sidelink transmissions (e.g., merely some of the second set of sidelink transmissions may be included in the one or more sidelink transmissions). In an example, the number/amount of the subset of sidelink transmissions of the second set of sidelink transmissions may be less than or equal to the sidelink transmission capability (e.g., less than or equal to the maximum number of sidelink transmissions).

The selection/determination of the zero or more (first) sidelink transmissions from the first set of sidelink transmissions may be performed based on a remaining sidelink transmission capability (associated with the first device, for example). The remaining sidelink transmission capability may correspond to a remaining number of sidelink transmissions, after the selection/determination of the one or more second sidelink transmissions from the second set of sidelink transmissions for inclusion in the one or more sidelink transmissions.

In an example, the maximum number of sidelink transmissions may be o and the number/amount of the one or more second sidelink transmissions with HARQ feedback that are selected (from the second set of sidelink transmissions) for inclusion in the one or more sidelink transmissions may be h. The remaining number of sidelink transmissions may be r, where r=o−h. In some examples, if the remaining number of sidelink transmissions is zero, no transmission of the first set of sidelink transmissions is included in the one or more sidelink transmissions. In some examples, if the remaining number of sidelink transmissions is non-zero, the one or more sidelink transmissions may comprise a set (e.g., subset) of sidelink transmissions (e.g., with lower priority values over the first set of sidelink transmissions) of the first set of sidelink transmissions. The number/amount of the set (e.g., subset) of sidelink transmissions of the first set of sidelink transmissions is at most equal to the remaining number of sidelink transmissions r.

In an example, if the number/amount of the first set of sidelink transmissions does not exceed the remaining sidelink transmission capability (e.g., the remaining number of sidelink transmissions), the one or more sidelink transmissions may comprise all sidelink transmissions of the first set of sidelink transmissions (e.g., all sidelink transmissions of the first set of sidelink transmissions may be included in the one or more sidelink transmissions).

In an example, if the number/amount of the first set of sidelink transmissions exceeds the remaining sidelink transmission capability (e.g., the remaining number of sidelink transmissions), the one or more sidelink transmissions may comprise a subset of sidelink transmissions (e.g., with lower priority values over the first set of sidelink transmissions) of the first set of sidelink transmissions (e.g., merely some of the first set of sidelink transmissions may be included in the one or more sidelink transmissions).

In one embodiment, the determination of the one or more sidelink transmissions comprises (i) selecting, from the second set of sidelink transmissions, one or more second sidelink transmissions with sidelink HARQ feedback for inclusion in the one or more sidelink transmissions, and (ii) after the selecting the one or more second sidelink transmissions with sidelink HARQ feedback, one of: (A) if (e.g., when) there is remaining capability of sidelink transmissions, selecting/determining/prioritizing, from the first set of sidelink transmissions, one or more (first) sidelink transmissions with conflict information for inclusion in the one or more sidelink transmissions, or (B) if (e.g., when) there is no remaining capability of sidelink transmissions, not selecting/determining/prioritizing any sidelink transmission from the first set of sidelink transmissions for inclusion in the one or more sidelink transmissions. For example, there may be no remaining capability if (e.g., when) the sidelink transmission capability does not exceed the number/amount of the second set of sidelink transmissions. If (e.g., when) the sidelink transmission capability does not exceed the number/amount of the second set of sidelink transmissions with sidelink HARQ feedback, zero sidelink transmissions with conflict information may be included in the one or more sidelink transmissions. In the present disclosure, the term "selecting/determining/prioritizing" may refer to selecting, determining and/or prioritizing.

In one embodiment, the plurality of sidelink transmissions is associated with a plurality of devices. For example, at least some of the plurality of sidelink transmissions may be transmitted to and/or may be for at least some devices of the plurality of devices. Alternatively and/or additionally, the plurality of devices may comprise the second device (and/or one or more other devices in addition to the second device, such as at least one of the third device, a fourth device, a fifth device, etc.).

In some examples, in a scenario in which the plurality of sidelink transmissions comprises the first set of sidelink transmissions with conflict information and does not comprise the second set of sidelink transmissions with HARQ feedback (e.g., the plurality of sidelink transmissions does not comprise any HARQ feedback transmissions), the one or more sidelink transmissions may comprise sidelink transmission(s) with conflict information of the first set of sidelink transmissions and/or the one or more sidelink transmissions may not comprise any sidelink transmission with HARQ feedback.

In some examples, in a scenario in which the plurality of sidelink transmissions comprises the second set of sidelink transmissions with HARQ feedback and does not comprise the first set of sidelink transmissions with conflict information (e.g., the plurality of sidelink transmissions does not comprise conflict information transmissions), the one or more sidelink transmissions may comprise sidelink transmission(s) with HARQ feedback of the second set of sidelink transmissions and/or the one or more sidelink transmissions may not comprise any sidelink transmission with conflict information.

Referring back to FIGS. 3 and 4, in one exemplary embodiment (for performing sidelink communication, for example) of a first device, the device 300 includes a program code 312 stored in the memory 310. The CPU 308 may execute program code 312 to enable the first device (i) to receive a first sidelink control information in a first sidelink TTI in a sidelink resource pool, wherein the first sidelink control information is indicative of a first sidelink resource in a second sidelink TTI, (ii) to determine a conflict associated with the first sidelink resource, (iii) to determine a transmission occasion for a first sidelink transmission with conflict information, wherein the first device may determine a plurality of sidelink transmissions in the transmission occasion (e.g., the first device may have, trigger, and/or schedule the plurality of sidelink transmissions in the transmission occasion), wherein the plurality of sidelink transmissions comprises a first set of sidelink transmissions with conflict information and/or a second set of sidelink transmissions with sidelink HARQ feedback, and wherein the first set of sidelink transmissions comprises the first sidelink transmission, (iv) to determine one or more sidelink transmissions of the plurality of sidelink transmissions, wherein the determining the one or more sidelink transmissions comprises prioritizing HARQ feedback transmission over conflict information transmission if the plurality of sidelink transmissions comprises both the first set of sidelink transmissions and the second set of sidelink transmissions, and (v) to perform the one or more sidelink transmissions in the transmission occasion. Furthermore, the CPU 308 can execute the program code 312 to perform one, some and/or all of the above-described actions and steps and/or others described herein.

FIG. 16 is a flow chart 1600 according to one exemplary embodiment (for performing sidelink communication, for example) from the perspective of a first device. In step 1605, the first device receives a first sidelink control information in a first sidelink TTI in a sidelink resource pool, wherein the first sidelink control information is indicative of a first sidelink resource in a second sidelink TTI. For example, the first sidelink control information may reserve the first sidelink resource in the second sidelink TTI. In step 1610, the first device determines (e.g., detects and/or predicts) a conflict (e.g., an expected and/or potential resource conflict) associated with the first sidelink resource. In step 1615, the first device determines a transmission occasion for a first sidelink transmission with conflict information (e.g., conflict information indicative of the conflict associated with the first sidelink resource). For example, the first sidelink transmission may comprise the conflict information. For example, the first device may trigger (and/or schedule) the first sidelink transmission with the conflict information. The first device may trigger and/or schedule the first sidelink transmission in response to determining the conflict associated with the first sidelink resource. The first device may determine a plurality of sidelink transmissions in the transmission occasion. For example, the first device may have, trigger and/or schedule the plurality of sidelink transmissions in the transmission occasion. The plurality of sidelink transmissions comprises a first set of sidelink transmissions with conflict information (e.g., sidelink transmissions of the first set of sidelink transmissions may comprise conflict information) and/or a second set of sidelink transmissions with sidelink HARQ feedback (e.g., sidelink transmissions of the second set of sidelink transmissions may comprise sidelink HARQ feedback). For example, the plurality of sidelink transmissions may comprise transmissions scheduled and/or triggered to be performed (by the first device, for example) in the transmission occasion. A transmission of the first set of sidelink transmissions (and/or each transmission of the first set of sidelink transmissions) is a conflict information transmission (e.g., a sidelink transmission with conflict information, such as a sidelink transmission comprising conflict information). A transmission of the second set of sidelink transmissions (and/or each transmission of the second set of sidelink transmissions) is a HARQ feedback transmission (e.g., a sidelink transmission with HARQ feedback, such as a sidelink transmission comprising HARQ feedback). The first set of sidelink transmissions comprises the first sidelink transmission (and/or one or more other sidelink transmissions in addition to the first sidelink transmission, such as one or more conflict information transmissions). In step 1620, the first device determines one or more sidelink transmissions of the plurality of sidelink transmissions (e.g., the one or more sidelink transmissions may be a subset of sidelink transmissions, of the plurality of sidelink transmissions, that the first device selects from among the plurality of sidelink transmissions). The determination (e.g., selection) of the one or more sidelink transmissions comprises (i) selecting, from the second set of sidelink transmissions, one or more second sidelink transmission with sidelink HARQ feedback for inclusion in the one or more sidelink transmissions, and (ii) after the selecting the one or more second sidelink transmissions with sidelink HARQ feedback from the second set of sidelink transmissions, selecting, from the first set of sidelink transmissions, zero or more (first) sidelink transmissions with conflict information for inclusion in the one or more sidelink transmissions (e.g., the zero or more (first) sidelink transmissions may comprise zero sidelink transmissions, one sidelink transmission, two sidelink transmission, etc.). At 1625, the first device performs the one or more sidelink transmissions in the transmission occasion.

In an example, the selection/determination of the one or more sidelink transmissions may be performed based on a sidelink transmission capability (associated with the first device, for example). The sidelink transmission capability may correspond to a maximum number of sidelink transmissions that the first device can transmit concurrently (e.g., simultaneously) and/or in the transmission occasion. Alternatively and/or additionally, the sidelink transmission capability may correspond to a maximum UE transmit power. In an example, the one or more sidelink transmissions may be determined (e.g., selected from the plurality of sidelink transmissions) such that a number of sidelink transmissions of the one or more sidelink transmissions does not exceed the maximum number of sidelink transmissions.

In an example, if the number/amount of the second set of sidelink transmissions does not exceed the sidelink transmission capability, the one or more sidelink transmissions may comprise all sidelink transmissions (e.g., HARQ feedback transmissions) of the second set of sidelink transmissions (e.g., all sidelink transmissions of the second set of sidelink transmissions may be included in the one or more sidelink transmissions).

In an example, if the number/amount of the second set of sidelink transmissions exceeds the sidelink transmission capability, the one or more sidelink transmissions may comprise a subset of sidelink transmissions (e.g., with lower priority values over the second set of sidelink transmissions) of the second set of sidelink transmissions (e.g., merely some of the second set of sidelink transmissions may be included in the one or more sidelink transmissions). In an example, the number/amount of the subset of sidelink transmissions may be less than or equal to the sidelink transmission capability (e.g., less than or equal to the maximum number of sidelink transmissions).

The selection/determination of the zero or more (first) sidelink transmissions from the first set of sidelink transmissions may be performed based on a remaining sidelink transmission capability (associated with the first device, for example). The remaining sidelink transmission capability may correspond to a remaining number of sidelink transmissions after the selection/determination of the one or more second sidelink transmissions from the second set of sidelink transmissions for inclusion in the one or more sidelink transmissions.

In an example, the maximum number of sidelink transmissions may be o and the number/amount of the one or more second sidelink transmissions with sidelink HARQ feedback (of the second set of sidelink transmissions) that are selected for inclusion in the one or more sidelink transmissions may be h. The remaining number of sidelink transmissions may be r, where r=o−h. In some examples, if the remaining number of sidelink transmissions is zero, no transmission of the first set of sidelink transmissions is included in the one or more sidelink transmissions. In some examples, if the remaining number of sidelink transmissions is non-zero, the one or more sidelink transmissions may comprise a set (e.g., subset) of sidelink transmissions (e.g., with lower priority values over the first set of sidelink transmissions) of the first set of sidelink transmissions. The number/amount of the set (e.g., subset) of sidelink transmissions of the first set of sidelink transmissions is at most equal to the remaining number of sidelink transmissions r.

In an example, if the number/amount of the first set of sidelink transmissions does not exceed the remaining sidelink transmission capability (e.g., the remaining number of sidelink transmissions), the one or more sidelink transmissions may comprise all sidelink transmissions of the first set of sidelink transmissions (e.g., all sidelink transmissions of the first set of sidelink transmissions may be included in the one or more sidelink transmissions).

In an example, if the number/amount of the first set of sidelink transmissions exceeds the remaining sidelink transmission capability (e.g., the remaining number of sidelink transmissions), the one or more sidelink transmissions may comprise a subset of sidelink transmissions (e.g., with lower priority values over the first set of sidelink transmissions) of the first set of sidelink transmissions (e.g., merely some of the first set of sidelink transmissions may be included in the one or more sidelink transmissions).

In one embodiment, the first device is capable of transmitting up to a maximum number of sidelink transmissions concurrently (e.g., at the same time and/or simultaneously) and/or in the transmission occasion (e.g., the first device may not perform more than the maximum number of sidelink transmissions concurrently, and/or the first device may not perform more than the maximum number of sidelink transmissions in the transmission occasion). Alternatively and/or additionally, a number/amount of the plurality of sidelink transmissions is larger than the maximum number (of sidelink transmissions). Alternatively and/or additionally, a number/amount of the one or more sidelink transmissions is smaller than or equal to the maximum number (of sidelink transmissions). Alternatively and/or additionally, the determination of the one or more sidelink transmissions is performed based on (e.g., in response to) the number/amount of the plurality of sidelink transmissions being larger than the maximum number (of sidelink transmissions), such as when the number/amount of the plurality of sidelink transmissions is larger than the maximum number (of sidelink transmissions). For example, the one or more sidelink transmissions may correspond to a subset of the plurality of sidelink transmissions based on the number/amount of the plurality of sidelink transmissions being larger than the maximum number (of sidelink transmissions). For example, the one or more sidelink transmissions may be determined (e.g., selected from the plurality of sidelink transmissions) such that the number/amount of the one or more sidelink transmissions is smaller than or equal to the maximum number (of sidelink transmissions).

In one embodiment, in the transmission occasion, the first device does not perform other sidelink transmissions, of the plurality of sidelink transmissions, that are different than the one or more sidelink transmissions (e.g., among the plurality of sidelink transmission, the first device only performs the one or more sidelink transmissions in the transmission occasion). Alternatively and/or additionally, the one or more sidelink transmissions (e.g., all sidelink transmissions of the ne or more sidelink transmissions) are performed concurrently (e.g., simultaneously) in the transmission occasion. Alternatively and/or additionally, each sidelink transmission of the one or more sidelink transmissions may correspond to a PSFCH transmission (e.g., each sidelink transmission of the set of one or more sidelink transmissions may be/comprise a PSFCH transmission).

In one embodiment, each sidelink transmission of the one or more sidelink transmissions is transmitted with a same transmit power (e.g., all the one or more sidelink transmissions are transmitted with the same transmit power).

In one embodiment, the first sidelink control information is indicative of a first priority value, is received by the first device and is transmitted from a second device. Alternatively and/or additionally, the first device may receive, from a third device, a second sidelink control information in the sidelink resource pool, wherein the second sidelink control information is indicative of a second sidelink resource in the second sidelink TTI (e.g., the second sidelink control information may reserve the second sidelink resource in the second sidelink TTI), and the second sidelink resource (partially or fully) overlaps (e.g., conflicts), in time domain and frequency domain, with the first sidelink resource. In some examples, the second sidelink control information is indicative of a second priority value smaller than the first priority value (e.g., the second priority value may be indicative of a higher priority than a priority indicated by the first priority value). Alternatively and/or additionally, the determination of the conflict comprises determining that the first sidelink resource overlaps with the second sidelink resource. Alternatively and/or additionally, the first device may trigger, determine, and/or schedule the first sidelink transmission in response to determining the conflict (e.g., in response to determining that the first sidelink resource overlaps with the second sidelink resource). Alternatively and/or additionally, the first sidelink transmission may be associated with the second priority value. Alternatively and/or additionally, the plurality of sidelink transmissions may be associated with a plurality of devices. For example, at least some of the plurality of sidelink transmissions may be transmitted to and/or may be for at least some devices of the plurality of devices. Alternatively and/or additionally, the plurality of devices may comprise the second device (and/or one or more other devices in addition to the second device, such as at least one of the third device, a fourth device, a fifth device, etc.).

In one embodiment, the first sidelink transmission corresponds to a PSFCH transmission (e.g., the first sidelink transmission is and/or comprises a PSFCH transmission). Alternatively and/or additionally, the transmission occasion may be a PSFCH occasion. Alternatively and/or additionally, the transmission occasion may be in the sidelink resource pool. Alternatively and/or additionally, the transmission occasion comprises one or more symbols, for PSFCH transmission, in a third sidelink TTI. Alternatively and/or additionally, the third sidelink TTI is after (e.g., later than) the first sidelink TTI, and is before (e.g., earlier than) the second sidelink TTI.

In one embodiment, the first sidelink transmission is associated with a third priority value. Alternatively and/or additionally, the second set of sidelink transmissions may comprise a second sidelink transmission with sidelink HARQ feedback associated with a fourth priority value. Alternatively and/or additionally, the third priority value associated with the first sidelink transmission may be smaller than the fourth priority value associated with the second sidelink transmission (e.g., the third priority value may be indicative of a higher priority than a priority indicated by the fourth priority value). Alternatively and/or additionally, the determination of the one or more sidelink transmissions comprises prioritizing the second sidelink transmission over the first sidelink transmission. For example, selection of the second sidelink transmission for inclusion in the one or more sidelink transmissions may be prioritized over selection of the first sidelink transmission for inclusion in the one or more sidelink transmissions (e.g., the second sidelink transmission may be prioritized over the first sidelink transmission based on the second sidelink transmission being a HARQ feedback transmission and the first sidelink transmission being a conflict information transmission, wherein HARQ feedback transmissions are prioritized over conflict information transmissions).

In one embodiment, the selecting, from the second set of sidelink transmissions, the one or more second sidelink transmissions with sidelink HARQ feedback for inclusion in the one or more sidelink transmissions is performed in ascending order of corresponding priority values over the second set of sidelink transmissions with sidelink HARQ feedback (e.g., priority values associated with the second set of sidelink transmissions). In an example in which the one or more sidelink transmissions comprise a subset of e sidelink transmissions of the second set of sidelink transmissions, the one or more sidelink transmissions may comprise sidelink transmissions with the lowest e priority values among the second set of sidelink transmissions. For example, the one or more sidelink transmissions may comprise sidelink transmissions with the highest e priorities among the second set of sidelink transmissions.

In one embodiment, the selecting, from the first set of sidelink transmissions, the zero or more (first) sidelink transmissions with conflict information for inclusion in the one or more sidelink transmissions is performed in ascending order of corresponding priority values (e.g., priority values associated with the first set of sidelink transmissions). In an example in which the one or more sidelink transmissions comprises a subset of d sidelink transmissions of the first set of sidelink transmissions, the one or more sidelink transmissions may comprise sidelink transmissions with the lowest d priority values among the first set of sidelink transmissions. For example, the one or more sidelink transmissions may comprise sidelink transmissions with the highest d priorities among the first set of sidelink transmissions.

In one embodiment, the selecting the zero or more (first) sidelink transmissions with conflict information from the first set of sidelink transmissions is performed based on there being remaining capability of sidelink transmissions after the one or more second sidelink transmissions with sidelink HARQ feedback are selected from the second set of sidelink transmissions.

In one embodiment, after the selecting the one or more second sidelink transmissions with sidelink HARQ feedback from the second set of sidelink transmissions, if (e.g., when) there is remaining capability of sidelink transmissions, the first device selects/determines/prioritizes one or more (first) sidelink transmissions from the first set of sidelink transmissions with conflict information for inclusion in the one or more sidelink transmissions. After the selecting from the second set of sidelink transmissions, if (e.g., when) there is no remaining capability of sidelink transmissions, the first device does not select/determine/prioritize sidelink transmissions, from the first set of sidelink transmissions with conflict information, for inclusion in the one or more sidelink transmissions (e.g., the first device does not select/determine/prioritize any sidelink transmission, from the first set of sidelink transmissions with conflict information, for inclusion in the one or more sidelink transmissions). For example, there may be no remaining capability if (e.g., when) the sidelink transmission capability does not exceed the number/amount of the second set of sidelink transmissions. If (e.g., when) the sidelink transmission capability does not exceed number/amount of the second set of sidelink transmissions with HARQ feedback, zero sidelink transmissions with conflict information may be included in the one or more sidelink transmissions.

In some examples, in a scenario in which the plurality of sidelink transmissions comprises the first set of sidelink transmissions comprising/with conflict information and does not comprise the second set of sidelink transmissions comprising/with HARQ feedback (e.g., the plurality of sidelink transmissions does not comprise HARQ feedback transmissions), the one or more sidelink transmissions may comprise sidelink transmission(s) with conflict information of the first set of sidelink transmissions and/or the one or more sidelink transmissions may not comprise any sidelink transmission with HARQ feedback.

In some examples, in a scenario in which the plurality of sidelink transmissions comprises the second set of sidelink transmissions comprising/with HARQ feedback and does not comprise the first set of sidelink transmissions comprising/with conflict information (e.g., the plurality of sidelink transmissions does not comprise conflict information transmissions), the one or more sidelink transmissions may comprise sidelink transmission(s) with HARQ feedback of the second set of sidelink transmissions second set and/or the one or more sidelink transmissions may not comprise any sidelink transmission with conflict information.

Referring back to FIGS. 3 and 4, in one exemplary embodiment (for performing sidelink communication, for example) of a first device, the device 300 includes a program code 312 stored in the memory 310. The CPU 308 may execute program code 312 to enable the first device (i) to receive a first sidelink control information in a first sidelink TTI in a sidelink resource pool, wherein the first sidelink control information is indicative of a first sidelink resource in a second sidelink TTI, (ii) to determine a conflict associated with the first sidelink resource, (iii) to determine a transmission occasion for a first sidelink transmission with conflict information, wherein the first device may determine a plurality of sidelink transmissions in the transmission occasion (e.g., the first device may have, trigger, and/or schedule the plurality of sidelink transmissions in the transmission occasion), wherein the plurality of sidelink transmissions comprises a first set of sidelink transmissions with conflict information and/or a second set of sidelink transmissions with sidelink HARQ feedback, and wherein the first set of sidelink transmissions comprises the first sidelink transmission, (iv) to determine one or more sidelink transmissions of the plurality of sidelink transmissions, wherein the determining the one or more sidelink transmissions comprises (A) selecting, from the second set of sidelink transmissions, one or more second sidelink transmissions with sidelink HARQ feedback for inclusion in the one or more sidelink transmissions, and (B) after the selecting the one or more second sidelink transmissions with sidelink HARQ feedback from the second set of sidelink transmissions, selecting, from the first set of sidelink transmissions, zero or more (first) sidelink transmissions with conflict information for inclusion in the one or more sidelink transmissions, and (v) to perform the one or more sidelink transmissions in the transmission occasion. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 15-16. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 15-16, and/or one, some and/or all of the above-described actions and steps and/or others described herein.

It may be appreciated that applying one or more of the techniques presented herein may result in one or more benefits including, but not limited to, increased efficiency of communication between devices (e.g., UEs), such as due, at least in part, to handle overlapping of PSFCHs and/or conflict-information signalings (e.g., overlapping of PSFCHs and/or conflict-information signalings may be handled with consideration of one or more associated priorities, one or more transmit power settings and/or one or more capabilities and/or limitations).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as Random Access Memory (RAM) memory, flash memory, Read-Only Memory (ROM) memory, Erasable Programmable Read-Only Memory (EPROM) memory, Electrically Erasable Programmable Read-Only Memory (EEPROM) memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device, the method comprising:
    receiving a first sidelink control information in a first sidelink Transmission Time Interval (TTI) in a sidelink resource pool, wherein the first sidelink control information is indicative of a first sidelink resource in a second sidelink TTI;
    determining a conflict associated with the first sidelink resource;
    determining a transmission occasion for a first sidelink transmission with conflict information, wherein the first device determines a plurality of sidelink transmissions in the transmission occasion, and wherein the plurality of sidelink transmissions comprises at least one of:
        a first set of sidelink transmission(s) with conflict information, wherein the first set of sidelink transmission(s) comprises the first sidelink transmission; or
        a second set of sidelink transmission(s) with sidelink Hybrid Automatic Repeat Request (HARQ) feedback;
    determining one or more sidelink transmissions of the plurality of sidelink transmissions, wherein the determining the one or more sidelink transmissions comprises prioritizing the second set of sidelink transmission(s) with sidelink HARQ feedback over the first set of sidelink transmission(s) with conflict information if the plurality of sidelink transmissions comprises both the first set of sidelink transmission(s) and the second set of sidelink transmission(s); and
    performing the one or more sidelink transmissions in the transmission occasion.

2. The method of claim 1, wherein:
    the first device is capable of transmitting up to a maximum number of sidelink transmissions at least one of concurrently or in the transmission occasion;
    a number of sidelink transmissions of the plurality of sidelink transmissions is larger than the maximum number;
    a number of sidelink transmissions of the one or more sidelink transmissions is smaller than or equal to the maximum number; and
    the determining the one or more sidelink transmissions is performed based on the number of sidelink transmissions of the plurality of sidelink transmissions being larger than the maximum number.

3. The method of claim 1, wherein at least one of:
    the method comprises not performing, in the transmission occasion, other sidelink transmissions, of the plurality of sidelink transmissions, that are different than the one or more sidelink transmissions;
    the performing the one or more sidelink transmissions comprises concurrently transmitting the one or more sidelink transmissions; or
    each sidelink transmission of the one or more sidelink transmissions corresponds to a Physical Sidelink Feedback Channel (PSFCH) transmission.

4. The method of claim 1, wherein the performing the one or more sidelink transmissions comprises:
    transmitting each sidelink transmission of the one or more sidelink transmissions with a same transmit power.

5. The method of claim 1, wherein at least one of:
    the first sidelink control information is:
        indicative of a first priority value; and
        transmitted from a second device;
    the method comprises receiving, from a third device, a second sidelink control information in the sidelink resource pool, wherein:
        the second sidelink control information is indicative of a second sidelink resource in the second sidelink TTI; and
        the second sidelink resource overlaps, in time domain and frequency domain, with the first sidelink resource;

the second sidelink control information is indicative of a second priority value smaller than the first priority value;
the determining the conflict comprises determining that the first sidelink resource overlaps with the second sidelink resource;
the method comprises triggering the first sidelink transmission in response to the determining the conflict; or
the first sidelink transmission is associated with the second priority value.

6. The method of claim 1, wherein at least one of:
the first sidelink transmission corresponds to a Physical Sidelink Feedback Channel (PSFCH) transmission;
the transmission occasion is a PSFCH occasion;
the transmission occasion is in the sidelink resource pool;
the transmission occasion comprises one or more symbols, for PSFCH transmission, in a third sidelink TTI; or
the third sidelink TTI is:
    after the first sidelink TTI; and
    before the second sidelink TTI.

7. The method of claim 1, wherein:
the first sidelink transmission is associated with a third priority value;
the second set of sidelink transmission(s) comprises a second sidelink transmission with sidelink HARQ feedback associated with a fourth priority value;
the third priority value is smaller than the fourth priority value; and
the determining the one or more sidelink transmissions comprises prioritizing the second sidelink transmission over the first sidelink transmission.

8. The method of claim 1, wherein the determining the one or more sidelink transmissions comprises:
selecting, from the second set of sidelink transmission(s) and in ascending order of corresponding priority values over the second set of sidelink transmission(s), one or more second sidelink transmissions with sidelink HARQ feedback for inclusion in the one or more sidelink transmissions; and
after the selecting the one or more second sidelink transmissions with sidelink HARQ feedback, selecting, from the first set of sidelink transmission(s) and in ascending order of corresponding priority values over the first set of sidelink transmission(s), zero or more first sidelink transmissions with conflict information for inclusion in the one or more sidelink transmissions.

9. The method of claim 1, wherein the determining the one or more sidelink transmissions comprises:
selecting, from the second set of sidelink transmission(s), one or more second sidelink transmissions with sidelink HARQ feedback for inclusion in the one or more sidelink transmissions; and
after the selecting the one or more second sidelink transmissions with sidelink HARQ feedback, one of:
    if there is remaining capability of sidelink transmissions, selecting, from the first set of sidelink transmission(s), one or more first sidelink transmissions with conflict information for inclusion in the one or more sidelink transmissions; or
    if there is no remaining capability of sidelink transmissions, not selecting any sidelink transmission from the first set of sidelink transmission(s) for inclusion in the one or more sidelink transmissions.

10. The method of claim 1, wherein:
the plurality of sidelink transmissions is associated with a plurality of devices.

11. A method of a first device, the method comprising:
receiving a first sidelink control information in a first sidelink Transmission Time Interval (TTI) in a sidelink resource pool, wherein the first sidelink control information is indicative of a first sidelink resource in a second sidelink TTI;
determining a conflict associated with the first sidelink resource;
determining a transmission occasion for a first sidelink transmission with conflict information, wherein the first device determines a plurality of sidelink transmissions in the transmission occasion, and wherein the plurality of sidelink transmissions comprises at least one of:
    a first set of sidelink transmission(s) with conflict information, wherein the first set of sidelink transmission(s) comprises the first sidelink transmission; or
    a second set of sidelink transmission(s) with sidelink Hybrid Automatic Repeat Request (HARQ) feedback;
determining one or more sidelink transmissions of the plurality of sidelink transmissions, wherein the determining the one or more sidelink transmissions comprises:
    selecting, from the second set of sidelink transmission(s), one or more second sidelink transmissions with sidelink HARQ feedback for inclusion in the one or more sidelink transmissions; and
    after the selecting the one or more second sidelink transmissions with sidelink HARQ feedback, selecting, from the first set of sidelink transmission(s), zero or more first sidelink transmissions with conflict information for inclusion in the one or more sidelink transmissions; and
performing the one or more sidelink transmissions in the transmission occasion.

12. The method of claim 11, wherein:
the first device is capable of transmitting up to a maximum number of sidelink transmissions at least one of concurrently or in the transmission occasion;
a number of sidelink transmissions of the plurality of sidelink transmissions is larger than the maximum number;
a number of sidelink transmissions of the one or more sidelink transmissions is smaller than or equal to the maximum number; and
the determining the one or more sidelink transmissions is performed based on the number of sidelink transmissions of the plurality of sidelink transmissions being larger than the maximum number.

13. The method of claim 11, wherein at least one of:
the method comprises not performing, in the transmission occasion, other sidelink transmissions, of the plurality of sidelink transmissions, that are different than the one or more sidelink transmissions;
the performing the one or more sidelink transmissions comprises concurrently transmitting the one or more sidelink transmissions; or
each sidelink transmission of the one or more sidelink transmissions corresponds to a Physical Sidelink Feedback Channel (PSFCH) transmission.

14. The method of claim 11, wherein the performing the one or more sidelink transmissions comprises:
transmitting each sidelink transmission of the one or more sidelink transmissions with a same transmit power.

15. The method of claim 11, wherein at least one of:
the first sidelink control information is:
indicative of a first priority value; and
transmitted from a second device;
the method comprises receiving, from a third device, a second sidelink control information in the sidelink resource pool, wherein:
the second sidelink control information is indicative of a second sidelink resource in the second sidelink TTI; and
the second sidelink resource overlaps, in time domain and frequency domain, with the first sidelink resource;
the second sidelink control information is indicative of a second priority value smaller than the first priority value;
the determining the conflict comprises determining that the first sidelink resource overlaps with the second sidelink resource;
the method comprises triggering the first sidelink transmission in response to the determining the conflict; or
the first sidelink transmission is associated with the second priority value.

16. The method of claim 11, wherein at least one of:
the first sidelink transmission corresponds to a Physical Sidelink Feedback Channel (PSFCH) transmission;
the transmission occasion is a PSFCH occasion;
the transmission occasion is in the sidelink resource pool;
the transmission occasion comprises one or more symbols, for PSFCH transmission, in a third sidelink TTI; or
the third sidelink TTI is:
after the first sidelink TTI; and
before the second sidelink TTI.

17. The method of claim 11, wherein:
the first sidelink transmission is associated with a third priority value;
the second set of sidelink transmission(s) comprises a second sidelink transmission with sidelink HARQ feedback associated with a fourth priority value;
the third priority value is smaller than the fourth priority value; and
the determining the one or more sidelink transmissions comprises prioritizing the second sidelink transmission over the first sidelink transmission.

18. The method of claim 11, wherein at least one of:
the selecting, from the second set of sidelink transmission(s), the one or more second sidelink transmissions with sidelink HARQ feedback for inclusion in the one or more sidelink transmissions is performed in ascending order of corresponding priority values over the second set of sidelink transmission(s) with sidelink HARQ feedback; or
the selecting, from the first set of sidelink transmission(s), the zero or more first sidelink transmissions with conflict information for inclusion in the one or more sidelink transmissions is performed in ascending order of corresponding priority values over the first set of sidelink transmission(s) with conflict information.

19. The method of claim 11, wherein the selecting the zero or more first sidelink transmissions with conflict information from the first set of sidelink transmission(s) comprises:
if there is remaining capability of sidelink transmissions, selecting, from the first set of sidelink transmission(s), one or more first sidelink transmissions with conflict information for inclusion in the one or more sidelink transmissions; or
if there is no remaining capability of sidelink transmissions, not selecting any sidelink transmission from the first set of sidelink transmission(s) for inclusion in the one or more sidelink transmissions.

20. A first device, comprising:
a control circuit;
a processor installed in the control circuit; and
a memory installed in the control circuit and operatively coupled to the processor, wherein the processor is configured to execute a program code stored in the memory to perform operations, the operations comprising:
receiving a first sidelink control information in a first sidelink Transmission Time Interval (TTI) in a sidelink resource pool, wherein the first sidelink control information is indicative of a first sidelink resource in a second sidelink TTI;
determining a conflict associated with the first sidelink resource;
determining a transmission occasion for a first sidelink transmission with conflict information, wherein the first device determines a plurality of sidelink transmissions in the transmission occasion, and wherein the plurality of sidelink transmissions comprises at least one of:
a first set of sidelink transmission(s) with conflict information, wherein the first set of sidelink transmission(s) comprises the first sidelink transmission; or
a second set of sidelink transmission(s) with sidelink Hybrid Automatic Repeat Request (HARQ) feedback;
determining one or more sidelink transmissions of the plurality of sidelink transmissions, wherein the determining the one or more sidelink transmissions comprises prioritizing the second set of sidelink transmission(s) with sidelink HARQ feedback over the first set of sidelink transmission(s) with conflict information if the plurality of sidelink transmissions comprises both the first set of sidelink transmission(s) and the second set of sidelink transmission(s); and
performing the one or more sidelink transmissions in the transmission occasion.

* * * * *